(12) United States Patent
Zenoff

(10) Patent No.: US 10,416,947 B2
(45) Date of Patent: Sep. 17, 2019

(54) MOUNTABLE DISPLAY DEVICES

(71) Applicant: BEAM AUTHENTIC, LLC, San Anselmo, CA (US)

(72) Inventor: Andrew Zenoff, San Anselmo, CA (US)

(73) Assignee: BEAM Authentic Inc., San Anselmo, CA (US)

( * ) Notice: Subject to any disclaimer, the term of this patent is extended or adjusted under 35 U.S.C. 154(b) by 0 days.

(21) Appl. No.: 14/811,733

(22) Filed: Jul. 28, 2015

(65) Prior Publication Data

US 2016/0026423 A1    Jan. 28, 2016

Related U.S. Application Data

(60) Provisional application No. 62/029,913, filed on Jul. 28, 2014, provisional application No. 62/032,306, filed on Aug. 1, 2014.

(51) Int. Cl.
*G09G 5/00* (2006.01)
*G06F 3/14* (2006.01)
*G06F 1/16* (2006.01)
*G06F 3/00* (2006.01)
*G09G 3/20* (2006.01)
(Continued)

(52) U.S. Cl.
CPC .......... *G06F 3/1407* (2013.01); *G06F 1/1647* (2013.01); *G06F 1/1652* (2013.01); *G06F 1/1654* (2013.01); *G06F 3/002* (2013.01); *G06F 3/005* (2013.01); *G06F 3/14* (2013.01); *G09G 3/2014* (2013.01); *G09G 3/32* (2013.01); *G09G 3/3208* (2013.01); *G06F 2200/1633* (2013.01); *G09G 2320/0673* (2013.01); *G09G 2330/022* (2013.01); *G09G 2340/0407* (2013.01); *G09G 2354/00* (2013.01); *G09G 2360/144* (2013.01); (Continued)

(58) Field of Classification Search
CPC .... G06F 3/1407; G06F 1/1652; G06F 1/1654; G06F 3/005; G06F 3/002; G06F 1/1647; G09G 2320/0673; G09G 2330/022; G09G 2340/0407; G09G 2360/144; G09G 2370/10
USPC .................................................. 345/7, 8, 204
See application file for complete search history.

(56) References Cited

U.S. PATENT DOCUMENTS 4,924,613 A    5/1990  Levin
5,167,559 A    12/1992 Power-Fardy
(Continued)

FOREIGN PATENT DOCUMENTS

CN    203327079 U    12/2013
DE    4408951 A1     9/1994
(Continued)

OTHER PUBLICATIONS

How to Make a Wireless Li-Ion Battery Charger Circuit. Available at http://www.homemade-circuits.com/2012/01/how-to-make-inductive-li-ion-battery.html. Accessed on Jan. 11, 2016.
(Continued)

*Primary Examiner* — Jennifer T Nguyen

(57) ABSTRACT

The present disclosure provides display devices and methods. A display device can include a visual curvilinear display mounted on a support member. A user may display or project media through the visual curvilinear display according to a display and/or location preference or schedule of the user.

20 Claims, 57 Drawing Sheets

(51) Int. Cl.
*G09G 3/32* (2016.01)
*G09G 3/3208* (2016.01)

(52) U.S. Cl.
CPC ..... *G09G 2370/10* (2013.01); *G09G 2370/16* (2013.01)

(56) References Cited

U.S. PATENT DOCUMENTS

| | | | |
|---|---|---|---|
| 5,437,062 A | 8/1995 | Douglas | |
| 5,454,120 A | 10/1995 | Rowlands | |
| 5,462,471 A | 10/1995 | Power-Fardy | |
| 5,548,847 A | 8/1996 | Spicijaric | |
| 5,632,044 A | 5/1997 | Sloot | |
| 5,794,267 A | 8/1998 | Wallace | |
| 5,943,698 A | 8/1999 | Blanks | |
| 6,154,992 A | 12/2000 | Lee | |
| 6,323,846 B1 | 11/2001 | Westerman et al. | |
| 6,426,758 B2 | 7/2002 | Karp | |
| 6,470,499 B1 | 10/2002 | Joiner | |
| 6,570,557 B1 | 5/2003 | Westerman et al. | |
| 6,677,932 B1 | 1/2004 | Westerman | |
| 6,751,805 B1 | 6/2004 | Austion | |
| 6,810,533 B1 | 11/2004 | Nahabedian et al. | |
| 7,030,855 B2 | 4/2006 | Metcalf | |
| 7,095,318 B1* | 8/2006 | Bekhor | B60Q 1/503 340/464 |
| 7,331,064 B1 | 2/2008 | Quintal | |
| 7,519,703 B1 | 4/2009 | Stuart et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,787,240 B2 | 8/2010 | Swain | |
| 7,844,914 B2 | 11/2010 | Andre et al. | |
| D635,976 S | 4/2011 | Lee | |
| 8,006,002 B2 | 8/2011 | Kalayjian et al. | |
| D647,286 S | 10/2011 | Malek | |
| 8,239,784 B2 | 8/2012 | Hotelling et al. | |
| 8,279,180 B2 | 10/2012 | Hotelling et al. | |
| 8,364,220 B2 | 1/2013 | Sandmore | |
| 8,381,135 B2 | 2/2013 | Hotelling et al. | |
| 8,453,265 B2 | 6/2013 | Forte et al. | |
| 8,479,122 B2 | 7/2013 | Hotelling et al. | |
| 8,530,074 B2 | 9/2013 | Krammer | |
| 8,600,430 B2 | 12/2013 | Herz et al. | |
| 8,626,586 B1 | 1/2014 | Biere et al. | |
| D701,504 S | 3/2014 | Christopher et al. | |
| 8,677,515 B2 | 3/2014 | Ishihara et al. | |
| D703,069 S | 4/2014 | Adams et al. | |
| 8,762,201 B1 | 6/2014 | Noonan | |
| D710,220 S | 8/2014 | Daniel | |
| D711,002 S | 8/2014 | Ohnemus et al. | |
| 8,869,312 B2 | 10/2014 | Tuohy et al. | |
| D718,731 S | 12/2014 | Lee et al. | |
| D729,650 S | 5/2015 | Phillips et al. | |
| D733,130 S | 6/2015 | Kim et al. | |
| D734,329 S | 7/2015 | Lee | |
| D736,768 S | 8/2015 | Kuwabara et al. | |
| 2002/0015024 A1 | 2/2002 | Westerman et al. | |
| 2002/0167483 A1 | 11/2002 | Metcalf | |
| 2003/0073412 A1 | 4/2003 | Meade et al. | |
| 2003/0184575 A1 | 10/2003 | Reho et al. | |
| 2004/0202052 A1 | 10/2004 | Lev | |
| 2005/0071418 A1 | 3/2005 | Kjellberg et al. | |
| 2005/0264558 A1 | 12/2005 | Vesely et al. | |
| 2006/0026536 A1 | 2/2006 | Hotelling et al. | |
| 2006/0033724 A1 | 2/2006 | Chaudhri et al. | |
| 2006/0117458 A1 | 6/2006 | Ishihara et al. | |
| 2006/0197753 A1 | 9/2006 | Hotelling | |
| 2006/0209218 A1 | 9/2006 | Lee et al. | |
| 2007/0106950 A1 | 5/2007 | Hutchinson et al. | |
| 2007/0182664 A1 | 8/2007 | Himmele | |
| 2007/0193093 A1* | 8/2007 | Taylor | G09F 21/04 40/643 |
| 2007/0247312 A1 | 10/2007 | Sekine | |
| 2008/0040354 A1 | 2/2008 | Ray et al. | |
| 2008/0051996 A1* | 2/2008 | Dunning | B60Q 1/503 701/431 |
| 2008/0091771 A1 | 4/2008 | Allen et al. | |
| 2008/0186254 A1* | 8/2008 | Simmons | G02B 27/01 345/7 |
| 2008/0204440 A1 | 8/2008 | Swain | |
| 2009/0106674 A1 | 4/2009 | Bray et al. | |
| 2009/0136212 A1 | 5/2009 | Klein | |
| 2009/0179867 A1 | 7/2009 | Shim et al. | |
| 2009/0251888 A1 | 10/2009 | Douglas | |
| 2009/0299857 A1* | 12/2009 | Brubaker | G06Q 30/02 705/14.66 |
| 2009/0310290 A1 | 12/2009 | Tennent | |
| 2009/0316056 A1 | 12/2009 | Rosencwaig et al. | |
| 2009/0322740 A1 | 12/2009 | Carlson | |
| 2010/0095573 A1 | 4/2010 | Lifshitz | |
| 2010/0100004 A1 | 4/2010 | Van Someren | |
| 2010/0131613 A1 | 5/2010 | Jonsson et al. | |
| 2010/0218100 A1 | 8/2010 | Simon et al. | |
| 2010/0235245 A1 | 9/2010 | Grossman et al. | |
| 2010/0292886 A1 | 11/2010 | Szczerba et al. | |
| 2010/0306808 A1 | 12/2010 | Neumeier et al. | |
| 2011/0006892 A1* | 1/2011 | Karpinsky | B60K 35/00 340/461 |
| 2011/0041238 A1 | 2/2011 | Brzoska | |
| 2011/0146119 A1* | 6/2011 | Wagner | G09F 9/33 40/452 |
| 2011/0187681 A1 | 8/2011 | Kim et al. | |
| 2011/0199389 A1 | 8/2011 | Lu et al. | |
| 2011/0239253 A1 | 9/2011 | West et al. | |
| 2011/0246908 A1 | 10/2011 | Akram et al. | |
| 2011/0295749 A1 | 12/2011 | Scalisi | |
| 2012/0005809 A1 | 1/2012 | Johnson | |
| 2012/0016735 A1 | 1/2012 | Park et al. | |
| 2012/0029981 A1 | 2/2012 | Barton | |
| 2012/0062571 A1 | 3/2012 | Malek et al. | |
| 2012/0089437 A1 | 4/2012 | Amento et al. | |
| 2012/0117019 A1 | 5/2012 | Wolf et al. | |
| 2012/0163269 A1 | 6/2012 | Shuster et al. | |
| 2012/0256585 A1 | 10/2012 | Partovi et al. | |
| 2012/0256902 A1 | 10/2012 | Tam et al. | |
| 2012/0268665 A1* | 10/2012 | Yetukuri | B60K 35/00 348/837 |
| 2012/0320280 A1 | 12/2012 | Waites et al. | |
| 2012/0324076 A1 | 12/2012 | Zerr et al. | |
| 2013/0154811 A1 | 6/2013 | Ferren et al. | |
| 2013/0188322 A1 | 7/2013 | Lowe et al. | |
| 2013/0222270 A1 | 8/2013 | Winkler et al. | |
| 2013/0241820 A1 | 9/2013 | Keh et al. | |
| 2013/0332248 A1 | 12/2013 | Lim | |
| 2014/0019259 A1 | 1/2014 | Dung et al. | |
| 2014/0082822 A1 | 3/2014 | Rober et al. | |
| 2014/0098009 A1 | 4/2014 | Prest et al. | |
| 2014/0111323 A1 | 4/2014 | Strout et al. | |
| 2014/0121539 A1 | 5/2014 | Chatterjee et al. | |
| 2014/0139637 A1 | 5/2014 | Mistry et al. | |
| 2014/0141840 A1* | 5/2014 | Pereira, Jr. | G06F 17/30861 455/566 |
| 2014/0160055 A1 | 6/2014 | Margolis et al. | |
| 2014/0176417 A1 | 6/2014 | Young et al. | |
| 2014/0257962 A1 | 9/2014 | Franzetti et al. | |
| 2014/0359453 A1 | 12/2014 | Palfreeman | |
| 2015/0061588 A1 | 3/2015 | Alves et al. | |
| 2015/0067708 A1 | 3/2015 | Jensen et al. | |
| 2015/0095124 A1* | 4/2015 | Felt | G06Q 30/0259 705/14.5 |
| 2015/0146903 A1 | 5/2015 | Mariasov | |
| 2015/0194082 A1* | 7/2015 | McEwan | G09F 21/048 40/209 |
| 2015/0279268 A1* | 10/2015 | Ganim | G09G 3/32 345/46 |

(56) References Cited

U.S. PATENT DOCUMENTS

| 2015/0282346 | A1* | 10/2015 | Ganim | H05K 5/0204 |
| | | | | 361/807 |
| 2015/0309762 | A1 | 10/2015 | Augustine | |
| 2017/0205854 | A1 | 7/2017 | Zenoff | |

FOREIGN PATENT DOCUMENTS

| DE | 10148821 | A1 | 4/2003 |
| GB | 2378033 | A | 1/2003 |
| JP | H08-146340 | A | 6/1996 |
| JP | 2002-528811 | T | 5/2000 |
| JP | 2008-164315 | A | 7/2008 |
| JP | 2008-281659 | A | 11/2008 |
| JP | 2011-221524 | A | 11/2011 |
| WO | WO-0072723 | A1 | 12/2000 |
| WO | WO-2008079891 | A2 | 7/2008 |
| WO | WO-2012061438 | A2 | 5/2012 |
| WO | WO-2014054211 | A1 | 4/2014 |
| WO | WO 2013/076994 | A1 | 4/2015 |

OTHER PUBLICATIONS

International search report and written opinion dated Nov. 2, 2015 for PCT Application No. PCT/US2015/42507.
International search report and written opinion dated Nov. 3, 2015 for PCT Application No. PCT/US2015/045308.
International search report and written opinion dated Nov. 23, 2015 for PCT Application No. PCT/US2015/45309.
International search report and written opinion dated Dec. 8, 2015 for PCT Application No. PCT/US2015/41308.
Wireless Charging Available at http://powerbyproxi.com/wireless-charging. Accessed on Jan. 11, 2016.
ALIBABA.com. Mobile billboard advertising led truck new technology product in china mobile truck led tv screen. Available at http://www.alibaba.com/product-detail/mobile-billboard-advertising-led-truck-new_60181386676.html. Accessed on Jul. 24, 2015.
Co-pending U.S. Appl. No. 14/805,386, filed Jul. 21, 2015.
Co-pending U.S. Appl. No. 14/805,436, filed Jul. 21, 2015.
Co-pending U.S. Appl. No. 14/827,101, filed Aug. 14, 2015.
Co-pending U.S. Appl. No. 14/827,127, filed Aug. 14, 2015.
International search report and written opinion dated Oct. 23, 2015 for PCT Application No. US2015/041391.
WEBBOZZ.com. Stylish Circular Display Smart Watch—Motorola Moto 360. Feb. 2013. Available at http://www.webbozz.com/stylish-circular-display-smart-watch-motorola-moto-360. Accessed Jul. 23, 2015.
International search report and written opinion dated Apr. 6, 2016 for PCT Application No. PCT/US2017/14120 of Applicant Beam Authentic, LLC, 14 Pages.
Office Action for U.S. Appl. No. 14/805,386, dated Aug. 24, 2017, 18 Pages.
Office Action for U.S. Appl. No. 14/805,386, dated Feb. 9, 2017, 19 Pages.
Office Action for U.S. Appl. No. 14/805,386, dated Sep. 1, 2016, 14 Pages.
United States Office Action, U.S. Appl. No. 14/805,436, dated Feb. 8, 2018, twenty-six pages.
United States Office Action, U.S. Appl. No. 15/793,989, dated Feb. 5, 2018, ten pages.
European Patent Office, Partial Supplementary European Search Report, European Application No. 15825400.3, dated May 25, 2018, 14 pages.
Japan Patent Office, Office Action, Japanese Application No. 2017-525300, dated May 27, 2019, 8 pages.

* cited by examiner

MOUNTABLE DISPLAY DEVICES

CROSS-REFERENCE

This application claims priority to U.S. Provisional Patent Application Ser. No. 62/029,913, filed Jul. 28, 2014, and U.S. Provisional Patent Application Ser. No. 62/032,306, filed Aug. 1, 2014, each of which is entirely incorporated herein by reference.

BACKGROUND

People experience and create all kinds of intentions and expressions which yield different energies and results that affect and impact what their experience of life is like and the results they yield how they feel and what they accomplish throughout their day, week, month and lifetime. Some intentions, expressions and energies are powerful and easily recognizable, while others are more subtle and often only intuitively felt.

The things one says, thinks and expresses do produce energy and results that impacts a person and the people around a person. Creating more positive intentions, expressions and energy leads to improvements, and favorable results in a person's life and to society as a whole.

Negative outcomes and negative and/or not thought out intentions, and negative energy, come in many forms. Developing more positive and focused intentions and expressions, of these intentions and positive energy can take many forms including but not limited to being around positive people, self-talk, uplifting music, inspirational messages, and inspirational books, being around positive people, communicating with positive people, practicing positive affirmations and the like.

When we emit positive intentions and expressions energy, including but not limited to communications, messages, thoughts, feelings, vibrations and the like, we attract more positives to us. Newton's law of action and reaction may be at play here. When we dwell on the negatives, or do not focus on what positive outcomes we want to have happen, we attract negatives, we also are victim to chance circumstance the collective consciousness, and this creates endless cycles of suffering and repetition that sap our energy strength in the process.

There are various ways of increasing our positive outcomes as a society and as an individual. The first thing is becoming clear about how our intentions and expressions impact our lives. The secondly thing is, creating vehicles and methods to support positive intentions, collective conscious expressions, reducing the experience of feeling powerless, having a voice, sharing, feeling connected to the greater whole and a relationship with something bigger than ones small self. Others include, love and accept yourself as you are, free yourself from past resentments and disappointments, letting go of any and all resentment you're hanging onto about everyone and everything else, stop looking for reasons to criticize and blame others for their acts and omissions, letting go of your desire to control others, using your time, energy, and vitality wisely, using creative visualization and imagination to your advantage, not your detriment, developing an attitude of gratitude, being happy, appreciating the moment, and the like.

With consciousness evolving and a need for its evolution, we as people have the ability and power to impact the outcomes that serve our lives and the greater community in which we live. Be it self, family, group affiliations, neighborhood, city, state, country, globe.

It may be important to share, give back, feel connected, feel heard, counted and considered while being of service to self and others.

SUMMARY

The present disclosure provides display devices that may be customizable. The display devices may be digital screens/displays for sharing self-expression, which may be usable on various inanimate objects, such as in or on vehicles and helmets, and stationary places. The display devices may be with or without sensors. The display devices can provide individual, customizable, creative self-expression, in the form of images and/or words shared on inanimate objects (e.g., vehicles). The display devices may enable connection between a user and one or more other individuals, and may provide other uses, such as being counted, collective expressions and possible manifestation in a variety of different forms.

A display device of the present disclosure can provide a screen that provides an ability to share self-expression, with the self-expression being changeable, and is in the form of words, images and combinations thereof. The display device can provide a screen on a bumper or surface of a vehicle, or stationary place that provides an ability to have dynamic individual creative self-expression, in the form of words, images and combinations thereof, and enables connection. The display device can provide a screen on a bumper, surface of vehicle, which may be visible to the public, or stationary places that may provide the ability to create and share dynamic individual self-expression, in the form of words, images and combinations thereof. The display device may also provide potential for connection, being counted, collective expressions and possible manifestation in a variety of different forms.

A display device of the present disclosure may be a dynamic life strong device that may be connected to a platform which allows the user to connect socially to the things the user may care about, learn more about things the user may not have known about, take action by donating or offering resources to organizations, charities and events, and become an individual philanthropist. The display device may be a customizable bumper sticker for self-expression and a customizable dynamic live strong band for expression and social engagement, which may allow for social impact.

In some examples, the display device is usable by a user for self-expression. The display device can be a bumper sticker, such as a smart bumper sticker for self-expression connection, which can enable action and impact. The display device can be mounted on an inanimate object, such as a vehicle (e.g., vehicle bumper, front window, side window, or rear window of the vehicle), or other object, such as a bag. The display device can be a bumper sticker, such as a digital bumper sticker, on the vehicle.

The display device can allow for instantaneous customizable self-expression. The display device can be connected to a platform that can allow for social connection, learning and taking action, which may result in social impact.

The display device may be equipped with a geolocation unit, which can enable the location of the display device to be determined. The geolocation unit can include a global positioning system (GPS) or wireless receiver (e.g., WiFi) for wireless triangulation. This may enable the display device to be used in various locations, such as in a vehicle during travel from one point to another, or while the vehicle is stationary (e.g., parked or in traffic).

The display device may be connectable to an application (app) on an electronic device of the user. The app can support self-expression and social opportunities around expression, and flowing resources to charities and organizations.

The display device can have a touchscreen, such as a capacitive touchscreen or a resistive touchscreen. The touchscreen can enable scrolling and creating expressions, animation opportunities for a queue, and for video and full animation.

The display device can have a display with power management capabilities. The display can be dimmable. For example, the display can dim or turn off and turn on per a schedule, such as a schedule selected by the user, or upon a trigger event, such as upon achieving a given goal (e.g., donation goal). A brightness of the display can be adjustable based on the level of ambient light. For example, at night the display may be brighter than during the day.

The display device can be mountable on and removable from a vehicle. The display device can be removably mountable on the vehicle. In some examples, the display device is mountable on and removable from a car.

An aspect of the present disclosure provides a system for displaying or projecting media selected by a user, comprising a support member that is mountable on an inanimate object; a visual curvilinear display mounted on the support member, wherein the visual curvilinear display is configured to display or project the media selected by the user, which media includes at least one of text, image and video; and a controller in communication with the visual curvilinear display, wherein the controller is programmed to direct the visual curvilinear display to display or project the media according to a display and/or location preference or schedule of the user.

In some embodiments, the inanimate object is a vehicle. In some embodiments, the support member is a frame. In some embodiments, the visual curvilinear display is modular. In some embodiments, the visual curvilinear display is flexible. In some embodiments, the system further comprises an inductively chargeable battery operatively coupled to the visual curvilinear display. In some embodiments, the visual curvilinear display is a circular, square or rectangular. In some embodiments, the visual curvilinear display is removable from the support member. In some embodiments, the support member is removably mountable on the inanimate object.

In some embodiments, the system further comprises a communications bus for bringing the visual curvilinear display in communication with the controller. In some embodiments, the communications bus is mounted on the support member. In some embodiments, the communications bus includes a communications interface that brings the visual curvilinear display in wireless communication with the controller.

In some embodiments, the controller is mounted on the support member. In some embodiments, the visual curvilinear display is a light emitting diode screen. In some embodiments, the visual curvilinear display is a projector. In some embodiments, the system further comprises a camera or sensor (e.g., optical sensor, sound sensor or accelerometer) in communication with the controller.

In some embodiments, the system further comprises an additional visual curvilinear display. In some embodiments, the additional visual curvilinear display is in communication with the visual curvilinear display.

In another aspect of the present disclosure, a method for displaying or projecting media selected by a user comprises (a) providing (i) a support member removably mounted on an inanimate object, and (ii) a visual curvilinear display mounted on the support member, wherein the visual curvilinear display is configured to display or project the media selected by the user, which media includes at least one of text, image and video; (b) accessing a display and/or location preference or schedule of the user in computer memory; and (c) using the visual curvilinear display to display or project the media according to the display and/or location preference or schedule of the user.

In some embodiments, the method further comprises receiving input from the user to display or project the media. In some embodiments, the input is received on the visual curvilinear display or an electronic device of the user. In some embodiments, the method further comprises receiving the preference or schedule from the user, and storing the preference or schedule in the computer memory.

Another aspect of the present disclosure provides a system for analyzing response to media from a user, comprising a support member that is mountable on an inanimate object; a display member mounted on the support member, wherein the display member is configured to display or project the media selected by the user, which media includes at least one of text, image and video; a sensor that collects one or more signals that are indicative of a response of at least one individual to the media displayed or projected by the display member; and a controller in communication with the display member and the sensor, wherein the controller is programmed to (i) direct the display member to display or project the media, (ii) receive the one or more signals from the sensor and (iii) determine the response based at least in part on the one or more signals received from the sensor. In some embodiments, the at least one individual includes the user.

In some embodiments, the inanimate object is a vehicle. In some embodiments, the display member is a display screen. In some embodiments, the display screen is curvilinear or flexible. In some embodiments, the system further comprises a camera in communication with the controller.

In some embodiments, the controller is programmed to determine a score indicative of a quality of a relationship value between the user and the at least one other individual based at least in part on the response. In some embodiments, the controller is programmed to determine one or more waypoints between transitions from one quality of relationship value to another quality of relationship value. In some embodiments, the quality of relationship value is selected from the group consisting of trust, confidence, engagement, value creation, breakdown, lethargy, apathy and compliance.

In some embodiments, the controller is programmed with a relationship analysis engine that determines or quantifies a quality of one or more relationships between the user and one or more other persons or entities.

In another aspect of the present disclosure, a method for analyzing response to media from a user comprises (a) providing (i) a support member that is mounted on an inanimate object, (ii) a display member mounted on the support member, wherein the display member is configured to display or project the media selected by the user, which media includes at least one of text, image and video, and (iii) a sensor that collects one or more signals that are indicative of a response of at least one individual to the media displayed or projected by the display member; (b) using the display member to display or project the media; (c) receiving the one or more signals from the sensor; and (d) determining the response based at least in part on the one or more signals received from the sensor.

In some embodiments, the method further comprises determining a score indicative of a quality of a relationship value between the user and the at least one individual based at least in part on the response. In some embodiments, the method further comprises determining one or more waypoints between transitions from one quality of relationship value to another quality of relationship value.

Another aspect of the present disclosure provides a computer system comprising one or more computer processors and computer memory coupled thereto, the computer memory comprising machine executable code that, upon execution by the one or more computer processors, implements any of the methods above or elsewhere herein.

Another aspect of the present disclosure provides a computer readable medium comprising machine executable code that, upon execution by one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
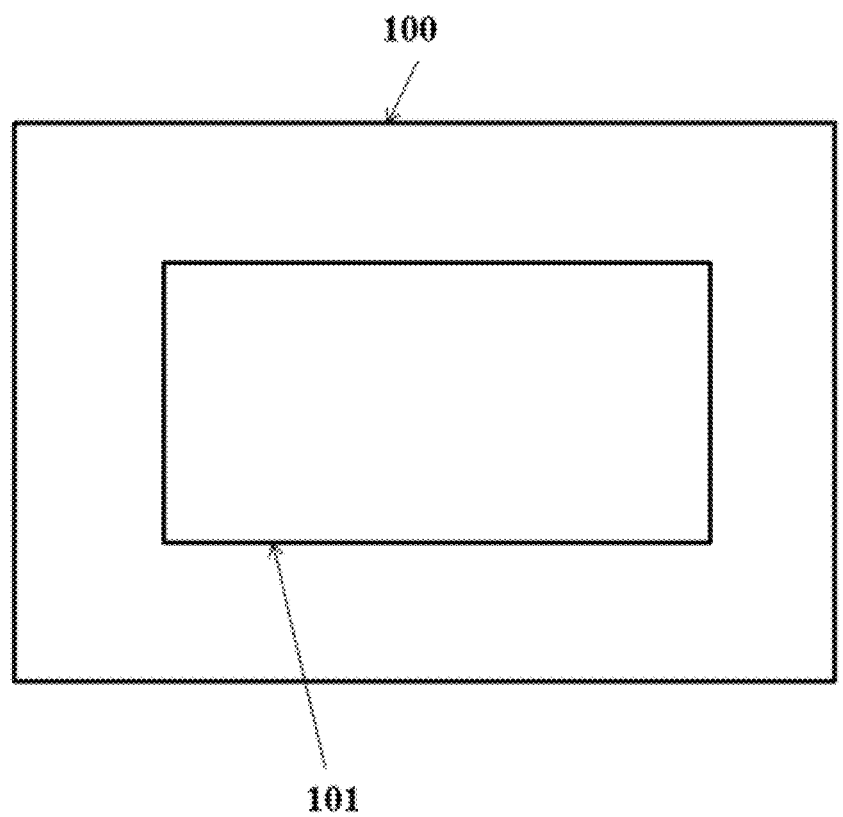
FIG. 1 shows a display device with a display screen.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "media," as used herein, generally refers to text, sounds, image or video. Media can include a combination of text, sounds, image and/or video. Media can include text and image, text and video, or video. Examples of media include text files, audio files, images files, or video files. Media may be editable by a user. Media can include advertising.

As used herein, the term "engine" refers to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of its drivers. The drivers may or may not be considered part of the engine, but the distinction is not critical.

As used herein, the term "database" is used broadly to include any known or convenient approach for storing data, whether centralized or distributed, relational or otherwise.

As used herein, a "mobile device" includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving the signal, decoding if needed, exchanging information with a transaction server to verify the buyer and/or seller's account information, conducting the transaction, and generating a receipt. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the terms "social network" and "SNET" comprise a grouping or social structure of devices and/or individuals, as well as connections, links and interdependencies between such devices and/or individuals. Members or actors (including devices) within or affiliated with a SNET may be referred to herein as "nodes", "social devices", "SNET members", "SNET devices", "user devices" and/or "modules". In addition, the terms "SNET circle", "SNET group" and "SNET sub-circle" generally denote a social network that comprises social devices and, as contextually appropriate, human SNET members and personal area networks ("PANs").

As used herein, the term "screen" generally refers to a display that can provide media for view by a user. The screen can be associated with an inanimate object, such as a vehicle, bumper sides of vehicles, helmets, surfaces of the vehicle which face the public and allow for the public and others in the vehicle or exterior of the vehicle to see and or read whatever is displayed at the screen. A screen can be a window. A screen can also be in stationary places.

As used herein, the term "computer" is a device that can be programmed to carry out a finite set of arithmetic or logical operations. The computer can be programmed for a tailored function or purpose. Since a sequence of operations can be readily changed, the computer can solve more than one kind of problem. A computer can include of at least one processing element, typically a central processing unit (CPU) with one form of memory. The processing element carries out arithmetic and logic operations. A sequencing and control unit can be included that can change the order of operations based on stored information. Peripheral devices allow information to be retrieved from an external source, and the result of operations saved and retrieved.

As used herein, the term "Internet" is a global system of interconnected computer networks that use the standard Internet protocol suite (TCP/IP) to serve billions of users worldwide. It may be a network of networks that may include millions of private, public, academic, business, and government networks, of local to global scope, that are linked by a broad array of electronic, wireless and optical networking technologies. The Internet carries an extensive range of information resources services, such as the inter-linked hypertext documents of the World Wide Web (WWW) and the infrastructure to support email. The communications infrastructure of the Internet may include its hardware components and a system of software layers that control various aspects of the architecture.

As used herein, the term "extranet" is a computer network that allows controlled access from the outside. An extranet can be an extension of an organization's intranet that is extended to users outside the organization that can be partners, vendors, suppliers, in isolation from all other Internet users. An extranet can be an intranet mapped onto the public Internet or some other transmission system not accessible to the general public, but managed by more than one company's administrator(s). Examples of extranet-style networks include but are not limited to: LANs or WANs belonging to multiple organizations and interconnected and accessed using remote dial-up; LANs or WANs belonging to multiple organizations and interconnected and accessed using dedicated lines; Virtual private network (VPN) that is comprised of LANs or WANs belonging to multiple organizations, and that extends usage to remote users using special "tunneling" software that creates a secure, in some cases encrypted network connection over public lines, sometimes via an ISP.

As used herein, the term "Intranet" is a network that is owned by a single organization that controls its security policies and network management. Examples of intranets include but are not limited to: a local area network (LAN); wide-area network (WAN) that may be comprised of a LAN that extends usage to remote employees with dial-up access; WAN that is comprised of interconnected LANs using dedicated communication lines; virtual private network (VPN) that is comprised of a LAN or WAN that extends usage to remote employees or networks using special "tunneling" software that creates a secure, in some cases encrypted connection over public lines, sometimes via an Internet Service Provider (ISP).

For purposes of the present disclosure, the Internet, extranets and intranets collectively are referred to as ("Network Systems").

As used herein, the term "user" includes, but is not limited to, a person that uses devices, systems and methods of the present disclosure. A user may be a person interested in maintaining health, interested in maintaining a healthy lifestyle and/or physiologic balance, interested in monitoring lifestyle conditions, including but not limited to, the way a person goes about daily living including but not limited to, habits, exercise, diet, medical conditions and treatments, career, financial, emotional status, and the like. The user may be under a physician's care.

In one embodiment a user can see another screen that he/she likes and there is a way to upload it to the user's own display and join in for sharing the message.

Display devices of the present disclosure enable a user to have self-expression. The self-expression may be changeable, and may be in the form of words, images, video and combinations thereof.

In one embodiment the screen is a physical screen that attaches to a rear window of a car, truck, bus, or any other equivalent vehicle, or stationary place like a window of a home. The screen can be a screen that attaches to a back of a motorcycle or helmet, attach to a back of a bicycle, scooter, and their associated helmets. The screen can be built into all vehicles that have windows. Images, words text and the like can be projected onto a rear window. Images, words or text can be projected onto the rear bumper of cars, trucks, motorcycles, scooters, bicycles and the like. The screen can be built into the rear bumper itself. Images, words and text can be projected onto the side of any of the preceding vehicles mentioned herein, including but not limited to trucks from a mini projector. The screen can be a traveling customizable self-expression bill boards. This screen can also be used in the window of a home as an expression billboard. As previously mentioned it can be built into the rear bumper of all vehicles. In one embodiment the screen can also be a non-traditional type of screen and instead be a holograph or holograms for all of the preceding.

The screen and all of the preceding structures can provide a global connect that is offered as opportunities in all of these from a site associated with messages that can be used for the management and other associated activities of the screen as well as other structures mentioned herein.

As non-limiting examples, the present disclosure provides a dashboard for aggregate expression, revenue streams for trucks and drivers driving across country or commuting to work, communal expressions for doing good, being a part of a community and join one or more communications and/or associations of people for expression sessions.

Display Devices

An aspect of the present disclosure provides a system for displaying or projecting media selected by a user, comprising a support member that is mountable on an inanimate object and a display mounted on the support member. The display can be a visual curvilinear display. The display can be configured to display or project the media selected by the user, which media includes at least one of text, image and video. The support member and the display can be included in a display device. The system can further include a controller in communication with display. The controller can be programmed to direct the display to display or project the media according to a display and/or location preference or schedule of the user.

The inanimate object can be a vehicle, building, or other object. For example, the inanimate object is a vehicle, such as a car, truck, scooter, bicycle, or motorcycle. As another example, the inanimate object is a boat, plane or helicopter. As another example, the inanimate object is a building, such as a wall of the building or a window of the building. As another example, the inanimate object is a hat, cap, visor, sunhat, fedora, shirt, jacket, pants, headband, wristband, armband, necklace, beanie, belt loop, belt buckle, helmet (e.g., motorcycle or bicycle helmet), a backpack, a briefcase, a carrying case, a protective case (e.g., Smart phone case), a suitcase, or a cart (e.g., store cart).

For example, the inanimate object is a carrying or protective case of a mobile electronic device (e.g., Smart phone) having the display device mounted or embedded therein, such as mounted or embedded on a side of the carrying or protective case facing away from a display device of the mobile electronic device. As another example, the inanimate object is a hat having a side or rear panel and the display device mounted on or embedded in the side or rear panel.

An orientation of the display device can be adjustable. In some examples, the user can twist or tilt the display device. For example, the display device can be oval and initially mounted on the inanimate object with its longitudinal axis oriented from a top to a bottom portion of the inanimate object, and the user can rotate the display device by ninety degrees such that the longitudinal axis is oriented from a left to a right portion of the inanimate object.

The display device can have a single section to display or project a single media (e.g., expression). As an alternative, the display device can have multiple sections (e.g., a side section, middle section and another side section) to display media in each section, such as different media in each section.

The display device can have an electronic display screen. For example, the display device can have a touchscreen, such as a capacitive touchscreen or a resistive touchscreen. The touchscreen can enable scrolling and creating expressions, animation opportunities for a queue, and for video and full animation. As an alternative, the display device can have one or more projectors that project media (e.g., an expression), such as to a display surface of the inanimate object.

The inanimate object can be mounted or mountable on an animate object, such as a human. The display device can be mounted or mountable on the inanimate object, or embedded in a body of the inanimate object. For example, the display device can be embedded in a body (e.g., side panel or window) of a vehicle.

The support member can be a frame. The frame can have various shapes and dimensions. The frame can have a shape that is circular, oval, elliptical, triangular, square, rectangular, or partial shapes or combinations thereof. In some examples, the support member is circular or elliptical. In some cases, the support member can have a size that is from about 0.1 meter (m) to 50 m, or 1 m to 10 m. The support member can have a size that is at least about 0.1 m, 1 m, 5 m, 10 m, 20 m, 30 m, 40 m or 50 m.

The display can be modular. This can enable the display to couple with other components, such as other displays. In some cases, the system can include one or more additional displays. The one or more additional displays can be in communication with the display. For example, each additional display can be mountable on the support member or a separate support member. If a separate support member is employed, the separate support member may be mountable on the support member, or vice versa. For example, support members can include mounting members (e.g., clips or interlocks) on their sides that enable the support members to be coupled to one another to form larger display devices. Once coupled, the individual display devices can provide separate media or communicate with one another to provide the same media or portions of the same media. For example, portions of a single image can be displayed through the individual devices.

The display and/or support member can be flexible. This can enable a user to bend or twist the display and/or support member, as desired. The user can shape the display and/or support member into any desired or predetermined shape or configuration.

The system can include an energy storage device, such as a battery, operatively coupled to the display and/or the controller. The battery can be a solid state battery, such as a lithium ion battery. The battery can be chargeable, such as through a charging port of the system, e.g., through a universal serial bus (USB) port. As an alternative or in addition to, the battery can be inductively chargeable.

The display can have various shapes and sizes. The display can be triangular, circular, oval, elliptical, square, rectangular, or partial shapes or combinations of shapes thereof. In some examples, the display is circular or elliptical.

In some examples, the display is a visual curvilinear display with circular or oval, or has circular or oval features. For example, the display is circular or substantially circular, or is of another shape (e.g., square or rectangular) with sides or corners that are partially or fully circular.

The display can be removable from the support member. As an alternative, the display is not removable from the support member. The support member can be removably mountable on the inanimate object. As an alternative, the support member is not removable from the inanimate object.

The system can include a communications bus for bringing the display in communication with the controller. The communications bus can be a circuit board, such as a PCB. The communications bus can be mounted on the support member. In some examples, the communications bus includes a communications interface (e.g., Bluetooth or WiFi) that brings the display in wireless communication with the controller.

The controller can be mounted on the support member. In some examples, the controller is unitary or integrated with the support member. As an alternative, the controller can be separable from the support member.

In some examples, the support member is formed of a polymeric material, such as a thermoplastic. The display can be formed of a light emitting diode (LED), such as an organic LED (OLED). The controller can include a printed circuit board (PCB) that can be flexible. As an alternative, the display is a projector that can project the media to a display surface, such as an article of clothing or other object (e.g., display screen).

The system can include a camera in communication with the controller. The camera can be a charge-coupled camera (CCD). The camera can enable capture of images or video of the user or other objects, such other individuals. This can enable the system to gauge response to the media.

The controller can be programmed to orient the media such that it is displayed or projected through the display at an orientation selected by the user. This can enable the user to mount the support member on a body of the user without concern for the media being displayed or projected in an intended manner. As an alternative or in addition to, the controller can be programmed to orient the media such that it is displayed or projected through the display along a direction that is parallel to the gravitational acceleration vector.

The system can include a gyroscope. The gyroscope can enable the controller to determine the orientation of the display.

The system can include an acceleration member that measures proper acceleration. The acceleration member can be an accelerometer. The acceleration member can be operatively coupled (e.g., in communication with) the controller.

The system can include one or more sensors operatively coupled to the display device or included in the display device. A sensor can be an optical sensor, sound sensor, vibration sensor, accelerometer, or geolocation sensor (e.g., GPS). The system can include a camera. For example, the display device is mounted on a front panel of a hat and one or more sensors are mounted on side and rear panels of the hat. The one or more sensors enable the media on the display device to be changed upon a trigger event, such as, for example, movement detected by the one or more sensors or a change in ambient lighting conditions.

Another aspect of the present disclosure provides a method for displaying or projecting media selected by a user, comprising providing (i) a support member removably mounted on an inanimate object, and (ii) a display mounted on the support member. The display can be as described above or elsewhere herein. For example, the display can be configured to display or project the media selected by the user, which media includes at least one of text, image and video. Next, a display and/or location preference or schedule of the user can be accessed in computer memory. Next, the visual curvilinear can be used to display or project the media according to the display and/or location preference or schedule of the user.

The media can be oriented such that it is displayed or projected through the display at an orientation selected by the user. The median can be oriented such that it is displayed or projected through the display along a direction that is parallel to the gravitational acceleration vector.

The method can include receiving input from the user to display or project the media. The input can be received on the display or an electronic device of the user.

The method can include receiving the display and/or location preference or schedule from the user. The display and/or location preference or schedule can be stored in the computer memory. The display and/or location preference or schedule can be received from a mobile electronic device of the user.

The method can include detecting motion of the user. The media can be displayed or projected upon detecting the motion.

Display devices (e.g., wearable devices) of the present disclosure can include various features. A display device can have a display with a touchscreen (e.g., capacitive touchscreen), a GPS, and an accelerometer. The accelerometer may be used, for example, for movement detection and power management, as well as making sure that an image (or expression) on the display is always properly oriented (e.g., north/south or up/down). The display can be for customizable self-expression and connecting to a platform to allow for connection options. The display device may be readily mountable on the user or other object, and may be readily removable from the user or other object. The display device may be mountable with a magnet, which can allow the user to mount and remove the display device without having to take off the magnets. As an alternative, the display device may be mountable with a suction unit (e.g., one or more suction cups), which may permit the display device to be mounted to a substantially flat surface (e.g., glass surface), for example. The display device can have an energy storage unit, such as a battery. The display device may be at least partially or fully powered by solar energy. In such a case, the display device can include solar cells. The display device may have an electronic paper display ("E ink") which may have electrophoretic ink. Such a display may be a bistable display that may be usable for reduced or low power consumption.

Reference will now be made to the figures, wherein like numerals refer to like parts throughout. It will be appreciated that the figures and features therein are not necessarily drawn to scale.

FIG. 1 shows a display device 100 with a display screen 101. The display device 100 can be as described above. The display screen 101 can have various shapes and sizes. For example, the display screen 101 can be curvilinear (e.g., circular or oval). The display device 100 and the display screen 101 can have various form factors. For example, the display device 100 can be in the form of a pin or button.

Figure 2:
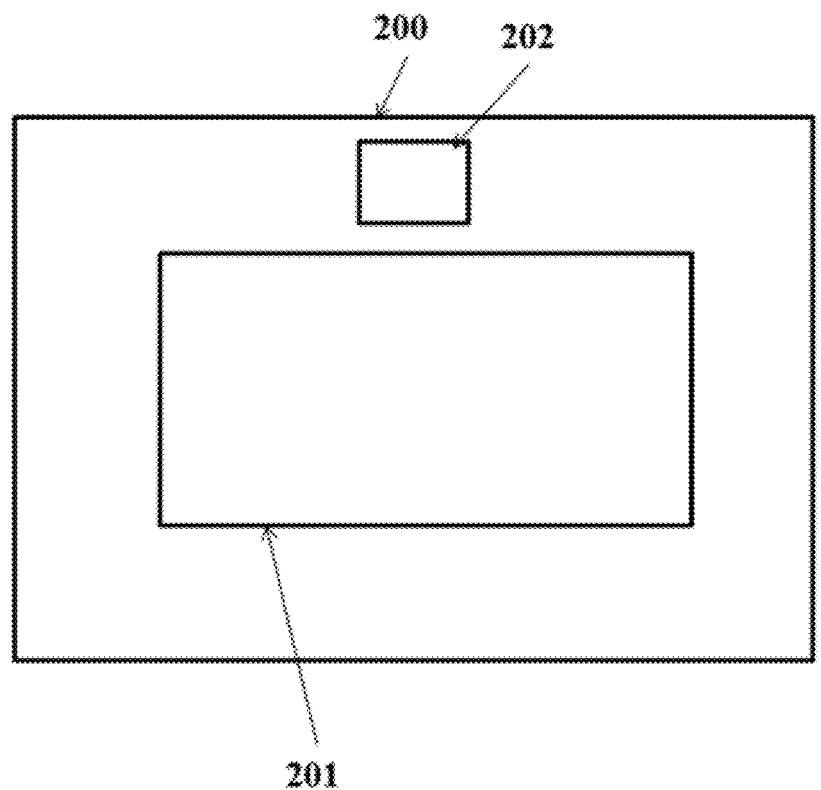
FIG. 2 shows another display device with a display screen.

FIG. 2 shows a display device 200 with a display screen 201. The display device 200 can be as described above. The display screen 201 can have various shapes and sizes. For example, the display screen 201 can be curvilinear (e.g., circular or oval). The display device 200 further includes a sensor 202. The sensor 202 can capture various signals from the user or an environment of the user, such as light or sound. The sensor 202 can be a camera, which can capture images or video from the user or other objects, such as other individuals. The display device 200 and the display screen 201 can have various form factors. For example, the display device 200 can be in the form of a pin or button.

Figure 3:
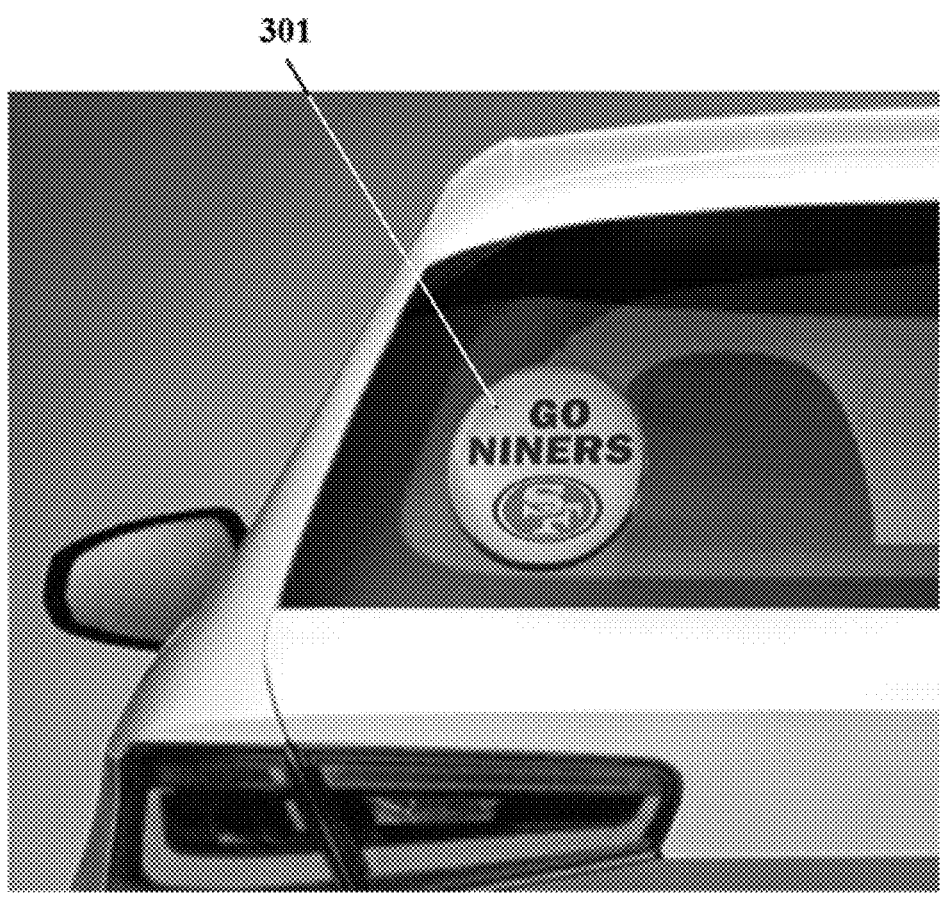
FIG. 3 shows a display device mounted on a rear window of a vehicle.

Display devices of the present disclosure are mountable on various objects, such as buildings and vehicles. FIG. 3 shows a display device 301 mounted on or embedded in a rear window of a vehicle. The display device is circular, but other shapes may be used. For example, the display device can be triangular, square or rectangular. The display device may be mounted inside or outside the vehicle against the rear window. The display device can be mounted on various other locations of the vehicle, including, without limitation, the bumper (e.g., the display device can be a bumper sticker) or other windows (e.g., side windows or front window) of the vehicle. The display device 301 may be mounted on a portion of a window of the vehicle.

Figure 29A:
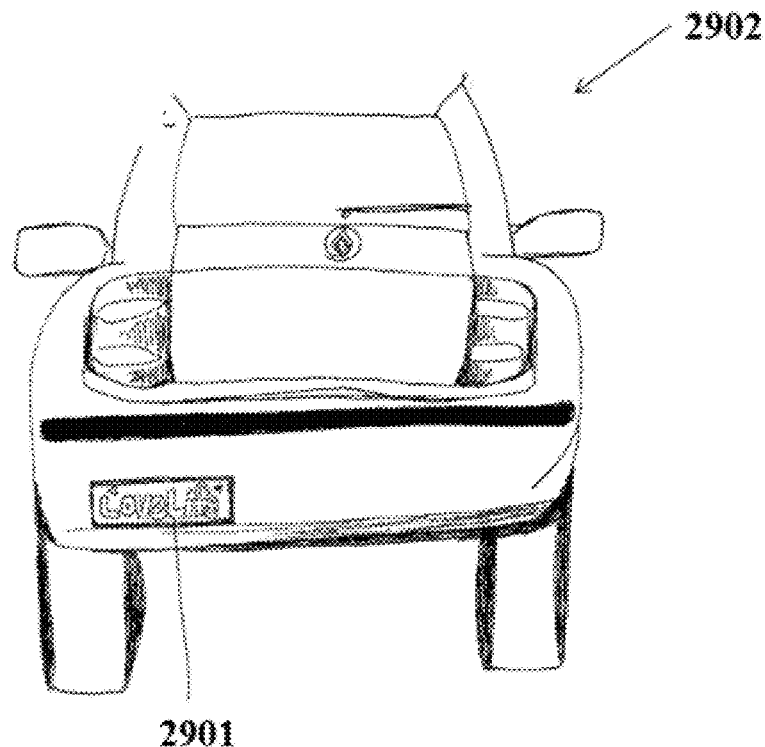
FIGS. 29A and 29B show a display device mounted on a vehicle.
Figure 29B:
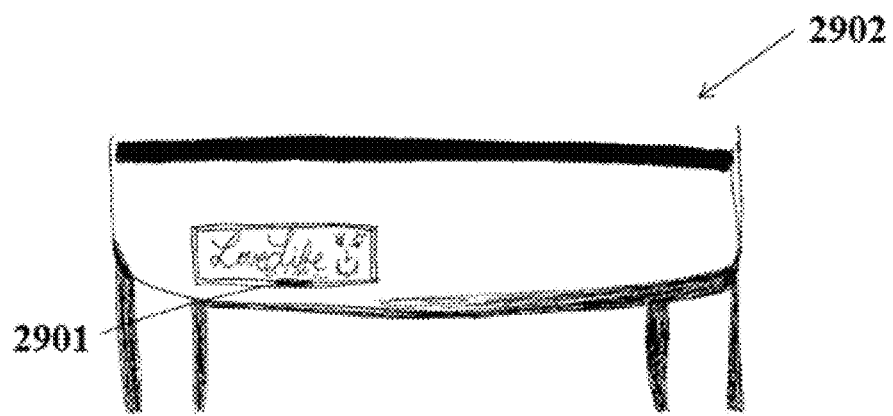

FIGS. 29A and 29B show a display device 2901 mounted on a vehicle 2902. The display device displays or projects an expression containing media ("LoveLife"). The display device 2901 can be mounted at various locations of the vehicle 2902, such as a window or vehicle body. The display device 2901 can include a support member that enables the display device to be mounted on the vehicle 2902, in some cases removably mounted on the vehicle 2902. The support member can include a magnetic or suction attachment for mounting to the vehicle.

The display device 2901 can be powered by a battery. As an alternative or in addition to, the display device 2902 can be power by a solar cell.

The display device 2901 may be relatively non-obstructive with respect to a body or window of a vehicle. The display device 2901 may occupy a relatively small fraction of a surface area of the vehicle. For example, the display device 2901 may occupy at most 20% of a surface area of the vehicle. This may enable a user to display or project media (e.g., an expression) in a manner that may not be distracting to other drivers, yet enabling the user to display the media, such as according to a display schedule or preference of the user.

The display device 2901 may be mountable on the vehicle 2902 using various attachment units, such magnetic, suction or adhesive units. The display device 2901 can be mounted on a bumper (e.g., front or rear), front window or windshield, rear window (see, e.g., FIG. 3), side windows, doors or roof of the vehicle 2902. The display device can be mounted inside or outside of the vehicle 2902. For example, the display device can be mounted inside of a rear window of the vehicle 2902 or a side window of the vehicle 2902.

The display device 2901 can have various features. For example, the display device 2901 may be dimmable. Media may be displayed or projected by the display device when the vehicle 2902 is travelling at or below a given threshold speed, such as less the 30 miles per hour (MPH), when the vehicle 2902 has stopped or approaching a speed of 0 MPH, or when the vehicle 2902 is decelerating. The display device 2901 may detect the speed or acceleration or deceleration of the vehicle 2902 as a trigger event to present or hide media, or change media. For example, media may be presented when deceleration of the vehicle 2902 is detected. This can permit the display device 2901 from not distracting other drivers. The display device 2901 can include an accelerometer to detect motion and a geolocation unit (e.g., GPS) to determine speed.

The display device 2901 may have a sensor that detects light. The display device may have a brightness that increases or decreases per a display and/or location preference or schedule of the user, or other factors, such as time. For example, the display device 2901 may decrease the brightness at night and increase the brightness during the day, or vice versa. The brightness may be increased or decreased based on whether light is projecting onto the display device 2901. For example, in situations in which headlight from another car is shining on the display device 2901, the brightness may be increased.

The display device can display media (e.g., an expression) at a surface or can project the media on the surface. The display surface can be dedicated or allocated for display or projection of the media. In some examples, the display device can project the media on a surface of a body of a vehicle. For example, the display device projects the media on a back panel of a truck. As another example, the display device displays or projects the media on a window of a vehicle.

A display device can be embedded in a body of an inanimate object. For example, with reference to FIGS. 29A and 29B, the display device 2901 can be embedded in a body of the vehicle 2902. As an alternative, the display device 2901 can be on the license plate or license plate holder. The display device 2901 can be a display screen (e.g., LED screen) or a projector that projects onto a display surface.

The present disclosure provides a display device that can provide the ability to have self-expression, with the self-expression being changeable, and is in the form of words, images and combinations thereof.

In another embodiment the screen provides an ability to have individual creative self-expression, with the self-expression being changeable, and is in the form of words, images and combinations thereof.

The present disclosure provides a screen that may enable a user to have dynamic individual creative self-expression, in the form of words, images and combinations thereof, and enables connection. The screen may provide the ability to have dynamic individual creative self-expression in the form of words, images, video and combinations thereof, and enable manifestation in a variety of different forms.

The present disclosure provides a mountable and customizable digital display device that can combine technology and fashion to offer the user an opportunity for creative self-expression, connection and manifestation. In some cases, a display device includes a screen that provides, for example, a tangible delivery system of a message, and or figure to create expression.

The screen displays images, complex words and messages, and text, uploads, displays, ends wirelessly. The screen can use a user's or a third party's mobile device to communicate. The screen is in communication with the mobile device.

In one embodiment the screen is a crown that may change color based on information received.

In various embodiments the screen can include a display or screen that can be flexible.

In other embodiments the screen can be utilized by a screen user with an ability to impact positive social and environmental change through intentionally and expression from personal to global. In one embodiment a display is customizable for the purpose of self-expression and the greater good. It can be used to express, connect and manifest positive change.

A display device can provide individuals (e.g., users) the ability to voice and express what is important to them. For example, a display device can be used on a vehicle as a mini customizable billboard. The display device can provide the user with the opportunity to be heard, counted and has their opinions and intentions mean something through creative customizable self-expression which they is displayed in a window.

Display devices of the present disclosure may enable individuals to collectively create outcomes for their lives. Such display devices may enable individuals to have positive experiences and create all kinds of intentions and expressions which yield different energies and results that effect and impact what their experience of life is like, the results of how they feel and what they accomplish throughout their day, week, month and lifetime. Some intentions, expressions and energies are powerful and easily recognizable, while others are more subtle and often only intuitively felt.

Display devices of the present disclosure can provide the opportunity to support connection, being counted, in an aggregate dashboard of all the users of our device to reflect the collective mood and different expressions of the users. In one embodiment users of the device connect with potential revenue streams based on what they are expressing on their devices, including but not limited to a walking or traveling billboard. Organizations may be able to connect with users of display devices for the purpose of communal expressions, such as sharing and uploading other users' messages, and joining with other users via their associated screens.

Flexible Displays

Display devices of the present disclosure may have flexible displays. The flexible displays may be composed of one or more flexible layers and may be mounted on top of or under a cover layer. For example, a flexible display may be mounted on top of a rigid support member or may be mounted on the underside of a rigid cover layer. The display may be mounted on a rigid surface or a surface that is not rigid.

Electronic devices may also be provided with user interface components (input-output components) such as buttons, microphones, speakers, piezoelectric actuators (for receiving electrical input from a user or tactile feedback to users), or other actuators such as vibrators, pressure sensors, and other components. These components may be mounted under portions of a flexible display.

During operation of the electronic device, the flexibility of the display may allow a user to interact with the component through the display. For example, sound waves from a speaker or localized vibrations from an actuator in an electronic device may pass through the flexible display. The flexible display may also allow an internal microphone, pressure sensor, or force sensor (or other internal components) to receive external input. For example, a user may deflect a flexible display using a finger or other external object, barometric pressure may be monitored through the flexible display, or sound waves may be received through the flexible display.

Components may receive input or may supply output through a physically deformed portion of the flexible display (e.g., a deformation that occurs when a user presses on the display to compress the component). In some configurations, a portion of the flexible display may serve as a membrane that forms part of a microphone, speaker, pressure sensor, or other electronic component.

The ability of a user to compress a component such as a button switch by deforming the flexible display may allow the area of a device available for visual display to be enlarged. For example, the active area of a flexible display may overlap a component such as a button or speaker.

If desired, a flexible display may be deformed by an internal component to provide audio or tactile feedback to a user. For example, structures inside an electronic device may be pressed against portions of a flexible display to temporarily create an outline for a virtual on-screen button or to temporarily create a grid of ridges that serve to delineate the locations of keys in a keyboard (keypad).

Display Components

Another aspect of the present disclosure provides a system for analyzing response to media from a user, comprising a support member that is mountable on an inanimate object and a display member mounted on the support member. The display member can be configured to display or project the media selected by the user, which media includes at least one of text, image and video. The system can include a sensor that collects one or more signals that are indicative of a response of at least one individual to the media displayed or projected by the display member. The system can include a controller in communication with the display member and the sensor. The at least one individual can include the user. The controller can be programmed to (i) direct the display member to display or project the media, (ii) receive the one or more signals from the sensor and (iii) determine the response based at least in part on the one or more signals received from the sensor.

The inanimate object can be a vehicle, building, or other object. For example, the inanimate object is a vehicle, such as a car or truck. As another example, the inanimate object is a boat, plane or helicopter. As another example, the inanimate object is a building.

The display member can be a display screen, as described above or elsewhere herein. The display member can be curvilinear or flexible. For example, the display member can be a visual curvilinear display.

The system can include a camera in communication with the controller. The controller can be programmed to determine a score indicative of a quality of a relationship value between the user and the at least one other individual based at least in part on the response. The controller can be programmed to determine one or more waypoints between transitions from one quality of relationship value to another quality of relationship value. The quality of relationship value can be selected from the group consisting of trust, confidence, engagement, value creation, breakdown, lethargy, apathy and compliance. The controller can be programmed with a relationship analysis engine that determines or quantifies a quality of one or more relationships between the user and one or more other persons or entities.

In another aspect, a method for analyzing response to media from a user comprises providing (i) a support member that is mounted on an inanimate object, (ii) a display member mounted on the support member, wherein the display member is configured to display or project the media selected by the user, which media includes at least one of text, image and video, and (iii) a sensor that collects one or more signals that are indicative of a response of at least one individual to the media displayed or projected by the display member. Next, the display member can be used to display or project the media. Next, the one or more signals can be received from the sensor. The response can then be determined based at least in part on the one or more signals received from the sensor.

The method can include determining a score indicative of a quality of a relationship value between the user and the at least one individual based at least in part on the response. One or more waypoints can be determined between transitions from one quality of relationship value to another quality of relationship value.

The present disclosure provides various displays for use with systems and methods of the present disclosure. In one embodiment, a display device includes an electronic circuit stratum with signal transmitting components for transmitting user input signals to a display signal generating device for controlling display information transmitted from the display signal generating device. Signal receiving components receive the display information transmitted from the display signal generating device. Display driving components drive the display layer according to the received display information. A user input receives user input and generates the user input signals. A battery provides electrical energy to the electronic circuit stratum, the user input and display components. The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display and the second display information at a second location on the display stratum. At least some of the components in the battery, display, user input and electronic circuit stratums are formed by printing electrically active material to form circuit elements including resistors, capacitors, inductors, antennas, conductors and semiconductor devices.

The battery may comprise a first current collector layer; an anode layer; an electrolyte layer; a cathode layer and a second current collector layer. The electrolyte material may be microencapsulated. This feature may make the battery particularly suitable for formation by a printing method, such as inkjet printing, laser printing, magnetically reactive printing, electrostatically reactive printing, or other printing methods that are adaptable to the use of microencapsulated materials. The battery is formed substantially over the entire top surface of the flexible substrate. By this construction, the inventive wireless display device may be formed as thin as possible, while having suitable battery power density, and while being provided with the advantageous electronic shielding qualities provided by the battery layers. The user input may comprise a grid of conductive elements each conductive elements for inducing a detectable electrical signal in response to a moving magnetic field. The user input may comprise a touch screen formed by printing pressure sensitive or capacitance sensitive elements on an insulative layer.

The display may include conductive leads connected with each light emitting pixel for applying the electrical energy selectively to each light emitting pixel under the control of the display driving components.

The signal receiving components may include first radio frequency receiving components for receiving a first display signal having first display information carried on a first radio frequency and second radio frequency receiving components for receiving a second display signal having second display information carried on a second radio frequency. The display driving components may include signal processor components for receiving the first display signal and the second display signal and generating a display driving signal for simultaneously displaying the first display information at a first location on the display and the second display information at a second location on the display stratum.

At least some of the components in the electronic circuit are formed by printing electrically active material to form circuit elements including resistors, capacitors, inductors, antennas, conductors and semiconductor devices.

A content formatting method of formatting substantially static display content is disclosed that greatly reduces the onboard processing capacity required by the wireless display. This content formatting method is effective for enabling a large number of simultaneous users. The source computer composes the substantially static display content into a video frame of information. The wireless display only needs as much memory as is needed to store the desired number of single frames of video information.

In one embodiment the display includes light emitting pixels for displaying information. In one embodiment the light emitting pixels are formed by printing a pixel layer of light-emitting conductive polymer.

In one embodiment, a user's displayed expression, connection and manifest for positive change. profile is received by one or more processors at the back-end where one or more of the following are performed: (i) extraction of unique features of the expression, connection and manifestation, and being counted as part of an aggregate dashboard reflection; (ii) enhances distinguishing aspects of the expression, connection and manifestation; and (iii) compression of data related to the expression, connection and manifestation. The one or more processors can compare received data from the window with that in a database.

In one embodiment the display/screen is made larger through the use of optical components and creates a projection exterior to the display/screen. In one embodiment the display/screen can project out in front of the wearer's head. The screen may be clear in color, black, white or change colors when not being used.

In one embodiment colors are used for the window as a key code for that provide, individual creative self-expression, connection, manifestation The window can include add-ons, a GPS camera and the like. The window may have sufficiently dimensionality to hold a display or screen coupled or included with it.

As non-limiting examples, the window can be made of a variety of materials including but not limited to: recycled materials, cloth from different things; plastics; natural materials, an eco-friendly material and the like.

In one embodiment the window houses the components, including electronics that drives the display. An energy source, including but limited to one or more batteries, can be included. As non-limiting examples, other energy sources can be utilized including but not limited to: solar; walking or other motion; wind and the like. The display device can be chargeable, e.g., plugged in. In one embodiment, the display device is powered via mesh technology.

The display can be positioned on the front, back, side and the like and can be detachable. The display can be made of flexible and non-flexible materials including but not limited to glass, plastics and the like.

The display can be different sizes shapes. In one embodiment the display is light sensitive and change color relative to light. In one embodiment the display includes a frame to help protect it from sun reflection. In one embodiment the window or its frame is up-loadable to change color. The display can be flat, protrude out to some degree, and be a visor and the like to make it more viewable.

In one embodiment the screen with its display/screen can change colors. This can be achieved through the use of LED's and the like. All or a portion of the window can change color.

In one embodiment the screen it can change colors both at the screen level and the entire screen or embodiment adjacent to the screen which can be based on sound, and other extremities which can influence the user. This may be similar or identical to a sound responsive sculpture.

The screen can include additional electronic components including but not limited to, a camera, in or behind the screen, GPS functionality and the like, and can do everything that a mobile device can do. In one embodiment, the screen does not need the full power of a mobile device.

The screen can communicate with a telemetry site with a backend. The telemetry site can include a database of identification references, including user activity, performance and reference information for each user, and/or for each sensor and location. The user activity, performance metrics, data and the like captured by system can be recorded into standard relational databases SQL server, and/or other formats and can be exported in real-time. All communication is done wirelessly.

The telemetry system provides a vehicle for a user to: (i) set up its profile which can include their basic information, use that provide, individual creative self-expression, connection, manifestation intentions; (ii) create and upload what the user wants to upload such as images, pictures, text and combinations thereof; and (ii) look at third parties self-expression, connections and manifestations.

It is noted that when something has political fire or interest they often change their social network profiles. Display devices of the present disclosure can be used for such purposes and as a supplement. Display devices of the present disclosure can be used to join a communal expression, political or social, etc.

The present disclosure provides an aggregate dashboard of what people are sharing; takes this natural behavior and implement it in the virtual and physical world; uploads social media information, pictures, messages and images; provides a mechanism to communicate with organizations; and connects all of this to different organizations that can then take action.

In some cases, individuals can join community organizations that share similar values and goals, participate in an eco-system of shared expressions, be part of an aggregate dashboard that sees all of this and determines the mood derived from the expressions of users. This is reflected back into your social networks.

Display devices of the present disclosure can be used to create revenue streams for the user by logging into and sharing personal information with companies that will pay for their message to be worn for periods of time based no exposure. Walking billboards and revenue flow based on wearers impact for advertiser. This may provide the opportunity for paid and unpaid communal expression and advertising for revenue. Users can purchase others creations and use them and 'like' them.

Figure 4:
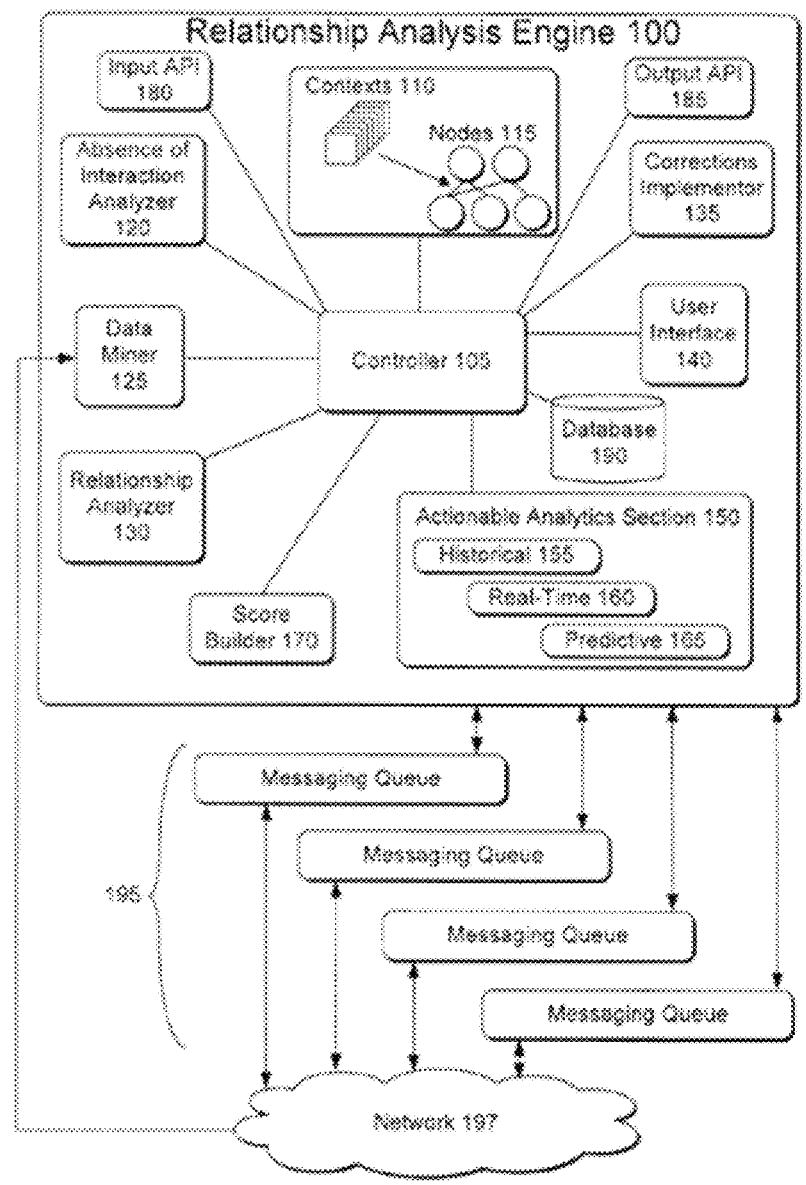
FIG. 4 illustrates a block diagram of a relationship analysis engine according to one embodiment of the present disclosure.

The present disclosure provides software that enables media to be displayed or projected using display devices provided herein. FIG. 4 illustrates a block diagram of a relationship analysis engine 100. The relationship analysis engine 100 can include a controller 105. The controller 105 is coupled to or otherwise associated with several different components, which can contribute to determining and quantifying the quality of one or more relationship between different persons or entities. The controller 105 can include a processor, circuit, software, firmware, and/or any combination thereof. Indeed, any of the components of the relationship analysis engine 100 can include a processor, circuit, software, firmware, and/or any combination thereof. It will be understood that one or more of the components of the relationship analysis engine 100 can be part of or otherwise implemented by the controller 105.

A data miner 125 is coupled to or otherwise associated with the controller 105 and can mine relationship information on a network (e.g., 197), such as Systems Network. The data miner 125 can determine or otherwise define a plurality of sender nodes, such as nodes 115. Each sender node represents a sender of a message, as further described in detail below. In addition, the data minder 125 can determine or otherwise define a plurality of recipient nodes, such as nodes 115. Each recipient node represents a receiver of a message, as further described in detail below.

The data miner 125 can automatically determine one or more contexts 110 in which each message is transmitted between a sender node and a recipient node. A context can include, for example, a work-related context, a personal friendship context, an acquaintance context, a business transaction context, or the like. The data miner 125 can also automatically determine a timing sequence for when each message is transmitted between the sender node and the recipient node.

An actionable analytics section 150 is coupled to or otherwise associated with the controller 105 and can analyze messages that are transmitted between the sender nodes and the recipient nodes. The messages can be received directly from one or more message queues such as message queues 195, analyzed, and returned to the message queues. Alternatively, the messages can be received over the network 197 by the data miner 125. The actionable analytics section 150 can produce historical analytics 155, real-time analytics 160, and predictive analytics 165 associated with at least one relationship based on the analyzed transmitted messages, the mined relationship information, the one or more contexts 110, and/or the timing sequence. The actionable analytics section 150 can also generate a relationship indicator for the relationship, which can include different icons, patterns, and/or colors representing past, present, and predictive quality of relationship values, as further described in detail below.

A relationship analyzer can determine one or more waypoints between transitions from one quality of relationship value to another. Such waypoints can be scored using a score builder 170. In addition, the quality of relationship values themselves can be assigned a score using the score builder 170. The scores can be used in determining the past, present, and predictive quality of relationship values, as further described in detail below. The relationship analyzer can be coupled to or otherwise associated with the controller 105, and can determine whether the relationship is productive or non-productive. The determination of whether the relationship is productive or non-productive can be made based on the context in which the message is sent or received. The relationship analyzer can also determine the weak points and/or the strong points of a relationship.

The analysis engine 100 can include a user interface 140. The user interface 140 can receive input from a user to manually define the sender nodes and the recipient nodes (e.g., 115). In other words, constructs of sender nodes and recipient nodes can be built, which represent the persons or entities that actually send and receive messages. Moreover, the user interface 140 can receive input from a user to manually define one or more contexts 110 in which each message is transmitted between a sender node and a recipient node.

The analysis engine 100 can further include a corrections implementer 135, which can be coupled to or otherwise associated with the controller 105. The corrections implementer 135 can detect one or more inaccuracies in the mined relationship information and automatically correct such inaccuracies. For instance, if weak points of a relationship should have been assessed as strong points, or vice versa, then the corrections implementer 135 can correct such inaccuracies and thereby improve the understanding of the relationship.

In some cases, an absence of interaction can be used to draw certain conclusions. An absence of interaction analyzer can be coupled to or otherwise associated with the controller 105, and can detect such absences of interaction. For instance, if a sender node sends a message to a recipient node, and the recipient node fails to reply to the message, then a conclusion can be drawn by the absence of interaction analyzer. The conclusion can be that the recipient is simply unavailable to respond. Alternatively, the conclusion can be that there is a flaw in the relationship between the sender node and the recipient node.

The actionable analytics section 150 can produce the historical analytics 155, the real-time analytics 160, and the predictive analytics 165 using the corrected inaccuracies of the corrections implementer 135, the absence of interaction detection of the absence of interaction analyzer, and the determination of the relationship analyzer.

An input application programming interface (API) 180 provides an input interface to the relationship analysis engine 100 from one or more third party applications or software. For example, the input API 180 can allow an interface to multiple modes of data feed including video, voice, and/or text information. In addition, an output API 185 provides an output interface from the relationship analysis engine 100 to one or more third party applications or software. For example, the output API 185 can allow third party applications or software to utilize the analysis engine 100 and display information received from the analysis engine 100 in their own user interface. The analysis engine 100 can provide real-time feedback on the quality of relationships between and among the nodes through the user interface 140, the input API 180, and/or the output API 185.

The relationship analysis engine 100 can also include a database 190, which can be coupled to or otherwise associated with the controller 105. The database 190 can store any information related to any of the components of the relationship analysis engine 100, including, for example, relationship information mined by the data miner 125, historical analytics 155, real-time analytics 160, predictive analytics 165, scores generated by the score builder 170, suggestions and tracers to display specific exhibits for the scores, and the like.

The relationship analysis engine 100 can be embodied in various forms. For example, the relationship analysis engine 100 can be operated using a dedicated rack-mount hardware system associated with a datacenter. In some embodiments, the relationship analysis engine 100 operates in association with a computing device or computer. In some embodiments, the relationship analysis engine 100 is a widget that can be installed or otherwise associated with a web page. In some embodiments, the relationship analysis engine 100 is embodied as a smart-phone application. In some embodiments, the relationship analysis engine 100 is an application associated with a social network. In some embodiments, the relationship analysis engine 100 is an add-on for relationship management software such as customer relationship management (CRM) software, vendor resource management (VRM) software, and/or environmental resource management (ERM) software, or the like.

Figure 5:
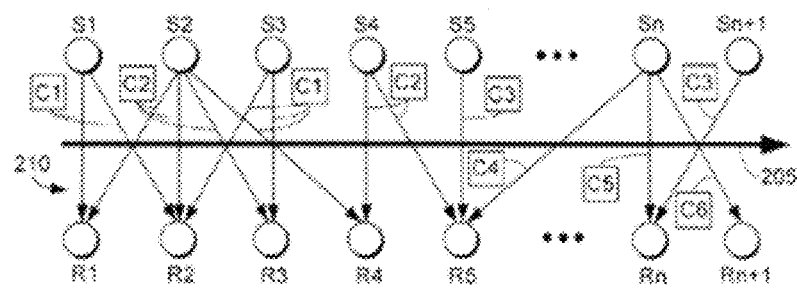
FIG. 5 illustrates a flow diagram of messages transmitted between sender and recipient nodes, in association with different contexts in one embodiment of the present disclosure.

FIG. 5 illustrates a flow diagram of messages 210 transmitted between sender nodes (e.g., S1, S2, S3, S4, S5, . . . , Sn, Sn+1) and recipient nodes (e.g., R1, R2, R3, R4, R5, . . . , Rn, Rn+1), in association with different contexts (e.g., C1, C2, C3, C4, C5, and C6).

The messages 210 are transmitted between the sender nodes and the recipient nodes in accordance with a timing sequence 205. Each of the messages 210 can have associated therewith a context, which can be different from one message to the next. For example, as shown in FIG. 5, the messages sent between S1 and received by R1 and R2 can have a context C1 associated therewith. By way of another example, the messages sent between Sn and recipients R5, Rn, and Rn+1 can have associated therewith contexts C4, C5, and C6, respectively. It will be understood that messages sent from a given sender node can have the same or different contexts.

The sender nodes are representative of senders of messages, which can be persons, entities, computers, or the like. The recipient nodes are representative of receivers of messages, which can be persons, entities, computers, or the like. Each node can represent a single person or entity, or alternatively, a group of people or entities. For instance, a node can represent a subscriber list to a worldwide audience. The messages 210 can include e-mails, blogs, short message service (SMS) text messages, posts, or the like, and can be organized as threads.

The actionable analytics section 150, FIG. 4, can produce the historical analytics 155, the real-time analytics 160, and the predictive analytics 165 pertaining to one or more relationships based on one or more contexts and the timing sequence.

Figure 6A:
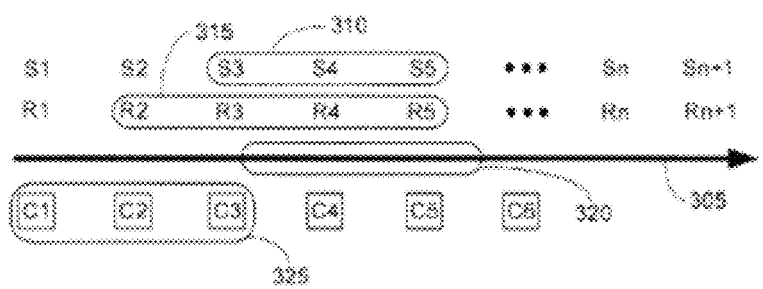
FIG. 6A illustrates selections of parameters for determining one or more relationships according to one embodiment of the present disclosure.

FIG. 6A illustrates selections of parameters for determining one or more relationships. One or more sender nodes can be selected, such as sender nodes 310. One or more receiver nodes can be selected, such as receiver nodes 315. A time interval of interest 320 can be selected on the time sequence 305. One or more contexts can be selected, such as contexts 325. It will be understood that these are exemplary selections, and any combination of parameters can be selected. The selection can be made, for example, through the user interface 140, the input API 180, and/or the output API 185. In some embodiments, the selection is made algorithmically and/or automatically.

Figure 6B:
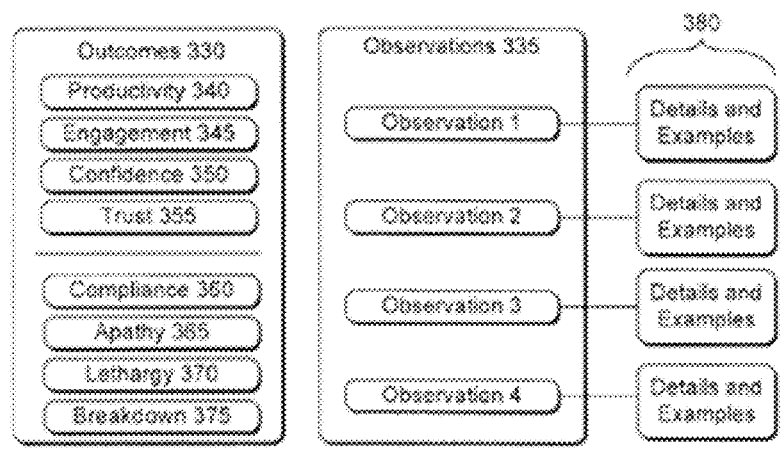
FIG. 6B illustrates an analysis and display of outcomes and observations associated with the selections of FIG. 6A according to one embodiment of the present disclosure.

FIG. 6B illustrates an analysis and display of outcomes and observations associated with the selections of FIG. 6A. After the selection of parameters, outcomes 330 and/or observations 335 can be generated and/or displayed. The outcomes 330 and/or observations 335 are based on the selection of parameters, the mined relationship information, and other determinations as set forth in detail. It will be understood that the relationship analysis engine 100, or components thereof, can produce the outcomes 330 and/or the observations 335.

The outcomes can include one or more quality of relationship values, such as productivity 340, engagement 345, confidence 350, trust 355, compliance 360, apathy 365, lethargy 370, and/or breakdown 375. The observations 335 can include one or more observations. For example, observation 1 can be "Lack of communication of outcome." Observation 2 can be "Emphasis on action items." Observation 3 can be "Partial acknowledgement of purpose." Observation 4 can be "Disconnected action items." It will be understood that these are exemplary observations, and other similar or different kinds of observations can be made.

In addition, details and examples (e.g., 380) can provide further detail and/or examples of the observations 335. The details and examples can include buttons 380, which can be selected so that the further detail and/or examples of the observations 335 and/or outcomes 330 can be displayed.

Figure 7A:
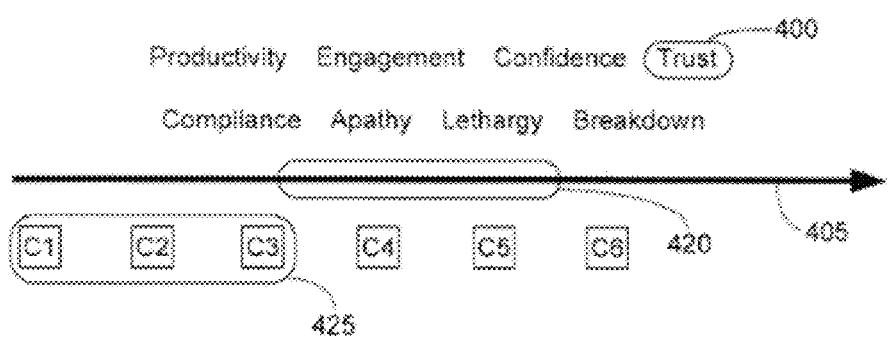
FIG. 7A illustrates selections of parameters for determining one or more relationships according to according to one embodiment of the present disclosure.

FIG. 7A illustrates selections of parameters for determining one or more relationships. One or more quality of relationship values, such as trust 400, can be selected. A time interval of interest 420 can be selected on the time sequence 405. One or more contexts can be selected, such as contexts 425. It will be understood that these are exemplary selections, and any combination of parameters can be selected. The selection can be made, for example, through the user interface 140, the input API 180, and/or the output API 185. In some embodiments, the selection is made algorithmically and/or automatically.

Figure 7B:
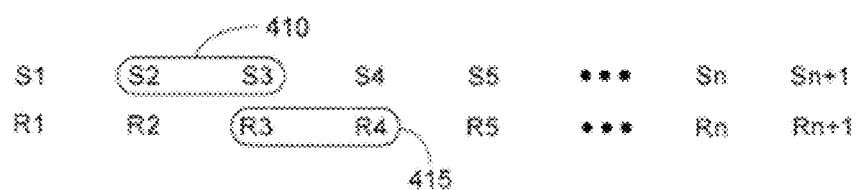
FIG. 7B illustrates an analysis and display of one or more relationship associated with the selections of FIG. 7A according to one embodiment of the present disclosure.

FIG. 7B illustrates an analysis and display of one or more relationship associated with the selections of FIG. 7A. After the selection of parameters, one or more sender nodes, such as sender nodes 410, can be highlighted or otherwise displayed, which correspond to the prior selections. Moreover, one or more recipient nodes, such as recipient nodes 415, can be highlighted or otherwise displayed, which correspond to the prior selections. It will be understood that the highlighted sender nodes 410 and the highlighted recipient nodes 415 are exemplary, and other similar or different kinds of selections and highlights can be made.

The determination for which of the sender nodes and recipient nodes are to be highlighted or otherwise displayed is made based on the selection of parameters, the mined relationship information, and other determinations as set forth in detail above. It will be understood that the relationship analysis engine 100, or components thereof, can produce the highlights or otherwise display the sender nodes 410 and/or the recipient nodes 415. Moreover, the sender nodes 410 and/or the recipient nodes 415 can be highlighted or otherwise displayed in accordance with the determinations of quality of relationships, which conform to the selections described above.

Figure 8:
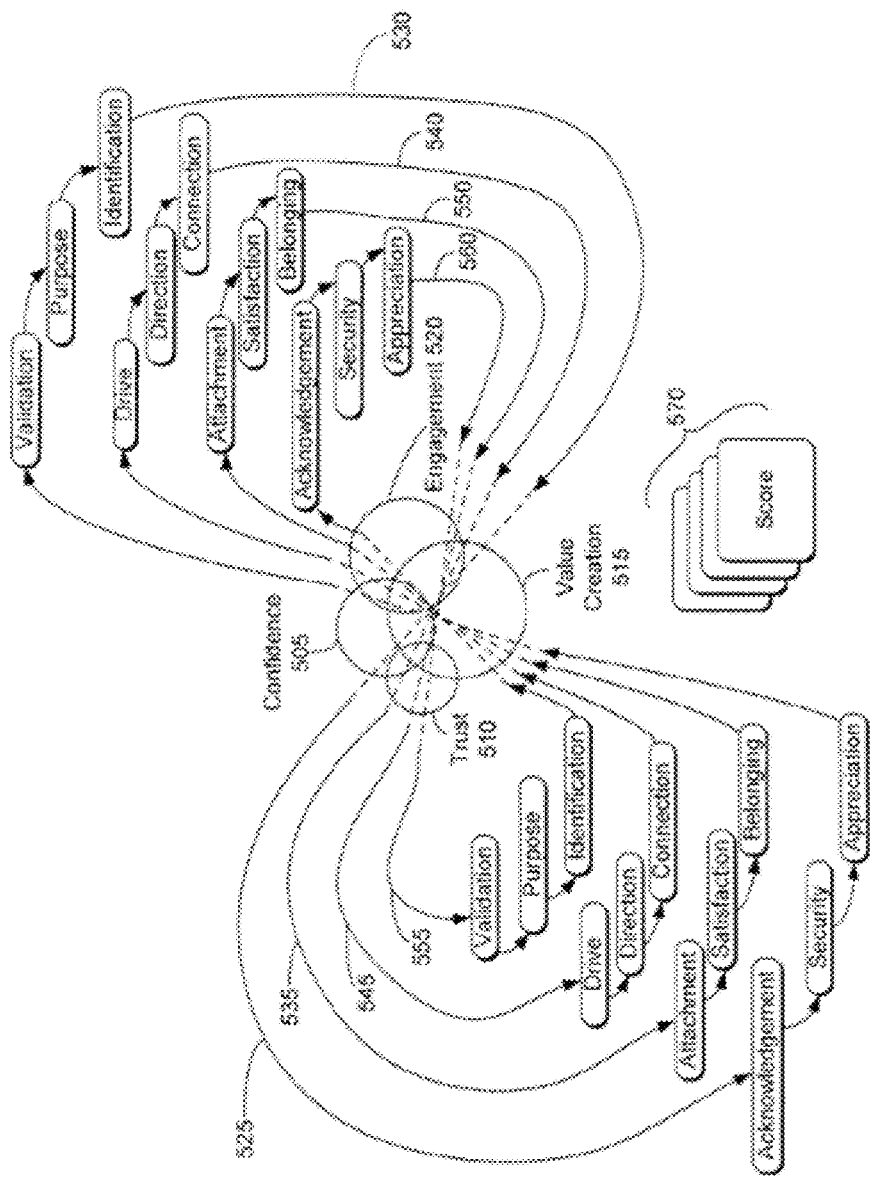
FIG. 8 illustrates a diagram of waypoints between transitions from one quality of relationship value to another quality of relationship value according to one embodiment of the present disclosure.

FIG. 8 illustrates a diagram of waypoints between transitions from one quality of relationship value to another quality of relationship value according to some example embodiments. The quality of relationship values can include, for example, trust 510, confidence 505, engagement 520, and/or value creation 515. These quality of relationship values represent values that are similar to or the same as the outcomes of trust 355, confidence 350, engagement 345, and productivity 340, respectively, discussed above with reference to FIG. 6B.

A relationship can transition from one quality value to any other quality value. For example, the relationship can transition from trust 510 to confidence 505, from confidence 505 to value creation 515, from engagement 520 to trust 510, from confidence 505 to engagement 520, and so forth. In the course of such transitions, the relationship can pass through various waypoints. In other words, the relationship analyzer, FIG. 4, can determine one or more waypoints between transitions from one quality of relationship value to another quality of relationship value.

The waypoints can be arranged along different paths. For instance, path 525 can be associated with value creation 515, and along path 525, the relationship can pass through waypoints of acknowledgement, security, and appreciation. The path 525 can continue to path 530, which can also be associated with value creation 515. Along path 530, the relationship can pass through waypoints of validation, purpose, and identification.

By way of another example, path 535 can be associated with engagement 520, and along path 535, the relationship can pass through waypoints of attachment, satisfaction, and belonging. The path 535 can continue to path 540, which can also be associated with engagement 520. Along path 540, the relationship can pass through waypoints of drive, direction, and connection.

By way of yet another example, path 545 can be associated with confidence 505, and along path 545, the relationship can pass through waypoints of drive, direction, and connection. The path 545 can continue to path 550, which can also be associated with confidence 505. Along path 550, the relationship can pass through waypoints of attachment, satisfaction, and belonging.

By way of still another example, path 555 can be associated with trust 510, and along path 555, the relationship can pass through waypoints of validation, purpose, and identification. The path 555 can continue to path 560, which can also be associated with trust 510. Along path 560, the relationship can pass through waypoints of acknowledgement, security, and appreciation.

It will be understood that the paths and waypoints disclosed herein are exemplary, and other similar paths and waypoints can be associated with the quality of relationship values of trust 510, confidence 505, engagement 520, and/or value creation 515.

The score builder 170, FIG. 4, can assign a score (e.g., 570) to one or more of the waypoints. The scores among the waypoints can be different in comparison one with another. For example, the score for the waypoint of appreciation along path 525 can be higher than the score for the waypoint of attachment along path 550. When a relationship passes through one of the waypoints, the score builder 170 can assign or otherwise add to the relationship the score associated with the given waypoint. The overall score assigned by the score builder 170 to a given relationship can be used in the determinations made by the relationship analyzer, of FIG. 4, and/or other components of the relationship analysis engine 100.

Furthermore, the score builder 170 can assign or otherwise add to the relationship a score (e.g., 570) for each quality of relationship value attained by the relationship. For example, a different score can be associated with each of the quality of relationship values of trust 510, confidence 505, engagement 520, and value creation 515, and the associated score can be assigned to the relationship having the particular quality of relationship value. The overall score assigned by the score builder 170 to a given relationship can include this aspect and be used in the determinations made by the relationship analyzer, of FIG. 4, and/or other components of the relationship analysis engine 100.

For example, the actionable analytics section 150, FIG. 4, can produce the historical analytics 155, the real-time analytics 160, and the predictive analytics 165 pertaining to one or more relationships based on the score of the one or more waypoints, the score for the quality of relationship, and/or the overall score assigned to the relationship. The messages from which relationship information is extracted can be used to determine the different paths and/or waypoints. The messages can be analyzed, categorized, sorted, grouped, and/or tagged in terms of nodes (e.g., sender or receiver), contexts, and/or waypoints.

Figure 9:
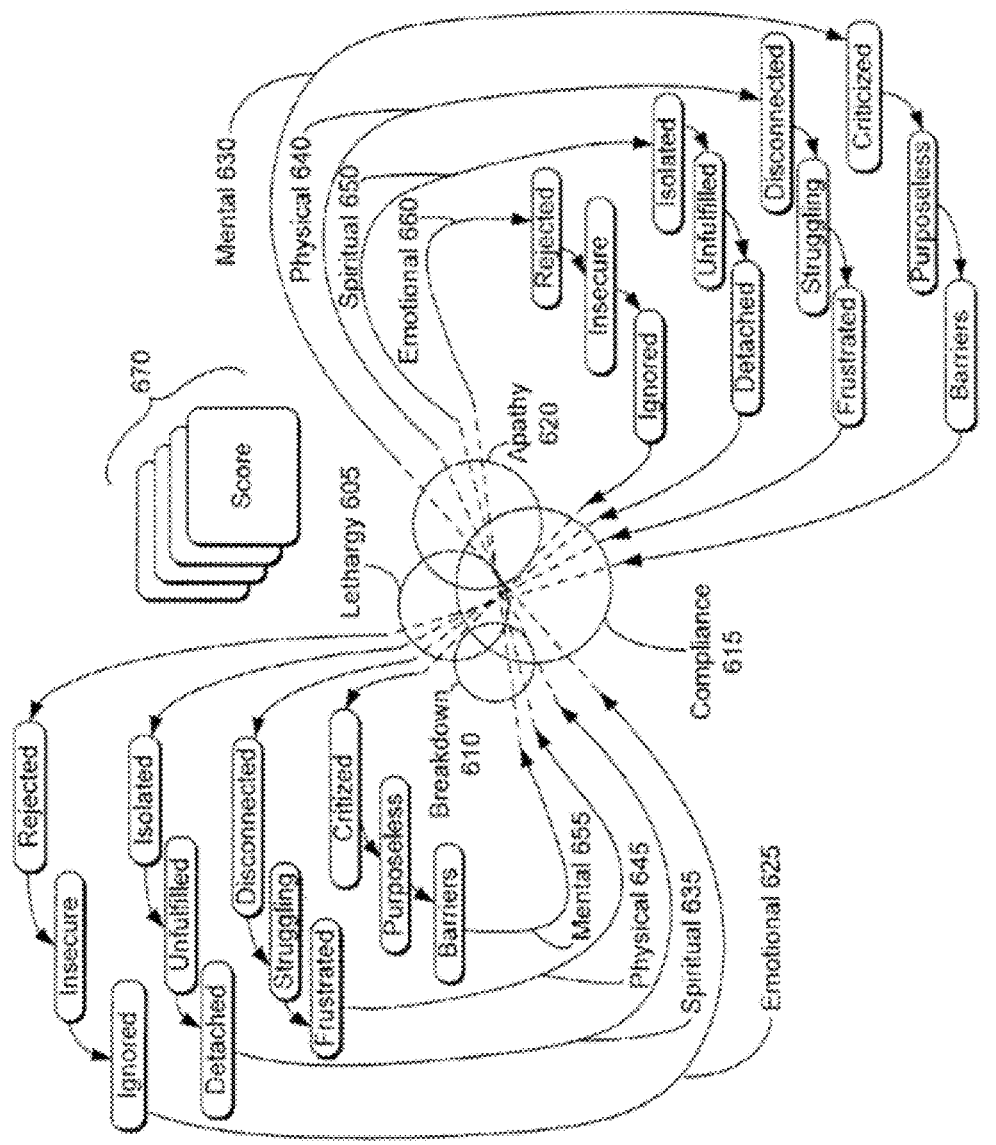
FIG. 9 illustrates another diagram of waypoints between transitions from one quality of relationship value to another quality of relationship value according to one embodiment of the present disclosure.

FIG. 9 illustrates another diagram of waypoints between transitions from one quality of relationship value to another quality of relationship value according to some example embodiments. The quality of relationship values can include, for example, breakdown 610, lethargy 605, apathy 620, and/or compliance 615. These quality of relationship values represent values that are similar to or the same as the outcomes of breakdown 375, lethargy 370, apathy 365, and compliance 360, respectively, discussed above with reference to FIG. 6B.

A relationship can transition from one quality value to any other quality value. For example, the relationship can transition from breakdown 610 to lethargy 605, from lethargy 605 to compliance 615, from apathy 620 to breakdown 610, from lethargy 605 to apathy 620, and so forth. It will also be understood that the relationship can transition from one quality of relationship value illustrated in FIG. 9 to another quality of relationship value illustrated in FIG. 8. It will also be understood that the relationship can transition from one quality of relationship value illustrated in FIG. 8 to another quality of relationship value illustrated in FIG. 9.

In the course of such transitions, the relationship can pass through various waypoints. In other words, the relationship analyzer, FIG. 4, can determine one or more waypoints between transitions from one quality of relationship value to another quality of relationship value.

The waypoints can be arranged along different paths. For instance, emotional path 625 can be associated with breakdown 610, and along path 625, the relationship can pass through waypoints of rejected, insecure, and ignored. The path 625 can continue to mental path 630, which can also be associated with breakdown 610. Along path 630, the relationship can pass through waypoints of criticized, purposeless, and barriers.

By way of another example, spiritual path 635 can be associated with lethargy 605, and along path 635, the relationship can pass through waypoints of isolated, unfulfilled, and detached. The path 635 can continue to physical path 640, which can also be associated with lethargy 605. Along path 640, the relationship can pass through waypoints of disconnected, struggling, and frustrated.

By way of yet another example, physical path 645 can be associated with apathy 620, and along path 645, the relationship can pass through waypoints of disconnected, struggling, and frustrated. The path 645 can continue to spiritual path 650, which can also be associated with apathy 620. Along path 650, the relationship can pass through waypoints of isolated, unfulfilled, and detached.

By way of still another example, mental path 655 can be associated with compliance 615, and along path 655, the relationship can pass through waypoints of criticized, purposeless, and barriers. The path 655 can continue to emotional path 660, which can also be associated with compliance 615. Along path 660, the relationship can pass through waypoints of rejected, insecure, and ignored.

It will be understood that the paths and waypoints disclosed herein are exemplary, and other similar paths and waypoints can be associated with the quality of relationship values of breakdown 610, lethargy 605, apathy 620, and compliance 615.

The score builder 170, FIG. 4, can assign a score (e.g., 670) to one or more of the waypoints. The scores among the waypoints can be different in comparison one with another. For example, the score for the waypoint of ignored along path 625 can be higher than the score for the waypoint of rejected along path 660. When a relationship passes through one of the waypoints, the score builder 170 can assign or otherwise add to the relationship the score associated with the given waypoint. The overall score assigned by the score builder 170 to a given relationship can be used in the determinations made by the relationship analyzer, FIG. 4, and/or other components of the relationship analysis engine 100.

Furthermore, the score builder 170 can assign or otherwise add to the relationship a score for each quality of relationship value attained by the relationship. For example, a different score can be associated with each of the quality of relationship values of breakdown 610, lethargy 605, apathy 620, and/or compliance 615, and the associated score can be assigned to the relationship having the particular quality of relationship value. The overall score assigned by the score builder 170 to a given relationship can include this aspect and be used in the determinations made by the relationship analyzer, of FIG. 4, and/or other components of the relationship analysis engine 100. It will be understood that the score that is added can be a negative score, thereby negatively affecting the overall score assigned to the relationship.

The actionable analytics section 150, FIG. 4, can produce the historical analytics 155, the real-time analytics 160, and the predictive analytics 165 pertaining to one or more relationships based on the score of the one or more waypoints, the score for the quality of relationship, and/or the overall score assigned to the relationship. The messages from which relationship information is extracted can be used to determine the different paths and/or waypoints. The messages can be analyzed, categorized, sorted, grouped, and/or tagged in terms of nodes (e.g., sender or receiver), contexts, and/or waypoints.

Figure 10:
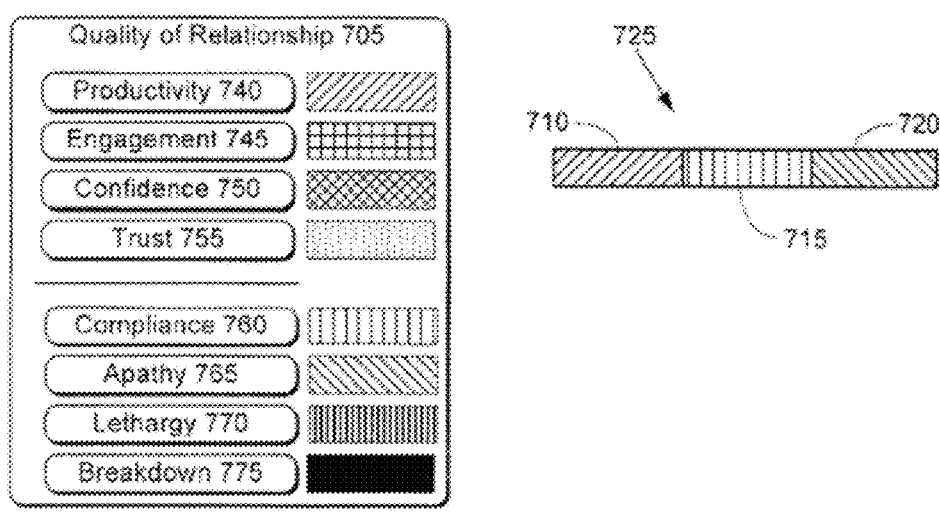
FIG. 10 illustrates quality of relationship values and associated relationship indicator having icons that represent past, present, and predictive values according to one embodiment of the present disclosure.

FIG. 10 illustrates quality of relationship values 705 and an associated relationship indicator 725 having icons (e.g., 710, 715, and 720) that represent past, present, and predictive values, respectively, according to some example embodiments.

The actionable analytics section 150 can generate the relationship indicator (e.g., 725) for one or more relationships. The relationship indicator 725 includes an indicator for a past quality of relationship value 710 associated with the historical analytics 155, a present quality of relationship value 715 associated with the real-time analytics 160, and a predictive quality of relationship value 720 associated with the predictive analytics 165.

The relationship indicator can include three adjacent or proximately located icons. For example, a first icon 710 can indicate the past quality of relationship value, a second icon 715 can indicate the present or real-time quality of relationship value, and a third icon 720 can indicate the predictive quality of relationship value. It will be understood that while the icons show a different pattern for each quality of relationship value, alternatively, each icon can show a different color or shape to distinguish one quality of relationship value from another. In some embodiments, a gradient of colors is used such that an individual color within the gradient of colors represents an individual quality of relationship value. Indeed, any differentiating aspect of the icons can be used to allow an observer to quickly distinguish and identify the quality of relationship value associated with the past, present, and predicted future quality of relationship.

More specifically, the past quality of relationship value indicated by the first icon 710 includes a representation for productivity 740, engagement 745, confidence 750, trust 755, compliance 760, apathy 765, lethargy 770, and/or breakdown 775. Similarly, the present quality of relationship value indicated by the second icon 715 includes a representation for productivity 740, engagement 745, confidence 750, trust 755, compliance 760, apathy 765, lethargy 770, and/or breakdown 775. The predictive quality of relationship value indicated by the third icon 720 includes a representation for productivity 740, engagement 745, confidence 750, trust 755, compliance 760, apathy 765, lethargy 770, and/or breakdown 775.

Back-End

The present disclosure provides a telemetry system that can include a microprocessor with at least one central processing unit (CPU) or multiple CPUs, computer memory, interface electronics and conditioning electronics configured to receive a signal from the display device and/or the sensor. In one embodiment, all or a portion of the conditioning electronics are at the display device.

In one embodiment, the CPU includes a processor, which can be a microprocessor, read only memory used to store instructions that the processor may fetch in executing its program, a random access memory (RAM) used by the processor to store information and a master dock. The microprocessor is controlled by the master clock that provides a master timing signal used to sequence the microprocessor through its internal states in its execution of each processed instruction. In one embodiment, the microprocessor, and especially the CPU, is a low power device, such as CMOS, as is the necessary logic used to implement the processor design. The telemetry system can store information about the user's messages, display and activities in memory.

This memory may be external to the CPU but can reside in the RAM. The memory may be nonvolatile such as battery backed RAM or electrically erasable programmable read only memory (EEPROM). Signals from the messages, display and/or sensors can be in communication with conditioning electronics that with a filter, with scale and can determine the presence of certain conditions. This conditioning essentially cleans the signal up for processing by CPU and in some cases preprocesses the information. These signals are then passed to interface electronics, which converts the analog voltage or currents to binary ones and zeroes understood by the CPU. The telemetry system can also provide for intelligence in the signal processing, such as achieved by the CPU in evaluating historical data.

In one embodiment, the actions, expressions and the like of the user wearing the window can be used for different activities and can have different classifications at the telemetry system.

The classification can be in response to the user's location, where the user spends it time, messages, and communications, determination of working relationships, family relationships, social relationships, and the like. These last few determinations can be based on the time of day, the types of interactions, comparisons of the amount of time with others, the time of day, a frequency of contact with others, the type of contact with others, the location and type of place where the user is at, and the like. These results are stored in the database.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts.

Cloud Infrastructure

Figure 11A:
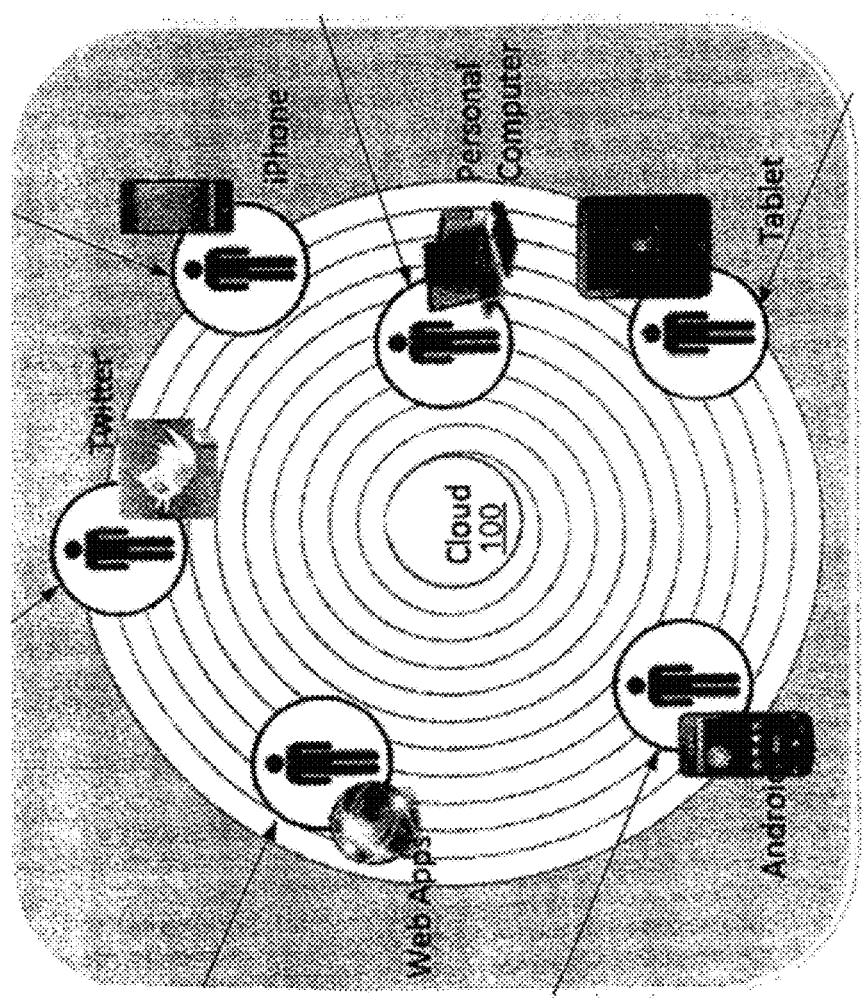
FIGS. 11A-11E illustrate embodiments of a cloud infrastructure that can be used with display devices of the present disclosure.

The present disclosure provides cloud infrastructures. FIG. 11A represents a logical diagram of a cloud Infrastructure. As shown, the cloud encompasses web applications, mobile devices, personal computer and/or laptops and social networks, such as, Twitter®. ("Twitter®" is a trademark of Twitter Inc.). It will be appreciated that other social networks can be included in the cloud and Twitter® has been given as a specific example. Therefore, every component forms part of the cloud which comprises servers, applications and clients as defined above.

Turning to the FIGS. 11B-11E, the cloud based system that facilitates adjusting utilization and/or allocation of hardware resource(s) to remote clients. The system includes a third party service provider that is provided by the methods of the present disclosure, that can concurrently service requests from several clients without user perception of degraded computing performance as compared to conventional techniques where computational tasks can be performed upon a client or a server within a proprietary intranet. The third party service provider (e.g., "cloud") supports a collection of hardware and/or software resources. The hardware and/or software resources can be maintained by an off-premises party, and the resources can be accessed and utilized by identified users over Network System. Resources provided by the third party service provider can be centrally located and/or distributed at various geographic locations. For example, the third party service provider can include any number of data center machines that provide resources. The data center machines can be utilized for storing/retrieving data, effectuating computational tasks, rendering graphical outputs, routing data, and so forth.

According to an illustration, the third party service provider can provide any number of resources such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider is contemplated. According to an illustration, disparate third party service providers can be maintained by differing off-premise parties and a user can employ, concurrently, at different times, and the like, all or a subset of the third party service providers.

By leveraging resources supported by the third party service provider, limitations commonly encountered with respect to hardware associated with clients and servers within proprietary intranets can be mitigated. Off-premises parties, instead of users of clients or Network System administrators of servers within proprietary intranets, can maintain, troubleshoot, replace and update the hardware resources. Further, for example, lengthy downtimes can be mitigated by the third party service provider utilizing redundant resources; thus, if a subset of the resources are being updated or replaced, the remainder of the resources can be utilized to service requests from users. According to this example, the resources can be modular in nature, and thus, resources can be added, removed, tested, modified, etc. while the remainder of the resources can support servicing user requests. Moreover, hardware resources supported by the third party service provider can encounter fewer constraints with respect to storage, processing power, security, bandwidth, redundancy, graphical display rendering capabilities, etc. as compared to conventional hardware associated with clients and servers within proprietary intranets.

The system can include a client device, which can be the window and/or the window user's mobile device that employs resources of the third party service provider. Although one client device is depicted, it is to be appreciated that the system can include any number of client devices similar to the client device, and the plurality of client devices can concurrently utilize supported resources. By way of illustration, the client device can be a desktop device (e.g., personal computer), mobile device, and the like. Further, the client device can be an embedded system that can be physically limited, and hence, it can be beneficial to leverage resources of the third party service provider.

Resources can be shared amongst a plurality of client devices subscribing to the third party service provider. According to an illustration, one of the resources can be at least one central processing unit (CPU), where CPU cycles can be employed to effectuate computational tasks requested by the client device. Pursuant to this illustration, the client device can be allocated a subset of an overall total number of CPU cycles, while the remainder of the CPU cycles can be allocated to disparate client device(s). Additionally or alternatively, the subset of the overall total number of CPU cycles allocated to the client device can vary over time. Further, a number of CPU cycles can be purchased by the user of the client device. In accordance with another example, the resources can include data store(s) that can be employed by the client device to retain data. The user employing the client device can have access to a portion of the data store(s) supported by the third party service provider, while access can be denied to remaining portions of the data store(s) (e.g., the data store(s) can selectively mask memory based upon user/device identity, permissions, and the like). It is contemplated that any additional types of resources can likewise be shared.

The third party service provider can further include an interface component that can receive input(s) from the client device and/or enable transferring a response to such input(s) to the client device (as well as perform similar communications with any disparate client devices). According to an example, the input(s) can be request(s), data, executable program(s), etc. For instance, request(s) from the client device can relate to effectuating a computational task, storing/retrieving data, rendering a user interface, and the like via employing one or more resources. Further, the interface component can obtain and/or transmit data over a Network System connection. According to an illustration, executable code can be received and/or sent by the interface component over the Network System connection. Pursuant to another example, a user (e.g. employing the client device) can issue commands via the interface component.

In one embodiment, the third party service provider includes a dynamic allocation component that apportions resources, which as a non-limiting example can be hardware resources supported by the third party service provider to process and respond to the input(s) (e.g., request(s), data, executable program(s), and the like, obtained from the client device.

Although the interface component is depicted as being separate from the dynamic allocation component, it is contemplated that the dynamic allocation component can include the interface component or a portion thereof. The interface component can provide various adaptors, connectors, channels, communication paths, etc. to enable interaction with the dynamic allocation component.

Figure 11B:
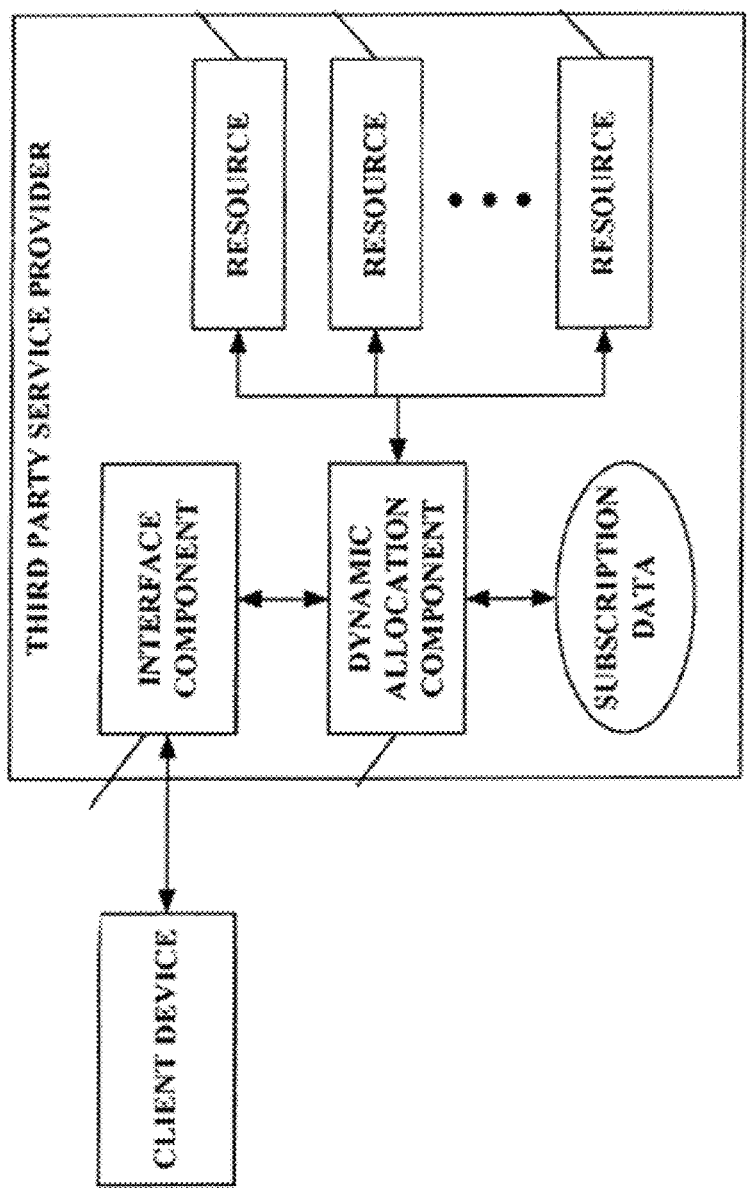
Figure 11C:
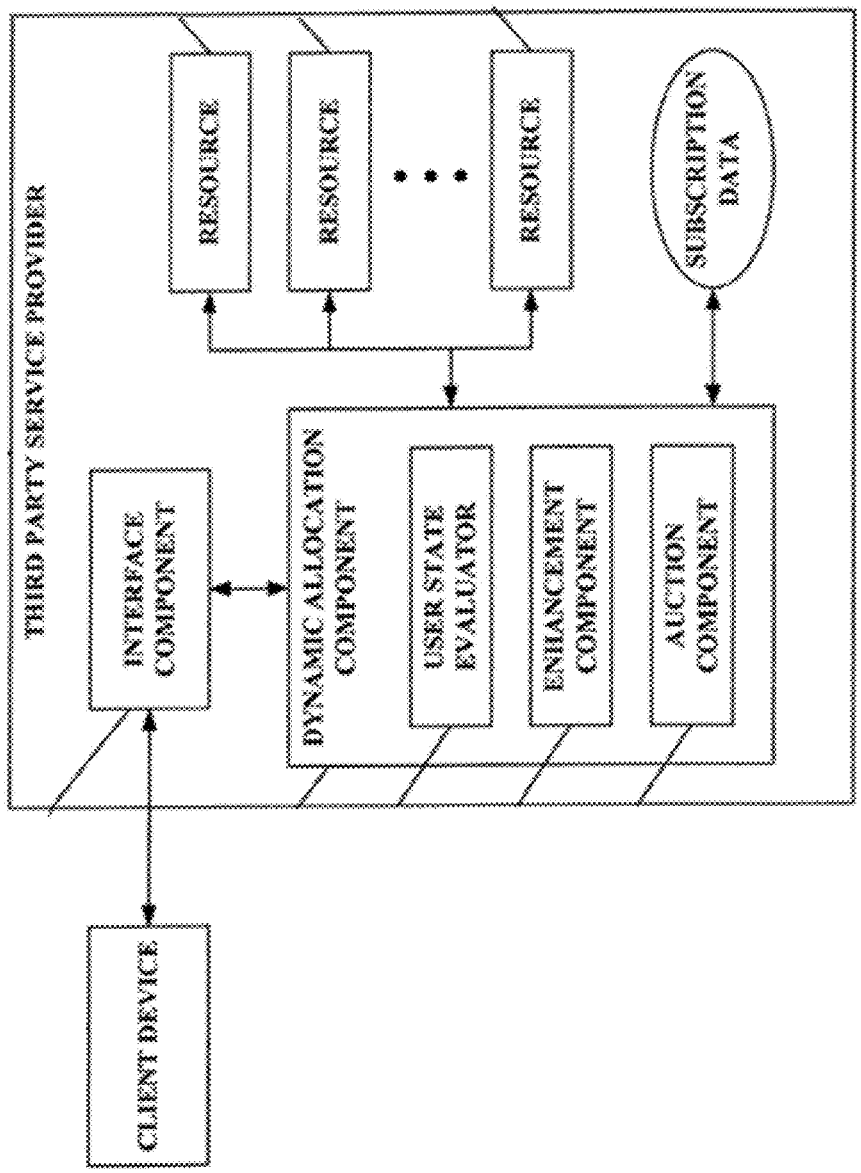

With reference to FIG. 11B, a system includes the third party service provider that can support any number of resources (e.g., hardware, software, and firmware) that can be employed by the client device and/or disparate client device(s) not shown. The third party service provider further comprises the interface component that receives resource utilization requests, including but not limited to requests to effectuate operations utilizing resources supported by the third party service provider from the client device and the dynamic allocation component that partitions resources, including but not limited to, between users, devices, computational tasks, and the like. Moreover, the dynamic allocation component can further include a user state evaluator, an enhancement component and an auction component.

The user state evaluator can determine a state associated with a user and/or the client device employed by the user, where the state can relate to a set of properties. For instance, the user state evaluator can analyze explicit and/or implicit information obtained from the client device (e.g., via the interface component) and/or retrieved from memory associated with the third party service provider (e.g., preferences indicated in subscription data). State related data yielded by the user state evaluator can be utilized by the dynamic allocation component to tailor the apportionment of resources.

In one embodiment, the user state evaluator can consider characteristics of the client device, which can be used to apportion resources by the dynamic allocation component. For instance, the user state evaluator can identify that the client device is a mobile device with limited display area. Thus, the dynamic allocation component can employ this information to reduce resources utilized to render an image upon the client device since the cellular telephone may be unable to display a rich graphical user interface.

Moreover, the enhancement component can facilitate increasing an allocation of resources for a particular user and/or client device.

Figure 11D:
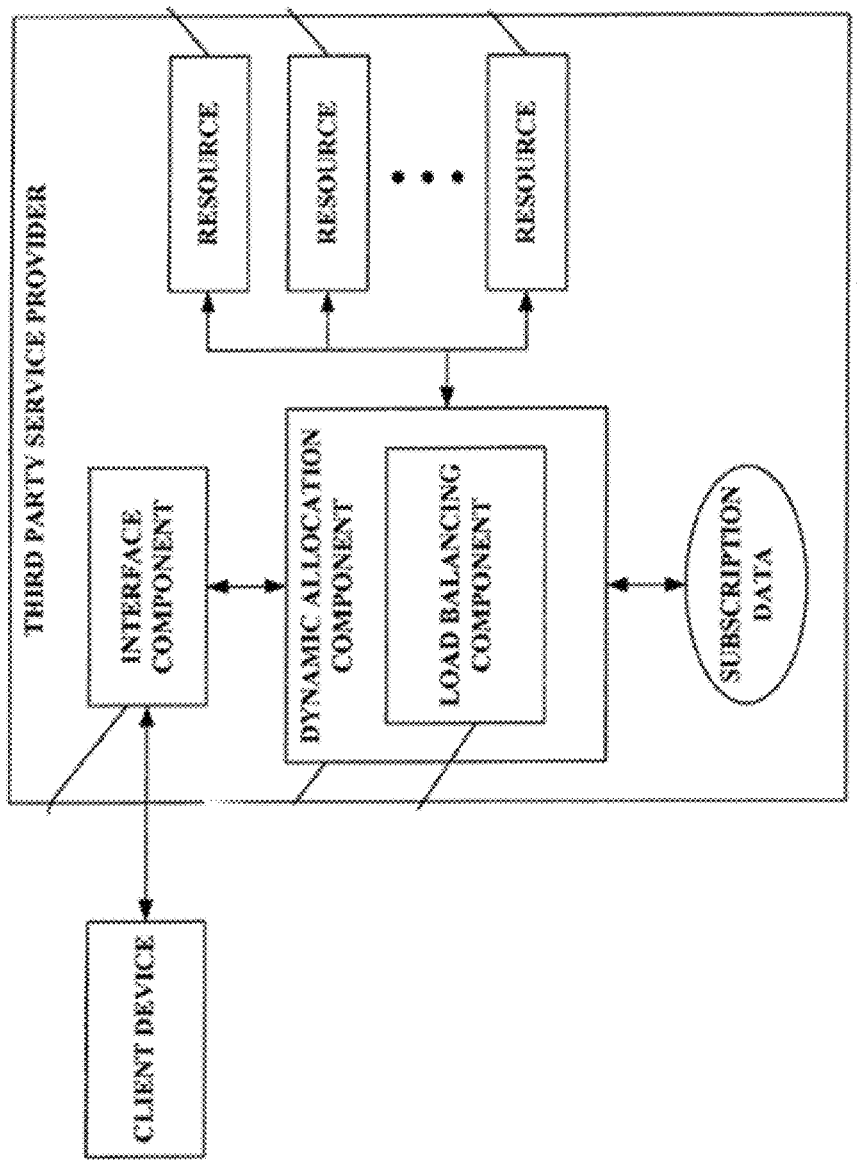

Referring to FIG. 11D, illustrated is a system that employs load balancing to optimize utilization of resources. The system includes the third party service provider that communicates with the client device (and/or any disparate client device(s) and/or disparate third party service provider(s)). The third party service provider can include the interface component that transmits and/or receives data from the client device and the dynamic allocation component that allots resources. The dynamic allocation component can further comprise a load balancing component that optimizes utilization of resources.

In one embodiment, the load balancing component can monitor resources of the third party service provider to detect failures. If a subset of the resources fails, the load balancing component can continue to optimize the remaining resources. Thus, if a portion of the total number of processors fails, the load balancing component can enable redistributing cycles associated with the non-failing processors.

Figure 11E:
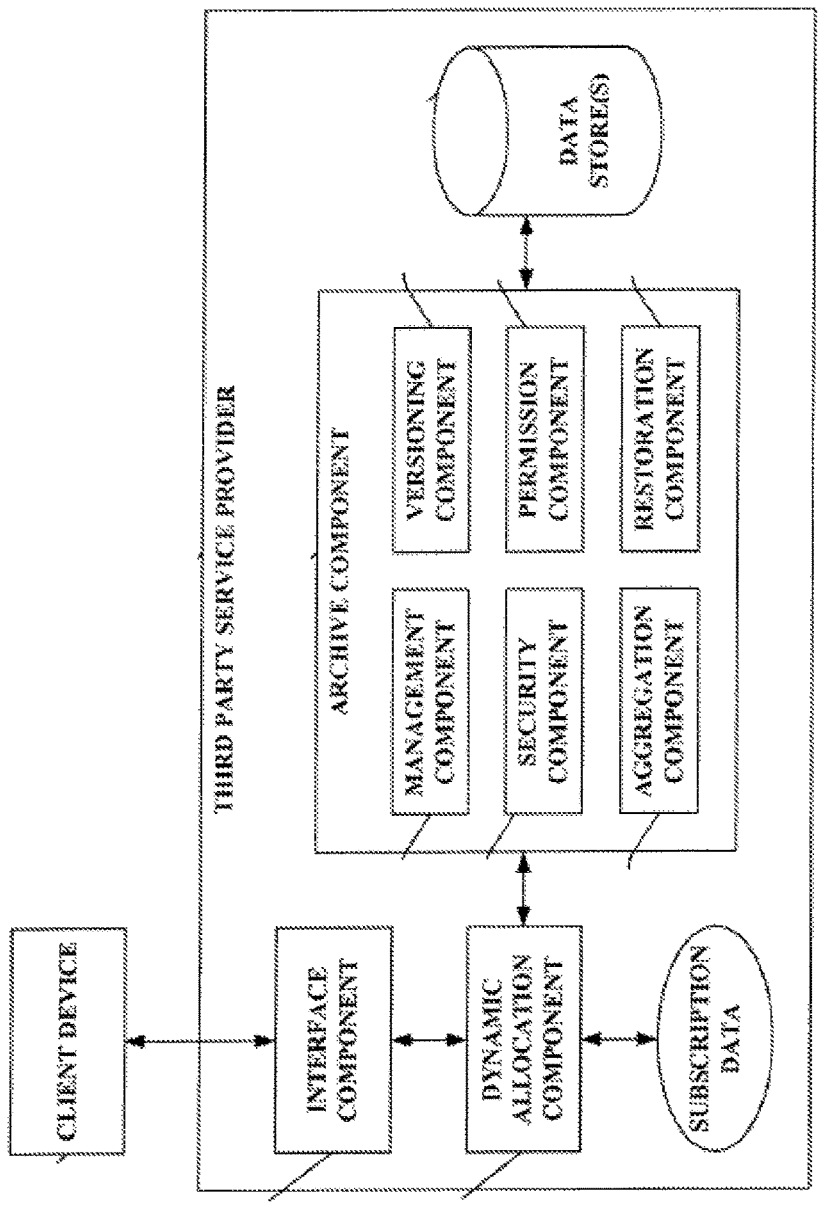

Referring to FIG. 11E, a system is illustrated that archives and/or analyzes data utilizing the third party service provider. The third party service provider can include the interface component that enables communicating with the client device. Further, the third party service provider comprises the dynamic allocation component that can apportion data retention resources, for example. Moreover, the third party service provider can include an archive component and any number of data store(s). Access to and/or utilization of the archive component and/or the data store(s) by the client device (and/or any disparate client device(s)) can be controlled by the dynamic allocation component. The data store(s) can be centrally located and/or positioned at differing geographic locations. Further, the archive component can include a management component, a versioning component, a security component, a permission component, an aggregation component, and/or a restoration component.

The data store(s) can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAIVI), Synchlink DRAM (SLDRAIVI), Rambus direct RAM (RDRAM), direct Rambus dynamic RAM (DRDRAIVI), and Rambus dynamic RAM (RDRAM). The data store(s) of the subject systems and methods is intended to comprise, without being limited to, these and any other suitable types of memory. In addition, it is to be appreciated that the data store(s) can be a server, a database, a hard drive, and the like.

The management component facilitates administering data retained in the data store(s). The management component can enable providing multi-tiered storage within the data store(s), for example. According to this example, unused data can be aged-out to slower disks and important data used more frequently can be moved to faster disks; however, the claimed subject matter is not so limited. Further, the management component can be utilized (e.g. by the client device) to organize, annotate, and otherwise reference content without making it local to the client device. Pursuant to an illustration, enormous video files can be tagged via utilizing a cell phone. Moreover, the management component enables the client device to bind metadata, which can be local to the client device, to file streams (e.g., retained in the data store(s)); the management component can enforce and maintain these bindings.

Additionally or alternatively, the management component can allow for sharing data retained in the data store(s) with disparate users and/or client devices. For example, fine-grained sharing can be supported by the management component.

The versioning component can enable retaining and/or tracking versions of data. For instance, the versioning component can identify a latest version of a document (regardless of a saved location within data store(s)).

The security component limits availability of resources based on user identity and/or authorization level. For instance, the security component can encrypt data transferred to the client device and/or decrypt data obtained from the client device. Moreover, the security component can certify and/or authenticate data retained by the archive component.

The permission component can enable a user to assign arbitrary access permissions to various users, groups of users and/or all users.

Further, the aggregation component assembles and/or analyzes collections of data. The aggregation component can seamlessly incorporate third party data into a particular user's data.

The restoration component rolls back data retained by the archive component. For example, the restoration component can continuously record an environment associated with the third party service provider. Further, the restoration component can playback the recording.

Light Emitting Diodes

Figure 15:
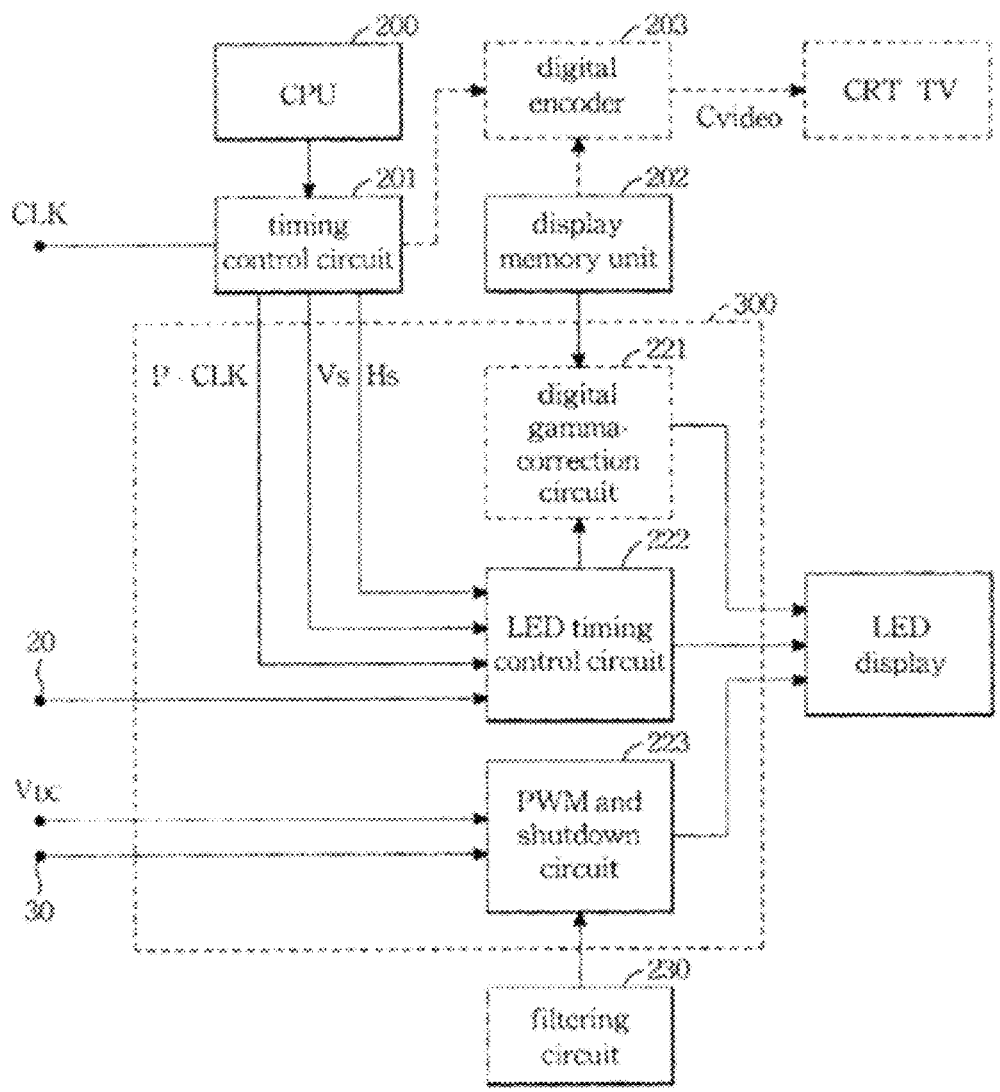
FIG. 15 illustrates a light emitting diode (LED) driving circuit.

The present disclosure provides light emitting diodes for use with display devices. FIG. 15 illustrates a light emitting diode (LED) driving circuit, as may be employed for use with displays and display devices of the present disclosure. The LED driving circuit is fabricated in a displaying system which also includes a driving circuit. The driving circuit includes a CPU 200, a timing control circuit 201, a display memory unit 202 and a digital encoder 203, which are operated cooperatively to produce a signal used to drive the display. The output signals of the CPU 200 are transferred via the timing control circuit 201 to the digital encoder 203. Meanwhile, the data of a digital dot matrix stored in the display memory unit 202 are transferred to the digital encoder 203. It is noted that the display memory unit 202, for storing the digital image signals provided by the CPU 200, is an optional device. So under the consideration of saving space or cost, the display memory unit 202 can be left out. And the digital dot matrix data can be conveyed to the digital encoder 203 directly from the CPU 200.

In one embodiment the LED driving circuit is the bottom part of the circuit of FIG. 15 that is enclosed in a dashed box indicated by the reference numeral 300. It is devised to drive an LED display to generate the digitized video image stored in the display memory unit 202 under control of the horizontal synchronizing signal Hs, the vertical synchronizing signal Vs and the P-CLK signal from the timing control circuit 201. In practice, the LED driving circuit 300 can be implemented together with the digital LED, nanotechnology and other related display technology based wrist band driving circuit in an LSI integrated circuit. Alternatively, the LED driving circuit 300 can be an independent functional unit used to drive an individual LED display.

In one embodiment the LED driving circuit 300 includes a digital gamma-correction circuit 221, an LED timing control circuit 222 and a PWM and shutdown circuit 223.

In operation, the output horizontal synchronizing signal Hs, the vertical Synchronizing signal Vs and the P-CLK signal from the timing control circuit 201 are directly transferred to the LED timing control circuit 222 in the LED driving circuit 300. The LED timing control circuit 222 then processes these signals to thereby generate the various video control signals required to drive the LED display. The LED display can be an organic light emitting diode (OLED) display. The LED display may be flexible.

In one embodiment the LED timing control circuit 222 further includes a resolution setting unit 20 that allows the user to set a desired resolution for the LED display to generate the video image. When a desired resolution is set, the LED timing control circuit 222 can adjust the LED display to the user-set resolution simply by changing the states of logic signals that are used to control the resolution of the LED display. Such LED display may advantageously not need peripheral components to be changed when a different resolution is to be set. The circuit may be a phase-locked loop (PLL) circuit.

The digitized video image that is to be displayed on the LED display is transferred directly from the display memory unit 202 to the digital gamma-correction circuit 221. The digital gamma-correction circuit 221 performs a digital gamma-correction process on the digitized video signal.

Furthermore, the LED driving circuit 300 utilizes the PWM and shutdown circuit 223 to provide all the DC voltages needed to power the various parts of the LED display. In operation, the PWM and shutdown circuit 223 receives an external voltage VDC and, in conjunction with the filtering circuit 230, converts the voltage VDC into the various DC voltages that are used to power the various parts of the LED display.

The PWM and shutdown circuit 223 further includes a shutdown trigger input port 30. When the LED display has been idle for a preset period, a shutdown trigger signal will be input to the PWM and shutdown circuit 223 via this port 30, causing the PWM and shutdown circuit 223 to shut down the LED display for the purpose of saving power consumption.

In one embodiment the digitized video signals to be directly digitally processed so that the video image can be displayed without much loss in fidelity. It also allows the driving circuit to be more cost-effective to implement and to be constructed with a reduced number of circuit components. The LED driving circuit may consume less power and can be operated without the need to make the many analog adjustments.

In one embodiment the digital gamma-correction circuit 221 performs the gamma correction on the video signal in a digital manner instead of analog manner. The gamma correction can thus be performed based on the characteristics of the LED display to provide the optimal and finest correction.

In one embodiment the digital nature of the LED driving circuit of the invention allows the various resolutions of the LED display to be selectable through a digital unit (in this case, the resolution setting unit 20). The resolution setting may therefore be more convenient than other displays in which some peripheral components of the PLL circuit may need to be replaced when a different resolution is to be set.

Mobile Devices

Figure 12:
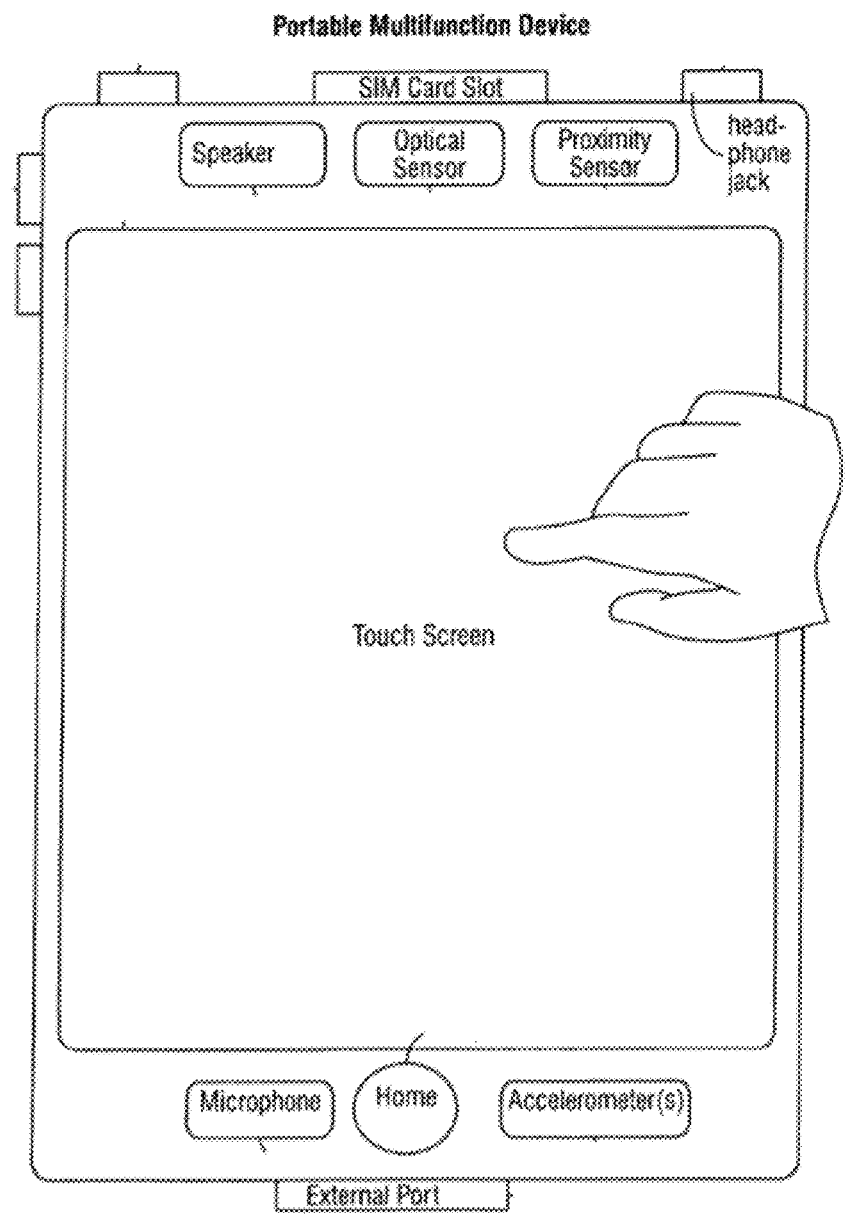
FIGS. 12, 13 and 14 are diagrams illustrating embodiments of a mobile or computing device that can be used with display devices of the present disclosure.
Figure 13:
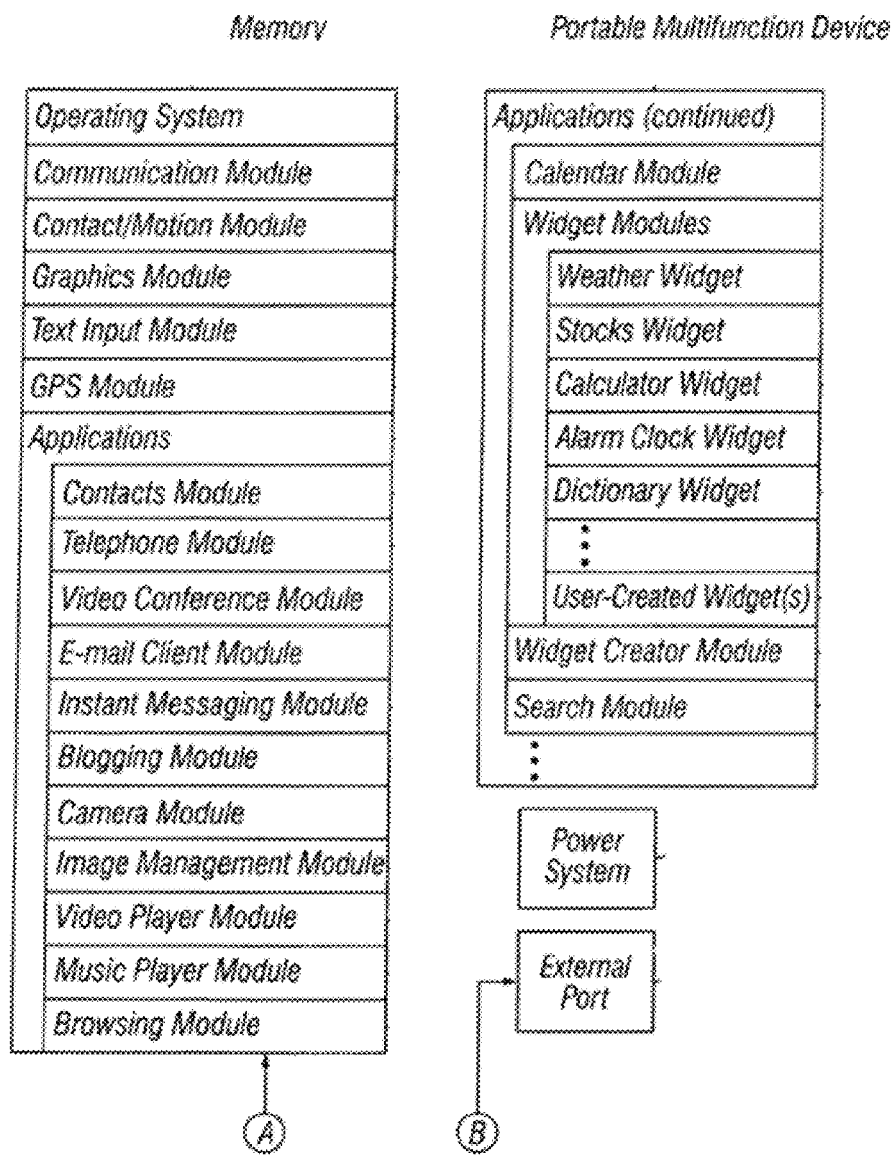
Figure 14:
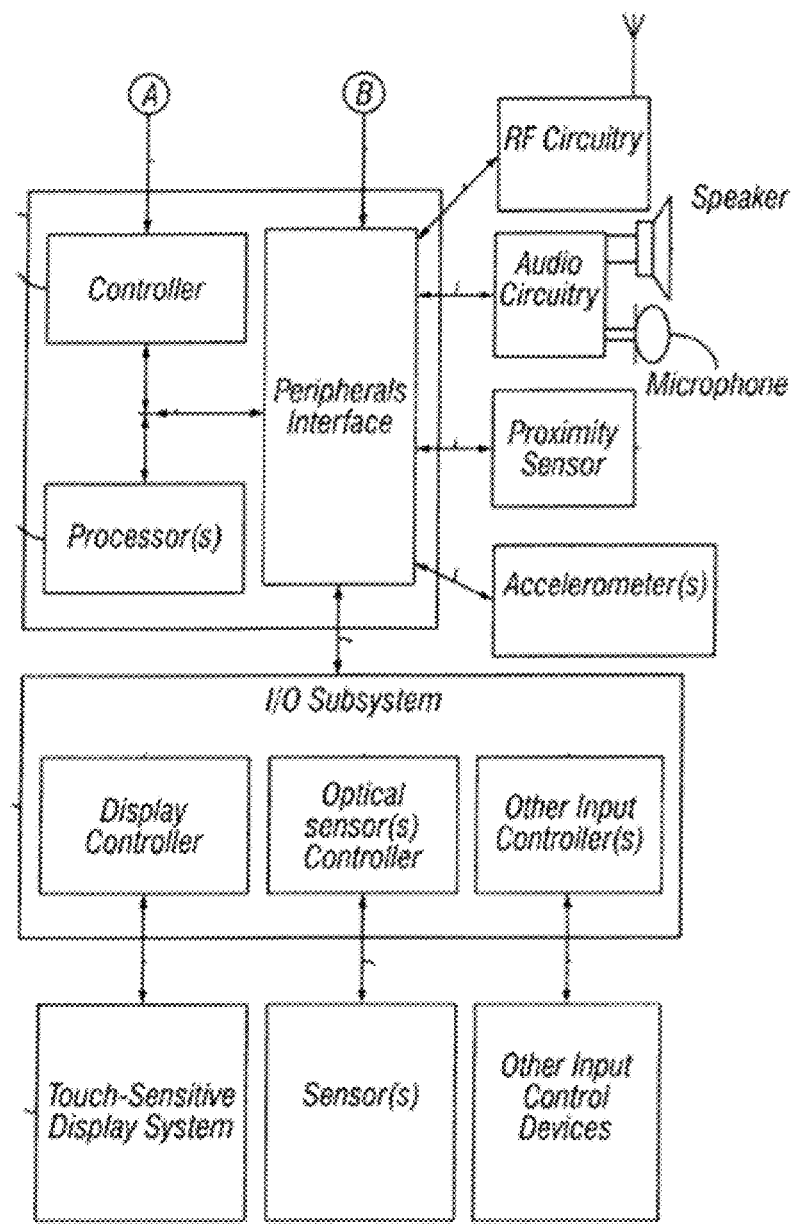

The present disclosure provides mobile devices. FIGS. 12-14 show a mobile or computing device that can be used with the window of the present disclosure. Referring to FIG. 12, the mobile or computing device can include a display that can be a touch sensitive display. The touch-sensitive display is sometimes called a "touch screen" for convenience, and may also be known as or called a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. The mobile or computing device may include one or more optical sensors. These components may communicate over one or more communication buses or signal lines.

It will be appreciated that the mobile or computing device is only one example of a portable multifunction mobile or computing device, and that the mobile or computing device may have more or fewer components than shown, may combine two or more components, or a may have a different configuration or arrangement of the components. The various components shown in FIG. 12 may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications Network Systems and other communications devices via the electromagnetic signals. The Network Systems circuitry may include circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with Network Systems and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to human-audible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry also includes a headset jack (FIG. 12). The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile or computing device, such as the touch screen and other input/control devices, to the peripherals interface. The I/O subsystem may include a display controller and one or more input controllers for other input or control devices. The one or more input controllers receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all of the visual output may correspond to user-interface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, the touch screen has a resolution of approximately 1060 dpi. The user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device may also include one or more sensors, including not limited to optical sensors. FIG. 14 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 13/096,386, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over Network System. In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

Mountable Display Devices

Displays of the present disclosure can be used in various settings. For example, a display can be mounted on a mobile device, a vehicle or other object. FIGS. 16A-16G show a display device that can be mounted on various objects, such as a mobile device. In FIGS. 16A-16E, the display device can be mountable on a mobile device as a case. As a non-limiting example the display device fits like a case that wraps around and is then coupled to the mobile device, similar to that of a regular mobile device protective case. The case has an OLED and/or flexible OLED. The display device communicates with the mobile device. In one embodiment the display devices are simple screens expressing photos, images, words just like those displayed on a display device.

Figure 16A:
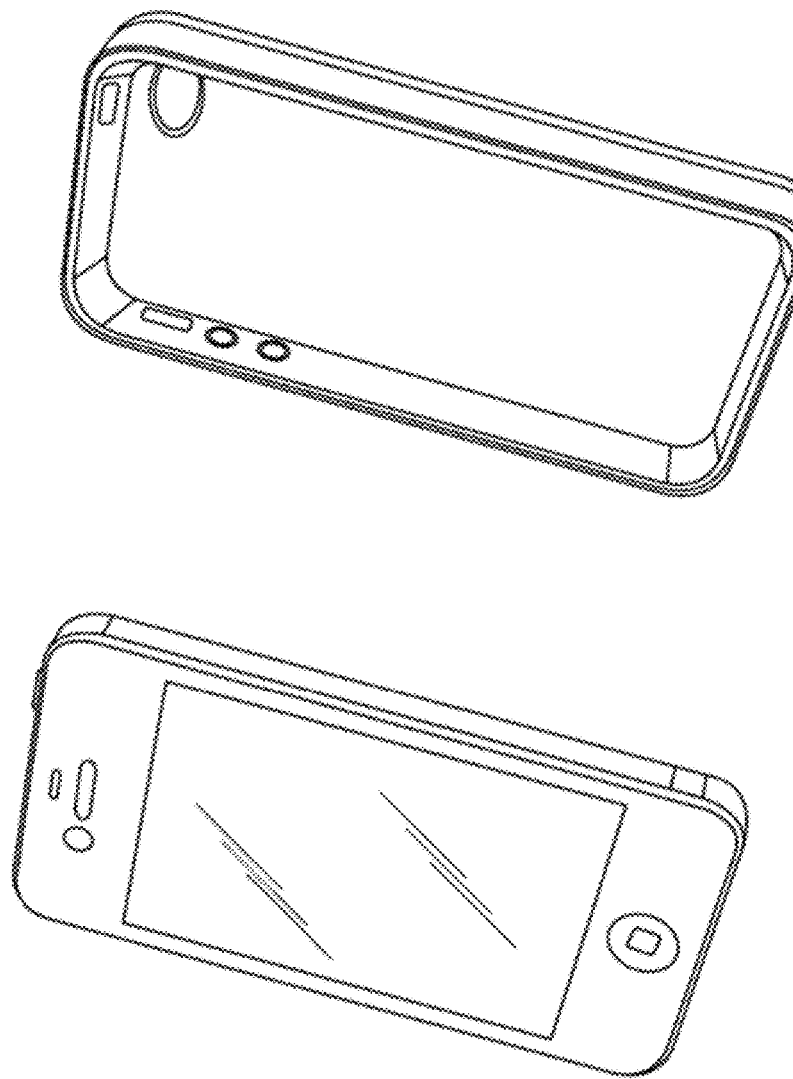
FIGS. 16A-16G show a display device that can be mounted on various objects, such as a mobile device.
Figure 16C:
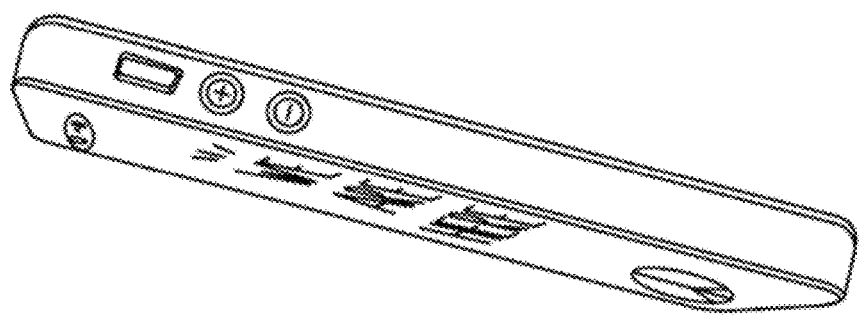
Figure 16B:
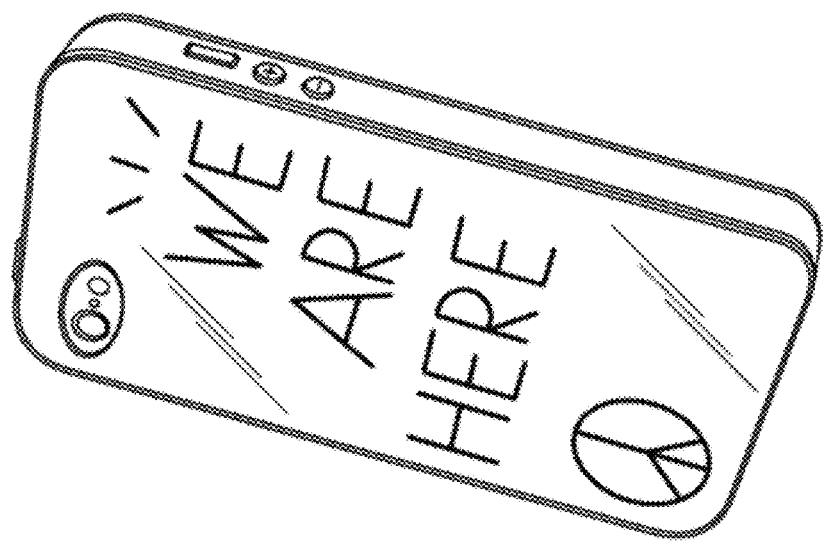
Figure 16E:
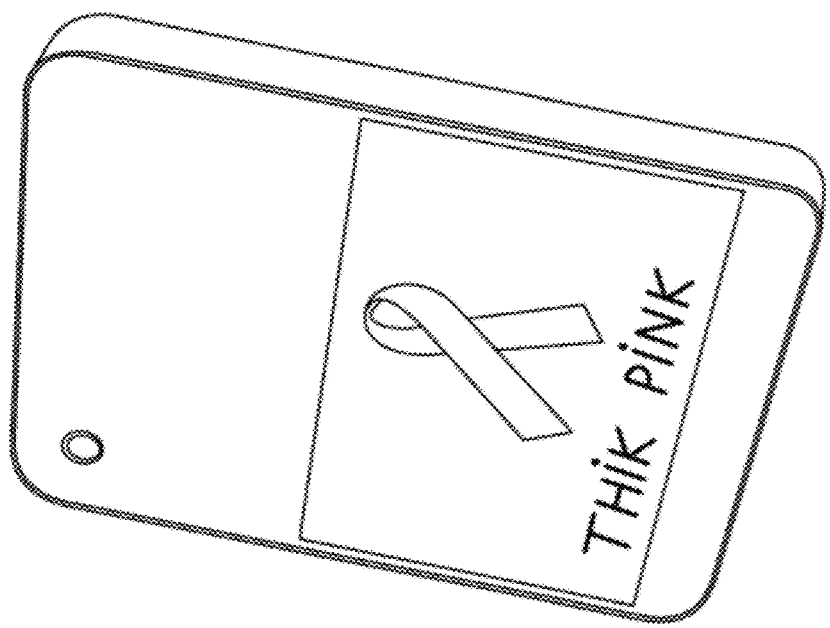
Figure 16D:
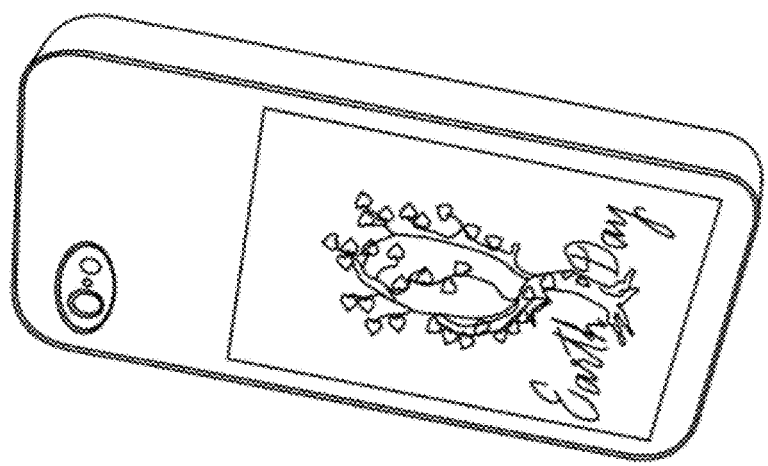
Figure 16G:
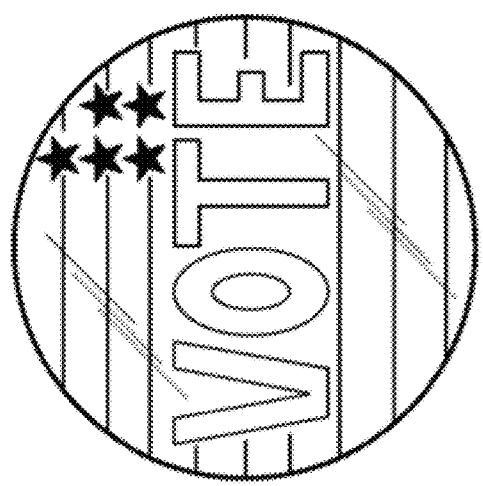
Figure 16F:
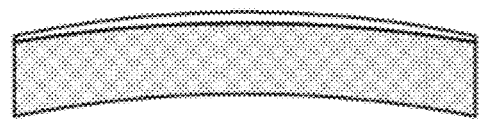

The display device can have a curved or non-linear profile. The display device can be flexible. FIGS. 16F and 16G show a display device that is curvilinear. From a side, the display device has a non-linear profile.

Display devices of the present disclosure are mountable on vehicles. A display device can be mounted on a body of a vehicle or a window of the vehicle. The display device can be mounted on a bumper of the vehicle. FIG. 3 shows a display device 301 mounted on a rear window of a vehicle. The display device is circular, but other shapes may be used. For example, the display device can be triangular, square or rectangular. The display device can be mounted on various locations of the vehicle, including, without limitation, the bumper (e.g., the display device can be a bumper sticker).

In one embodiment the mobile device uses Bluetooth® and/or WiFi to interact and communication with the display device screen. In another embodiment the display device is configured to interpret certain Bluetooth profiles, which are definitions of possible applications and specify general behaviors that Bluetooth enabled devices use to communicate with other Bluetooth devices. These profiles include settings to parametrize and to control the communication from start. Adherence to profiles saves the time for transmitting the parameters anew before the bi-directional link becomes effective. There are a wide range of Bluetooth profiles that describe many different types of applications or use cases for devices In various embodiments the mobile device and the display device are able to have the following: wireless control of and communication between a mobile phone and a display device; wireless networking between display devices in a confined space and where little bandwidth is required; transfer of files, contact details, calendar appointments, and reminders between devices with OBEX; replacement of previous wired RS-232 serial communications; for low bandwidth applications where higher USB bandwidth is not required and cable-free connection desired; sending small advertisements from Bluetooth-enabled display device advertising hoardings to other, discoverable, Bluetooth devices; dial-up internet access on display devices using the mobile device; short range transmission of health sensor data from display devices; real-time location systems (RTLS) for display devices; and personal security applications. Wi-Fi can also be utilized with similar applications for the display device.

In one embodiment the display device can be coupled to a Bluetooth adapter that enables the display device to communicate with the mobile device.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

Computer Control Systems

Figure 17:
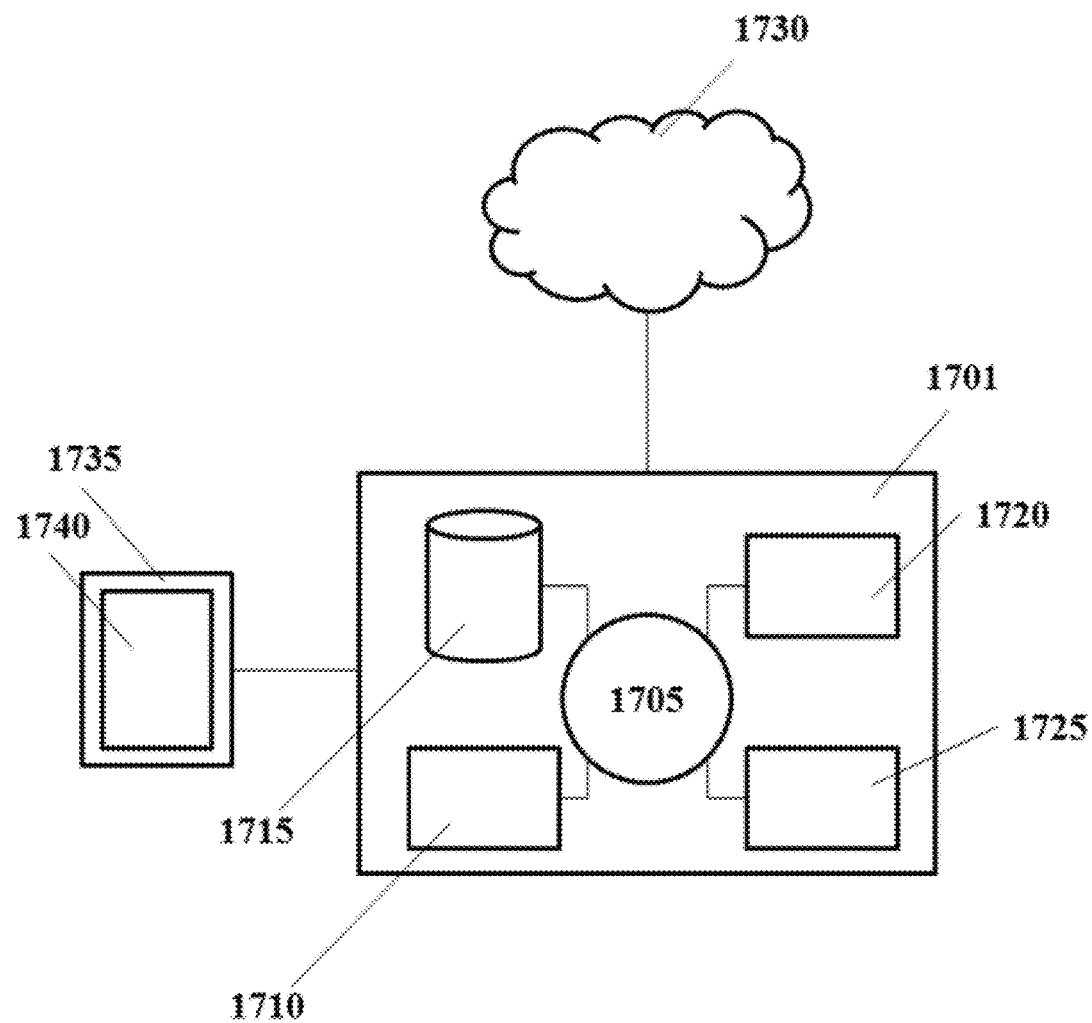
FIG. 17 shows a computer control system that is programmed or otherwise configured to implement methods provided herein.

The present disclosure provides computer control systems that are programmed to implement methods of the disclosure. FIG. 17 shows a computer system 1701 that is programmed or otherwise configured to implement methods of the present disclosure. The computer system 1701 includes a central processing unit (CPU, also "processor" and "computer processor" herein) 1705, which can be a single core or multi core processor, or a plurality of processors for parallel processing. The computer system 1701 also includes memory or memory location 1710 (e.g., random-access memory, read-only memory, flash memory), electronic storage unit 1715 (e.g., hard disk), communication interface 1720 (e.g., network adapter) for communicating with one or more other systems, and peripheral devices 1725, such as cache, other memory, data storage and/or electronic display adapters. The memory 1710, storage unit 1715, interface 1720 and peripheral devices 1725 are in communication with the CPU 1705 through a communication bus (solid lines), such as a motherboard. The storage unit 1715 can be a data storage unit (or data repository) for storing data. The computer system 1701 can be operatively coupled to a computer network ("network") 1730 with the aid of the communication interface 1720. The network 1730 can be the Internet, an internet and/or extranet, or an intranet and/or extranet that is in communication with the Internet. The network 1730 in some cases is a telecommunication and/or data network. The network 1730 can include one or more computer servers, which can enable distributed computing, such as cloud computing. The network 1730, in some cases with the aid of the computer system 1701, can implement a peer-to-peer network, which may enable devices coupled to the computer system 1701 to behave as a client or a server.

The CPU 1705 can execute a sequence of machine-readable instructions, which can be embodied in a program or software. The instructions may be stored in a memory location, such as the memory 1710. The instructions can be directed to the CPU 1705, which can subsequently program or otherwise configure the CPU 1705 to implement methods of the present disclosure. Examples of operations performed by the CPU 1705 can include fetch, decode, execute, and writeback.

The CPU 1705 can be part of a circuit, such as an integrated circuit. One or more other components of the system 1701 can be included in the circuit. In some cases, the circuit is an application specific integrated circuit (ASIC).

The storage unit 1715 can store files, such as drivers, libraries and saved programs. The storage unit 1715 can store user data, e.g., user preferences and user programs. The computer system 1701 in some cases can include one or more additional data storage units that are external to the computer system 1701, such as located on a remote server that is in communication with the computer system 1701 through an intranet or the Internet.

The computer system 1701 can communicate with one or more remote computer systems through the network 1730. For instance, the computer system 1701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1701 via the network 1730.

Methods as described herein can be implemented by way of machine (e.g., computer processor) executable code stored on an electronic storage location of the computer system 1701, such as, for example, on the memory 1710 or electronic storage unit 1715. The machine executable or machine readable code can be provided in the form of software. During use, the code can be executed by the processor 1705. In some cases, the code can be retrieved from the storage unit 1715 and stored on the memory 1710 for ready access by the processor 1705. In some situations, the electronic storage unit 1715 can be precluded, and machine-executable instructions are stored on memory 1710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1701 can include or be in communication with an electronic display 1735 that comprises a user interface (UI) 1740 for providing, for example, an application (app) to permit a user to select media for display. Examples of UI's include, without limitation, a graphical user interface (GUI) and web-based user interface.

Apps of the present disclosure can provide various features and enable various benefits. An app may be about expressing what a user cares about, learning about causes and connecting to others and creating a social experience around causes, philanthropy and self-expression. The user may wear and share what the user cares about, connect and take action to make a social impact. The app may be a visual social network, enabling the user to provide an expression to other individuals. This may be to create awareness, flow resources and create movements around social impact. The app may allow a user to set monthly or other time frame goals around learning, donating, and educating others, about new charities and organizations, causes and opportunities (e.g., philanthropic opportunities). The app may enable a user to express what the user cares about, learning, connecting around various interests of the user.

The app can be used to create expression, share existing expressions, buy and sell expressions, connect and donate to charities, meet and connect with people who share similar interests around causes, such as causes that may benefit society and the world. The app can focus on causes that may positively impact humanity, from improving education to minimizing or addressing various social issues (e.g., animal rights, human rights, pollution, etc.).

The app can provide a marketplace for expressions. The app can enable various experiences. In some examples, the app can allow users in a stadium to be part of a light show; the app can allow GPS to guide individuals to meet based on proximity and shared interests; the app can allow for a user to create a moderated slide-show of expressions; and the app can enable and stimulate global and local conversations around various topics and interests.

The app can be used with a display device (e.g., mountable or wearable display device) of the present disclosure. Alternatively, the app can be used without the display device. The app can allow the user to connect to a display device so that the user can wear and share one or more expressions that the user is "expressing" on the app. The app can allow the user to invite friends to join an expression, movement, or cause (e.g., philanthropic cause), and can allow the user to post on social media.

Methods and systems of the present disclosure can be implemented by way of one or more algorithms. An algorithm can be implemented by way of software upon execution by the central processing unit 1705.

Figure 18:
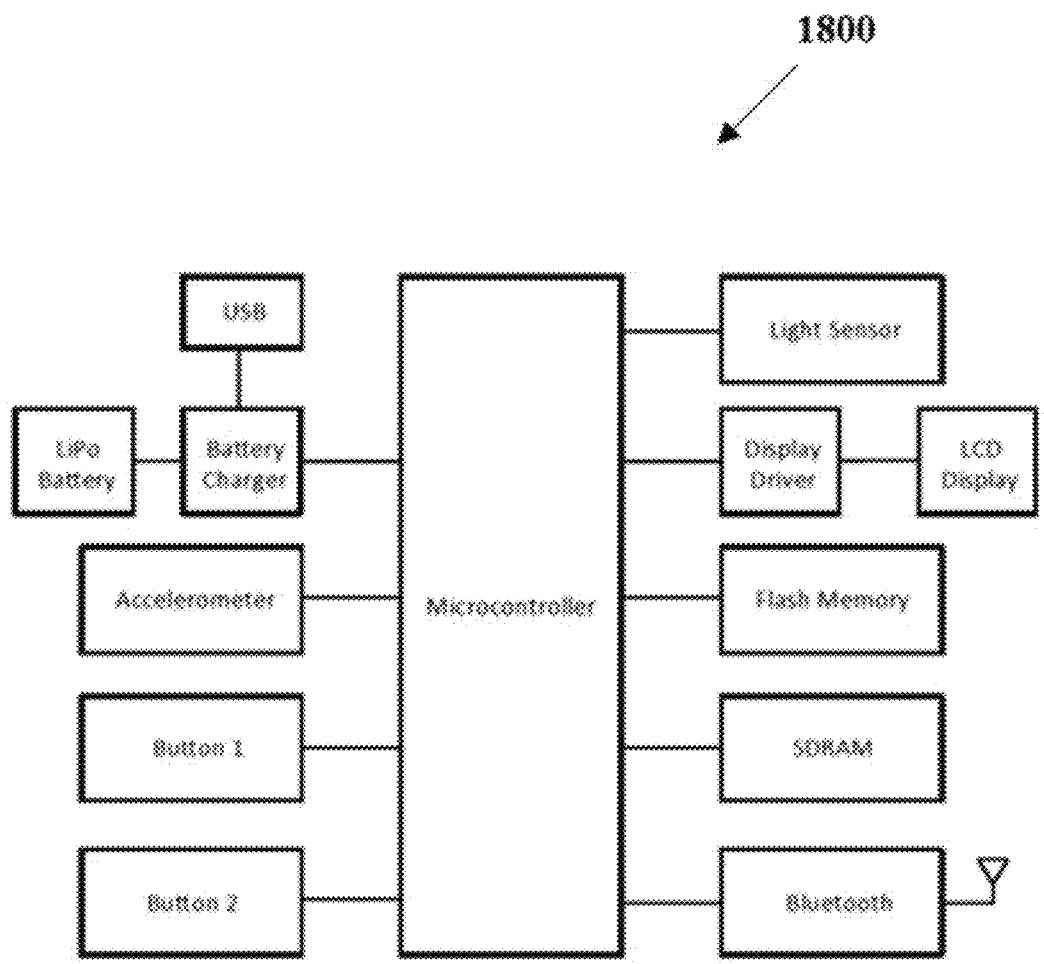
FIG. 18 shows a control unit.

FIG. 18 shows a control unit 1800. The control unit 1800 includes a microcontroller 1801 that is in communication with various other units, including a battery 1803 (e.g., lithium ion polymer battery), a battery charger 1805 that is in communication with a universal serial bus (USB) port, an accelerometer 1807, a first button 1809, a second button 1811, Bluetooth 1813, a first memory 1815 (e.g., synchronous dynamic random access memory, or SDRAM), a second memory 1817 (e.g., flash memory), a display driver 1819, liquid crystal display 1821 (LCD), and a light sensor 1823. The control unit 1800 can be integrated with a display device or system of the present disclosure. For example, the control unit 1800 can be integrated as a circuit board of a display device (e.g., button display).

Systems and Applications for Facilitating Display of Expressions

Another aspect of the present disclosure provides systems and applications for facilitating the display of expressions on a display device. The expressions can include media.

FIGS. 19-25 show screenshots of an application (app) that is programmed to implement or control devices, systems and methods provided herein, including selecting media for display or projection on a display device. The app can be executed on an electronic device of a user, such as a mobile electronic device in communication with the display device. The app can include a graphical user interface (GUI) that is displayed on the electronic device of the user.

Figure 19A:
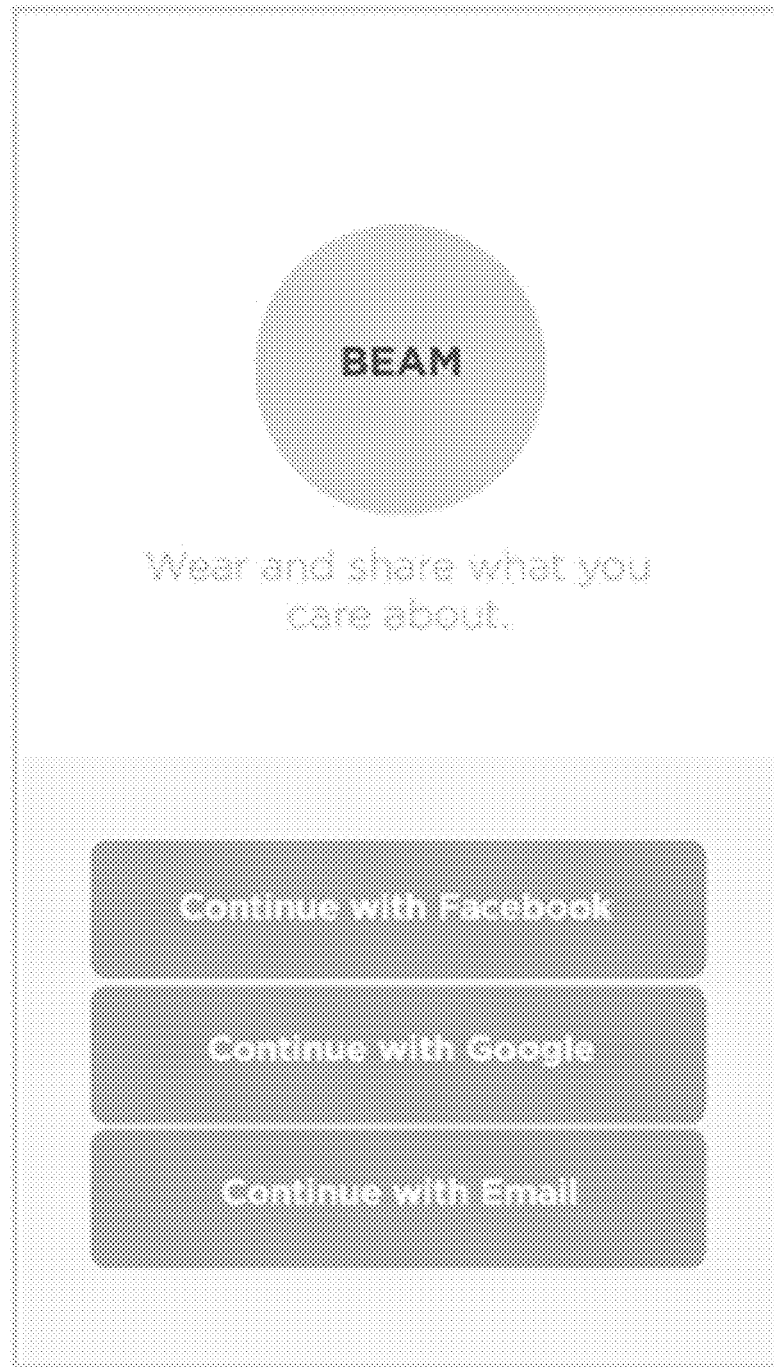
FIGS. 19A-19B show screenshots of an onboarding process of an application (app) for displaying media and expressions.
Figure 19B:
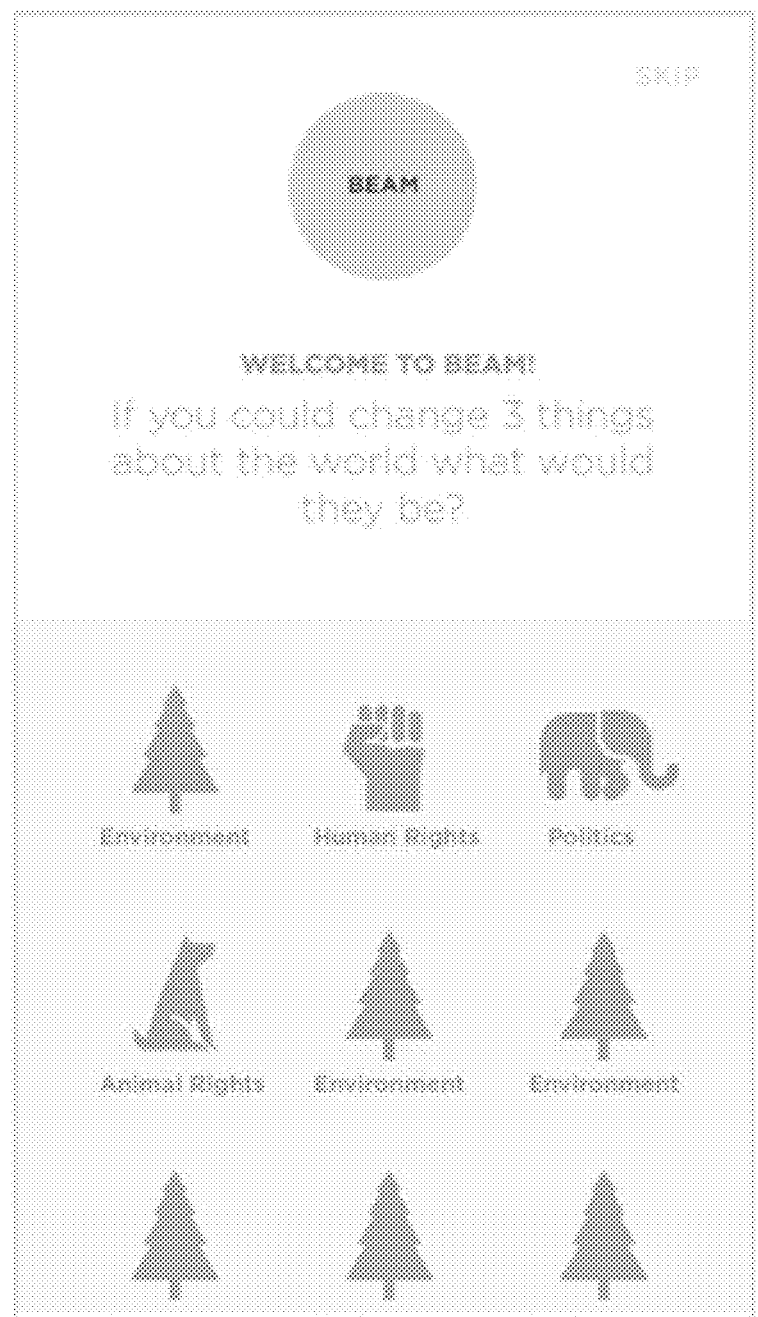

FIGS. 19A-19B show screenshots of an onboarding process of the app. In FIG. 19A, the user is provided with the option of connecting with other users on various social media networks. In FIG. 19B, the user is provided a questionnaire to enable the system to better understand the user.

Figure 20A:
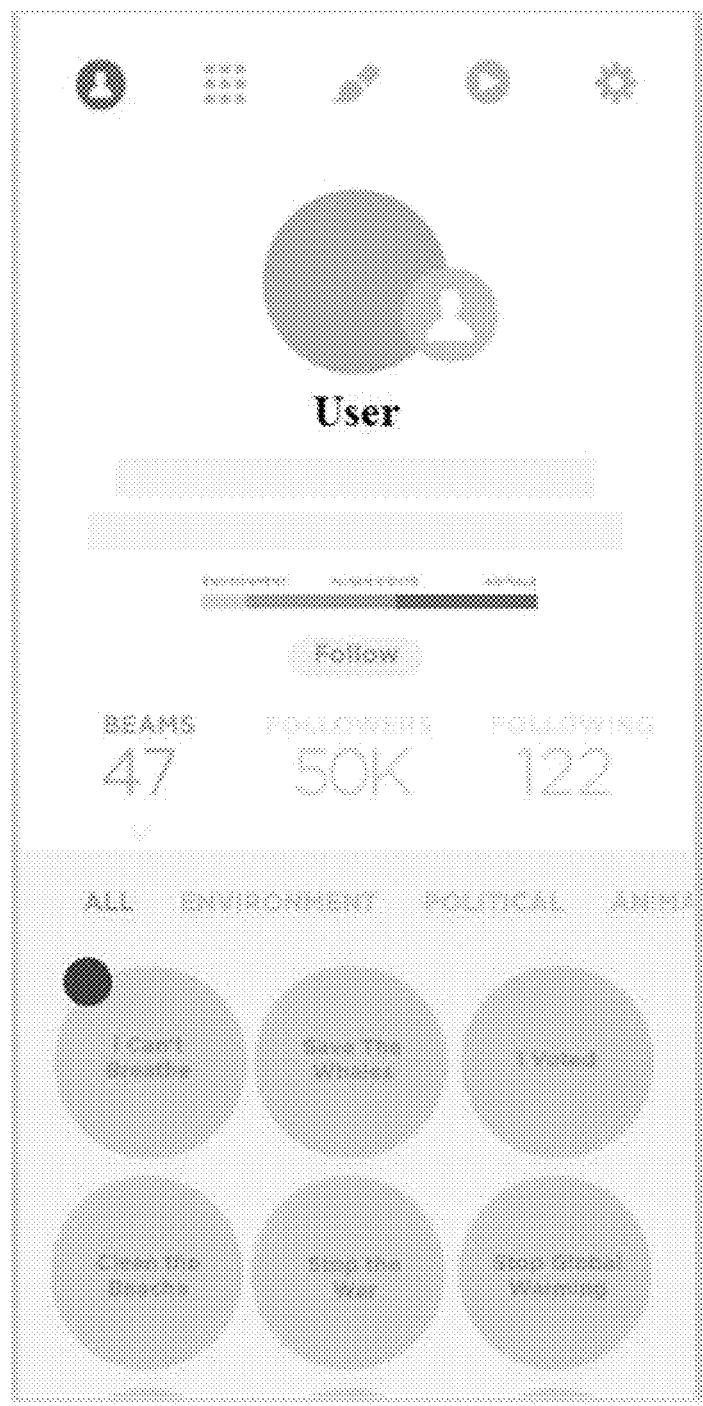
FIGS. 20A and 20B show screenshots of a profile of the user on the app.
Figure 20B:
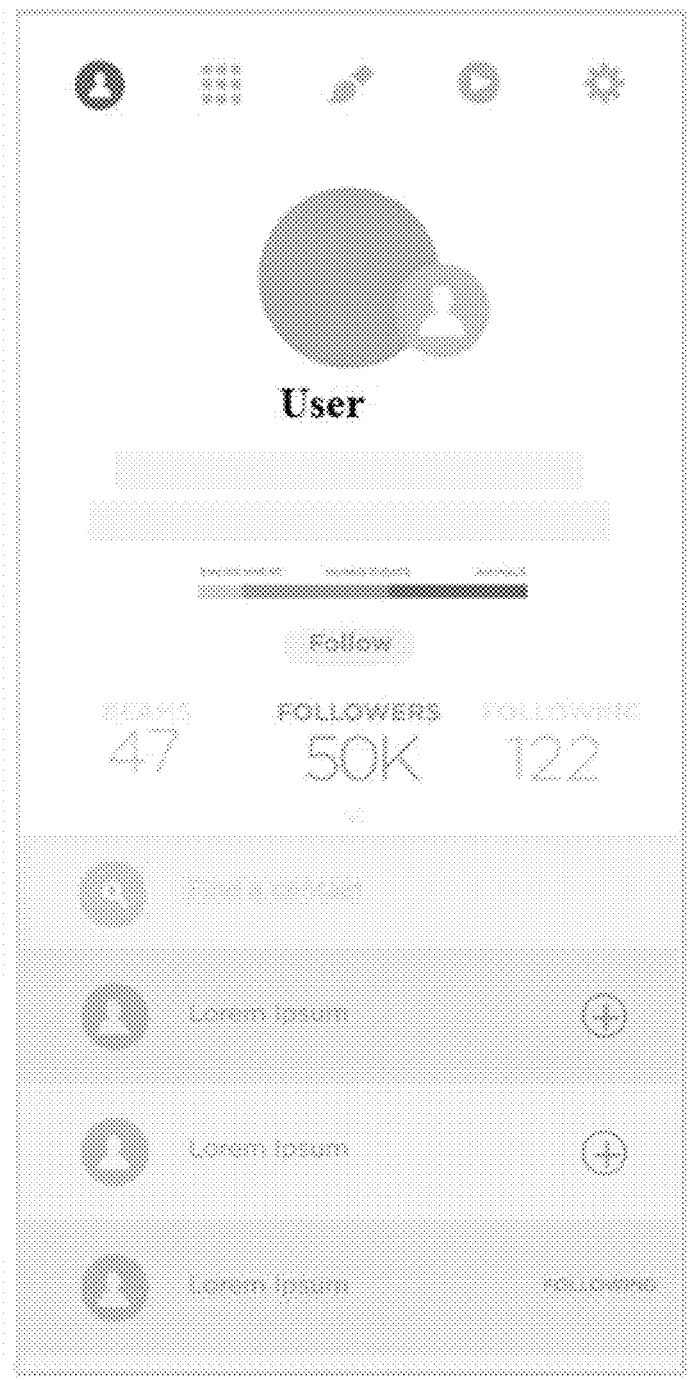

Upon joining the system, the user is provided with a profile. FIGS. 20A and 20B show screenshots of a profile of the user. In FIG. 20A, the profile shows the user's name and avatar, the user's interests, the number of expressions (or "Beams") in a database of the system dedicated to the user, and graphical buttons that are indicative of an interest, context or state (e.g., mood) of the user. The graphical buttons can be indicative of a present or future interest, context or state of the user. The expressions can include media selected by the user.

The app can provide the user with various links, including a "Beams" link to select expressions to display on the display, a "Followers" link to view which other users are following the user, and a "Following" link in which the user can see which other users the user is following. In FIG. 20B, the user has selected the "Followers" link to view the user's followers.

Figure 21A:
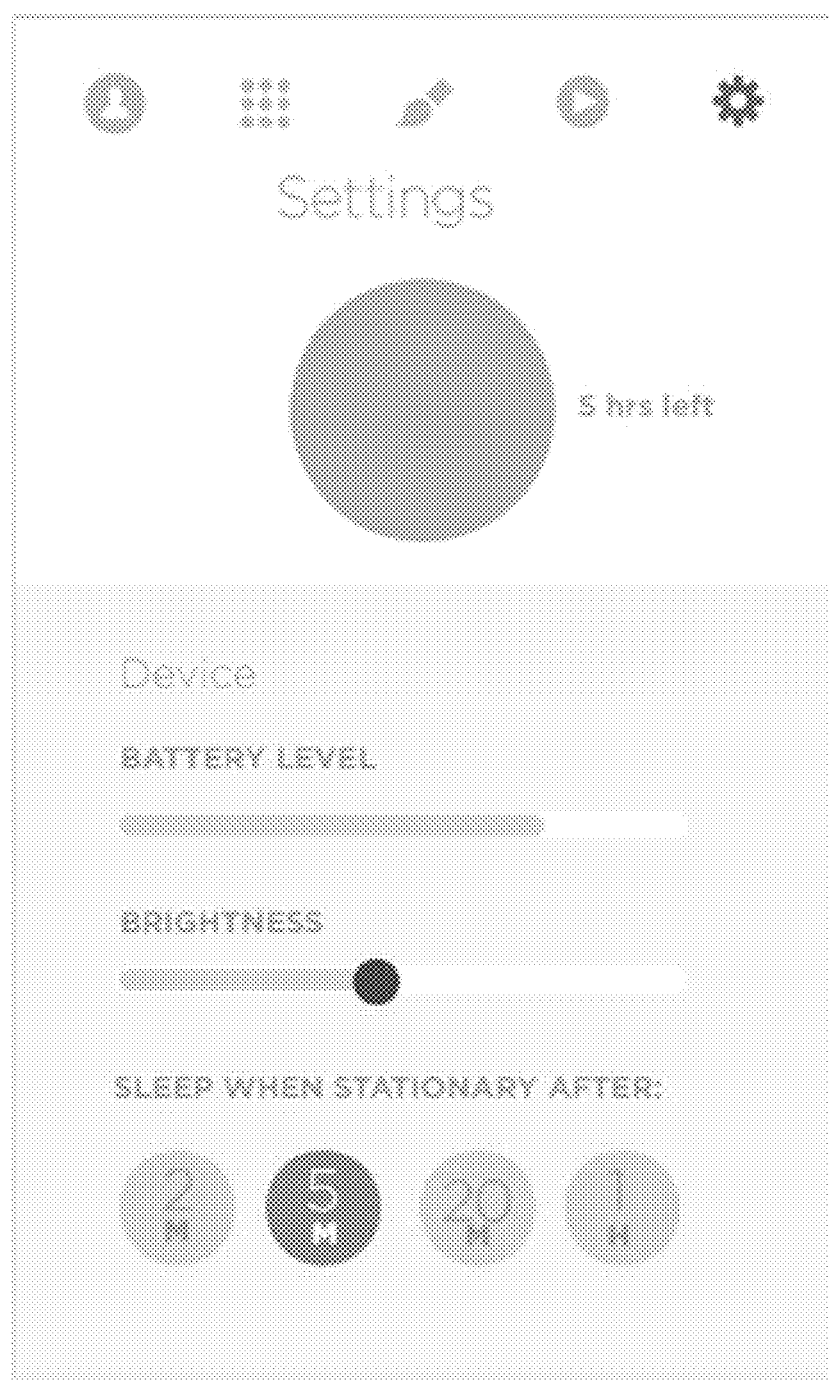
FIGS. 21A and 21B show settings of the app.
Figure 21B:
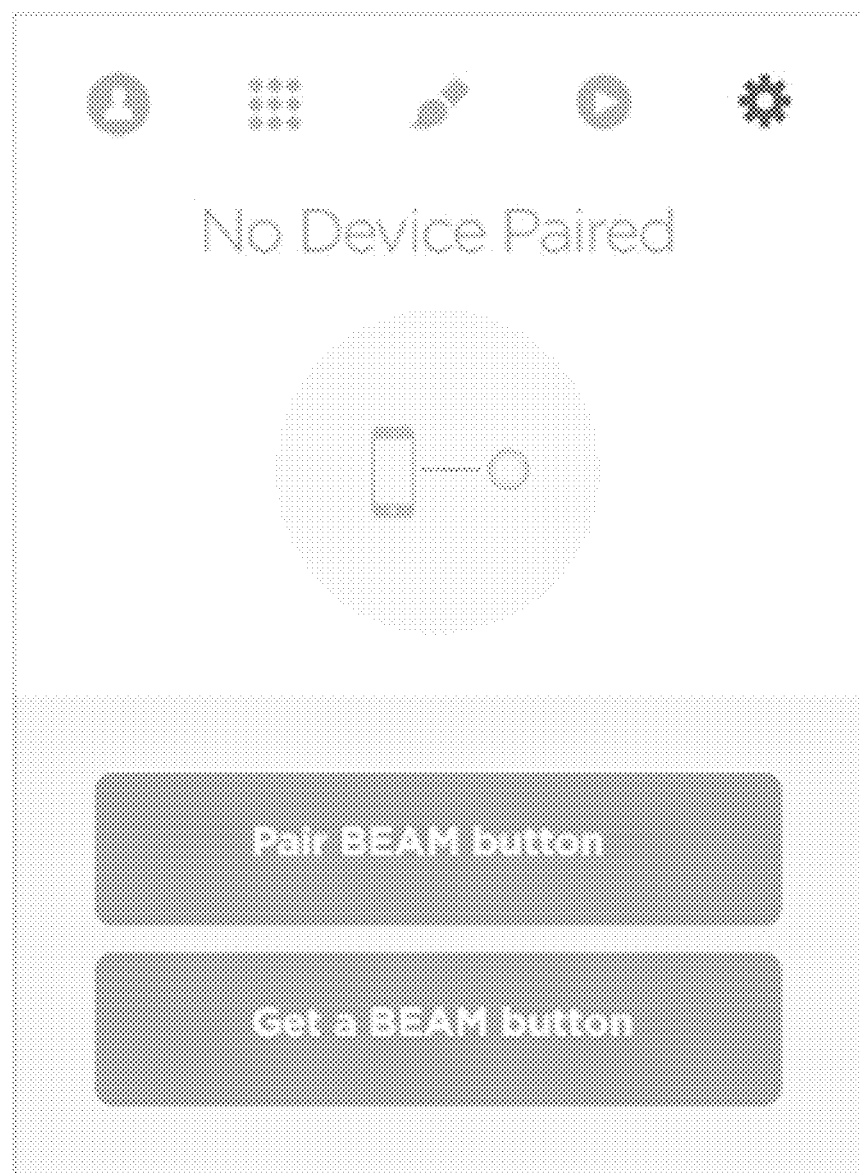

The app can provide the user with various settings, which can enable the user to customize the app and the display device. The user can use the settings to view a battery level (e.g., 5 hours of charge left) of the display device, adjust display settings (e.g., brightness) of a display of the display device, and power properties, such as putting the display device to sleep when the display device or the user is stationary. In FIG. 21A, the app indicates that the battery of the display device has 5 hours of charge left, shows the brightness level of the display of the display device, and indicates that the user has selected to put the display device to sleep when stationary for 5 minutes. The settings can also enable the user to connect (or pair) the electronic device of the user to the display device, as shown in FIG. 21B.

Figure 22A:
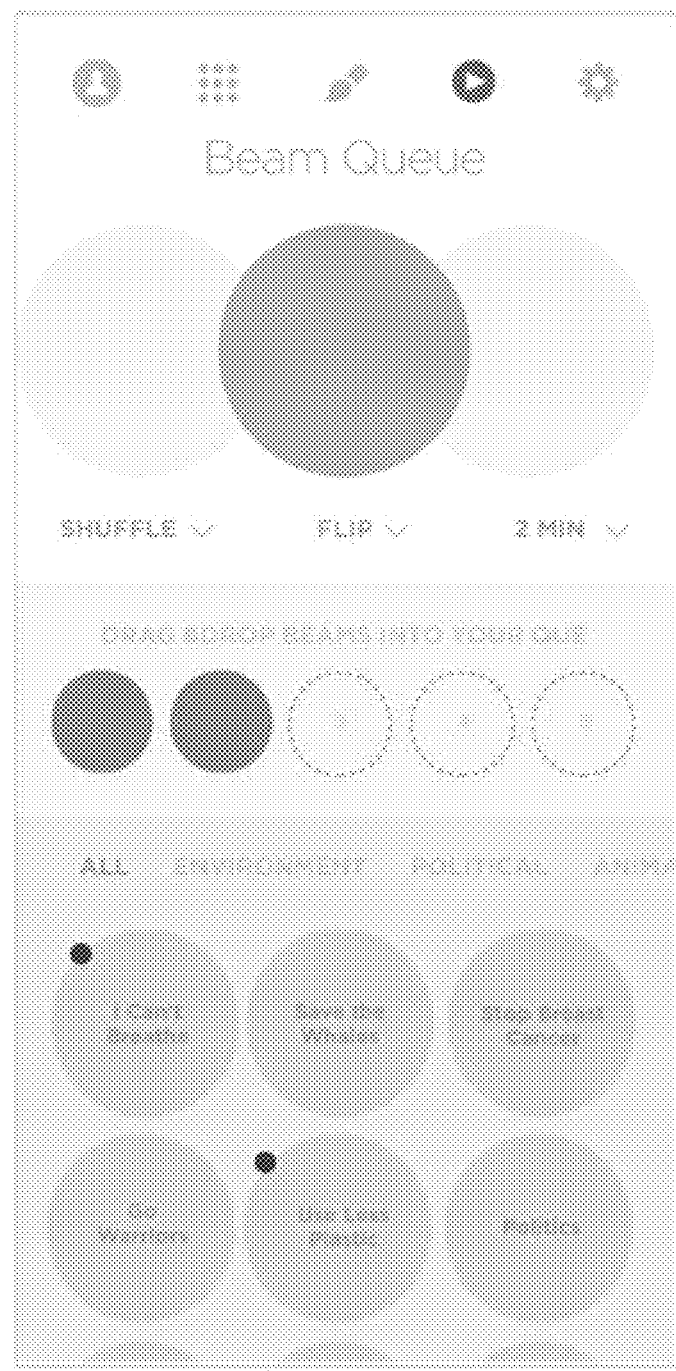
FIGS. 22A and 22B show a queue of the app.
Figure 22B:
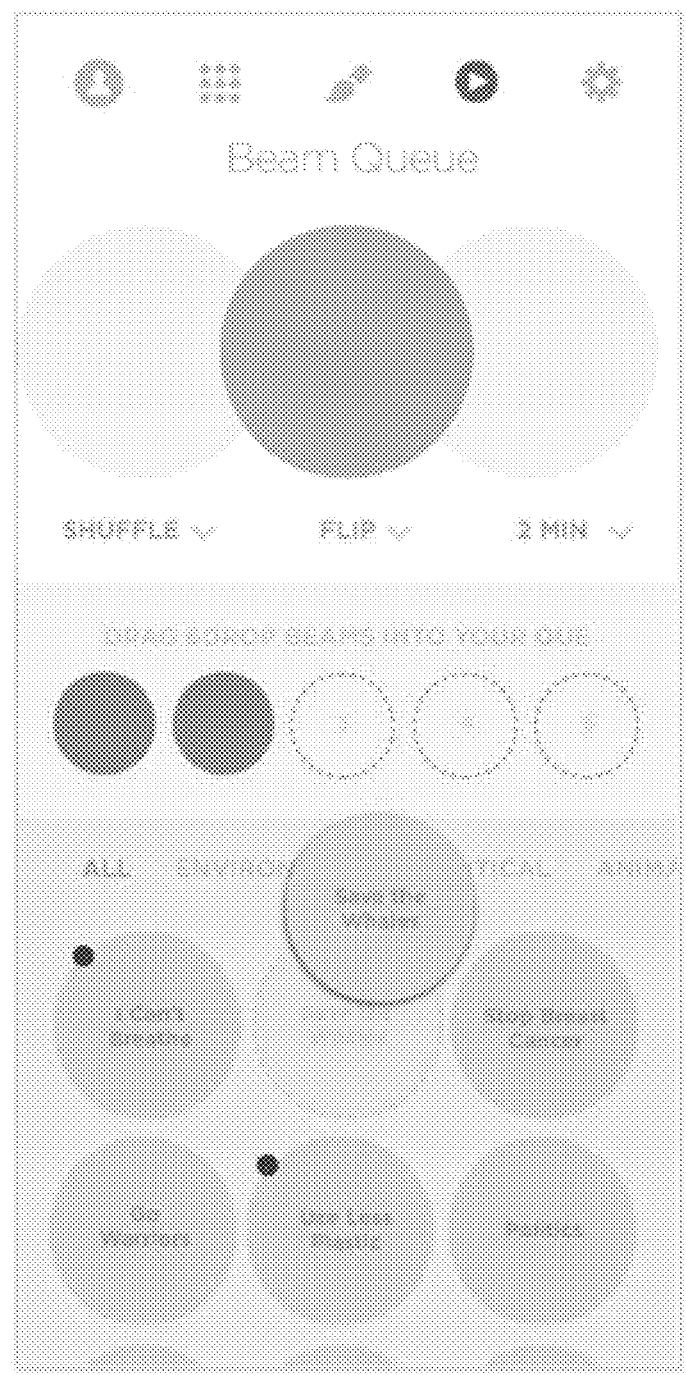

The app can enable the user to select or queue expressions for display on the display device. The app can enable the user to select a display schedule or display preferences, such as displaying expressions at a given point in time and/or location. The app can permit the user to preview the manner in which expressions would be displayed on the display device, including the order, orientation, size, color and brightness of display. The app can permit the user to select transitions from one expression to another, the duration that a given expression is displayed, and triggers that may transition from one expression to another. In FIG. 22A, a queue is displayed at the top of the GUI. Each circle represents an expression that may be displayed on the display device at a given point in the queue. The user can select to shuffle the queue or have the queue displayed in a selected order. The user can set the order, such as by dragging and dropping the circles, as shown in FIG. 22B. The user can select the duration that a given expression may be displayed (e.g., 2 minutes). The user can drag and drop expressions or groups of expressions into the queue. Groups of expressions can include one or more expressions. For example, the user may select from expressions that characterize a state of the user or an interest (e.g., political interest or sports interest) of the user. In an example, the user selects expressions that relate to a baseball team of interest to the user (e.g., the San Francisco Giants).

Figure 23A:
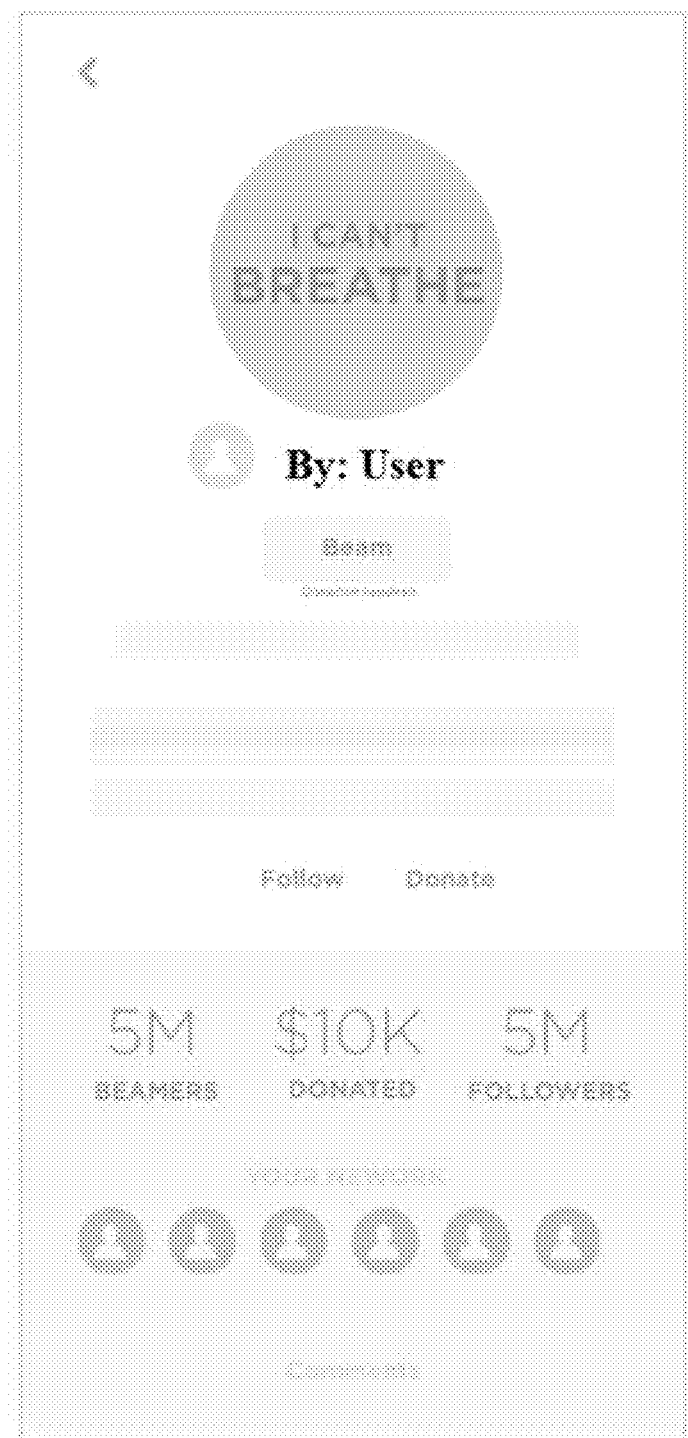
FIGS. 23A and 23B show screenshots associated with displaying expressions in exchange for a donation.
Figure 23B:
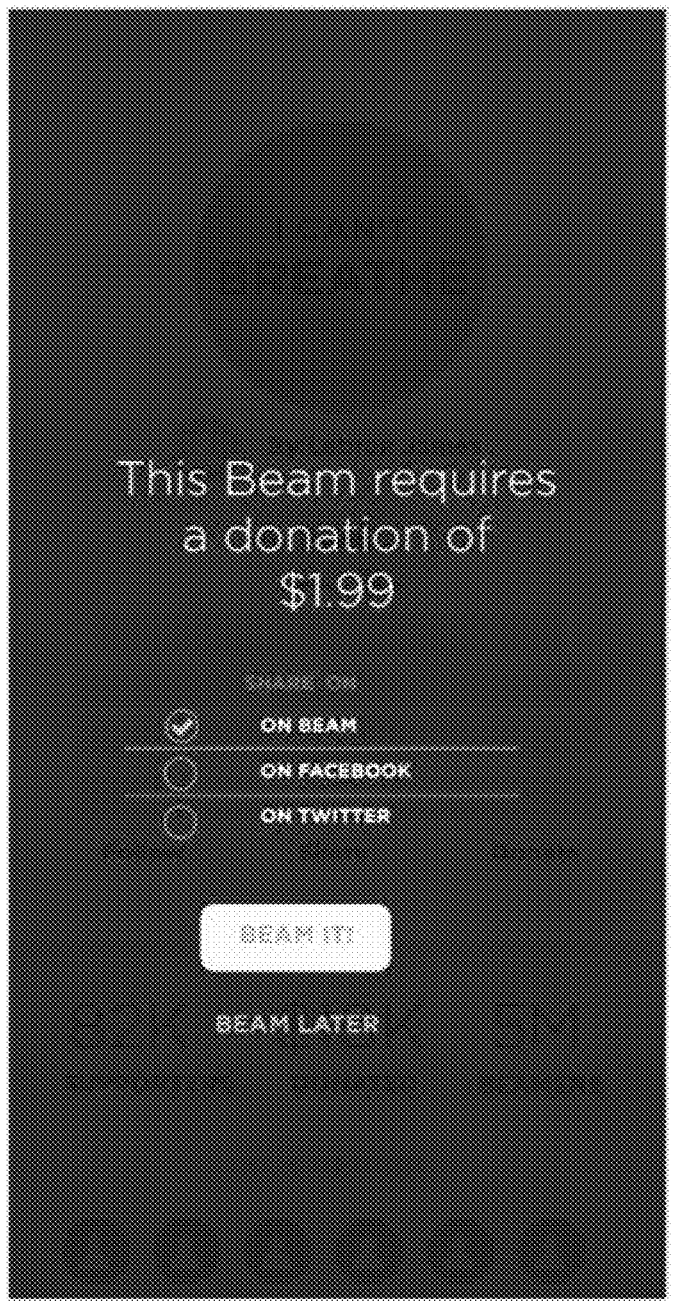

Some expressions may be capable of being displayed upon exchange of an item of value to the user, such as upon the user or other individual making a donation to a given cause or charity. The charity may be selected by the user. In FIG. 23A, a charity of interest to the user or associated with a given expression or group of expressions has collected $10,000 in donations. In FIG. 23B, if the user wishes to display the expression or group of expressions on the display device, the user may need to make a donation (e.g., $1.99 donation) to the charity.

Figure 24A:
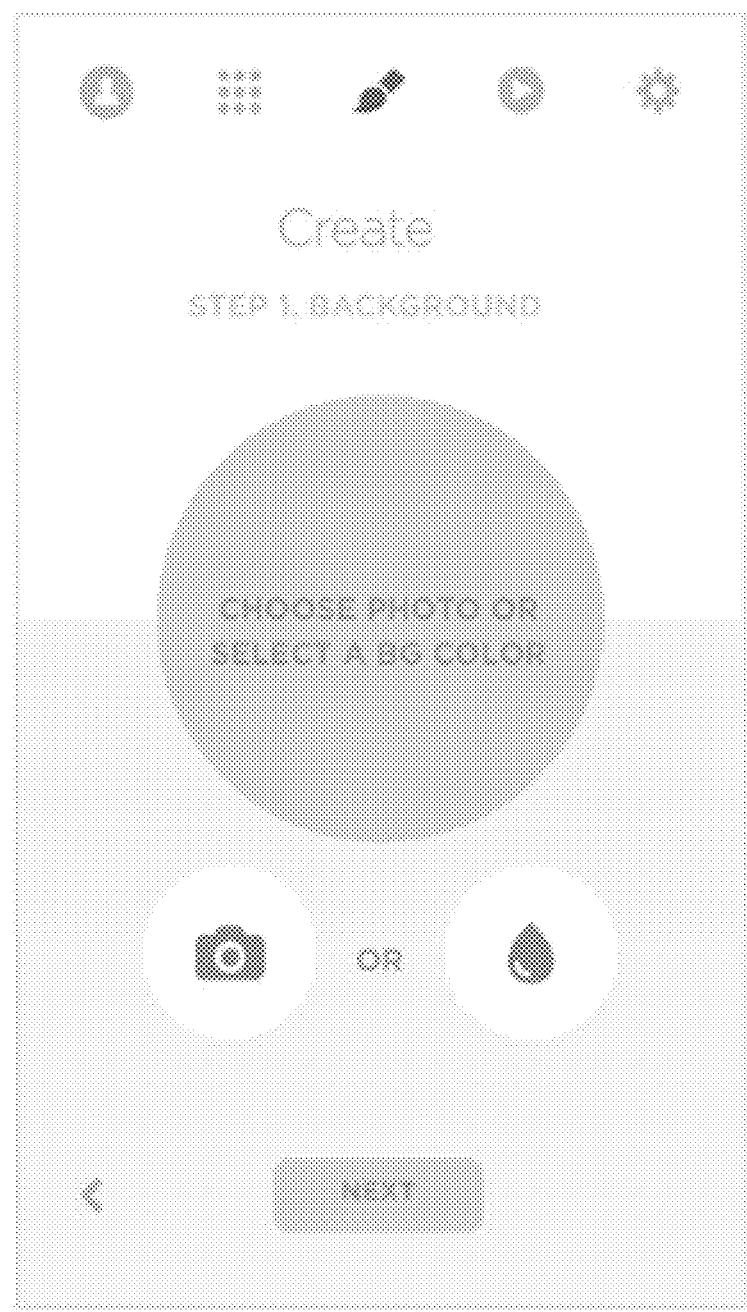
FIGS. 24A-24G show various stages of creation of an expression in the app.
Figure 24B:
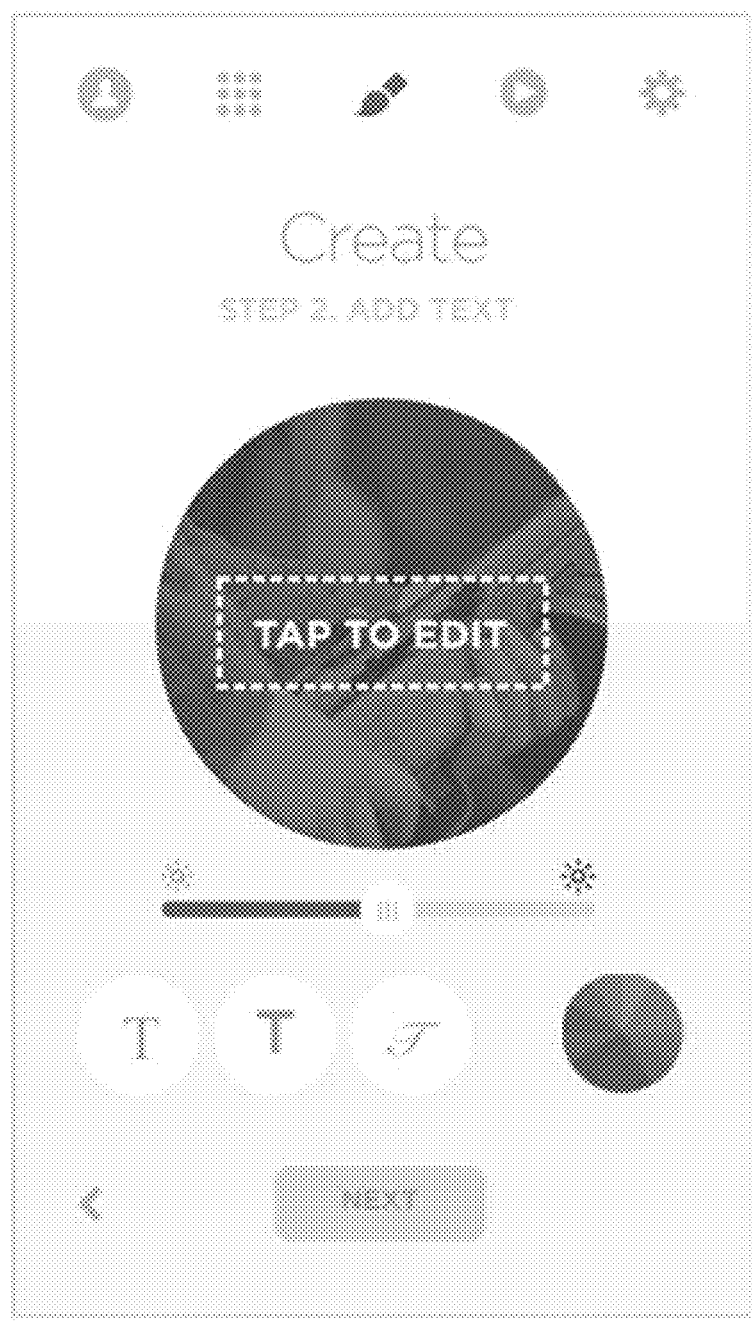
Figure 24C:
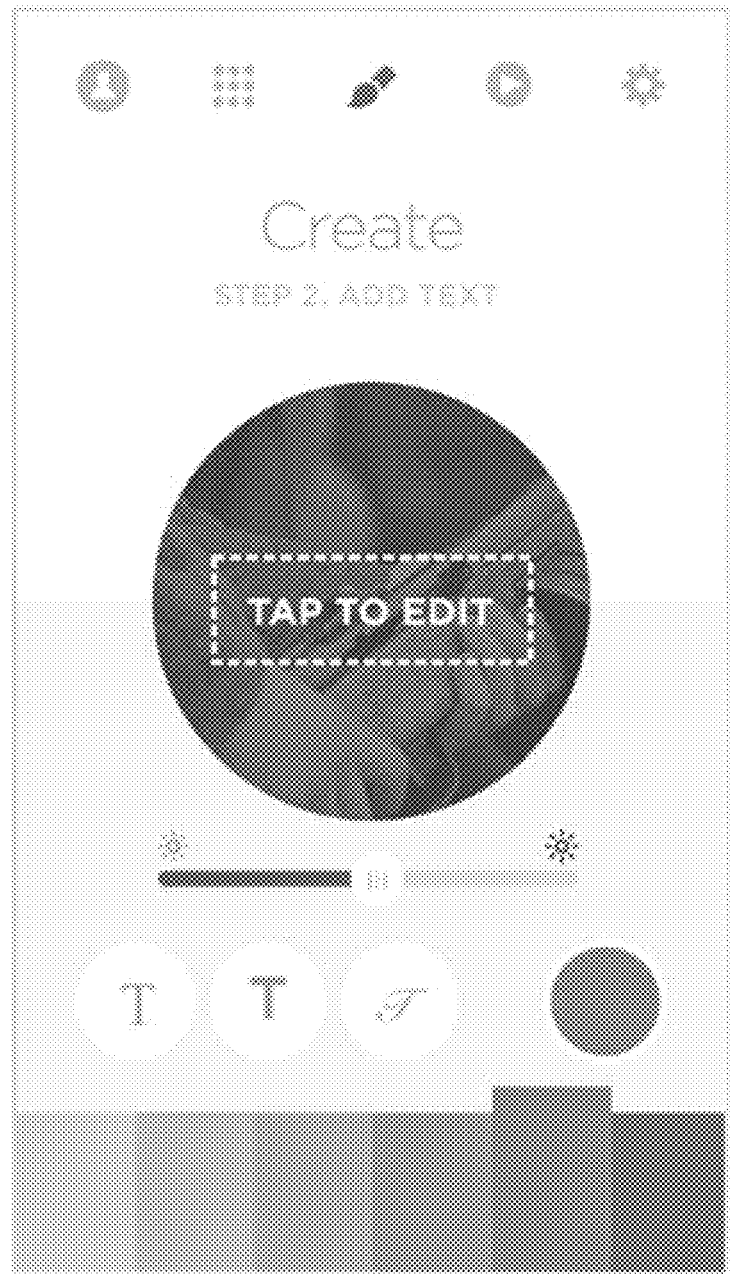
Figure 24D:
Figure 24E:
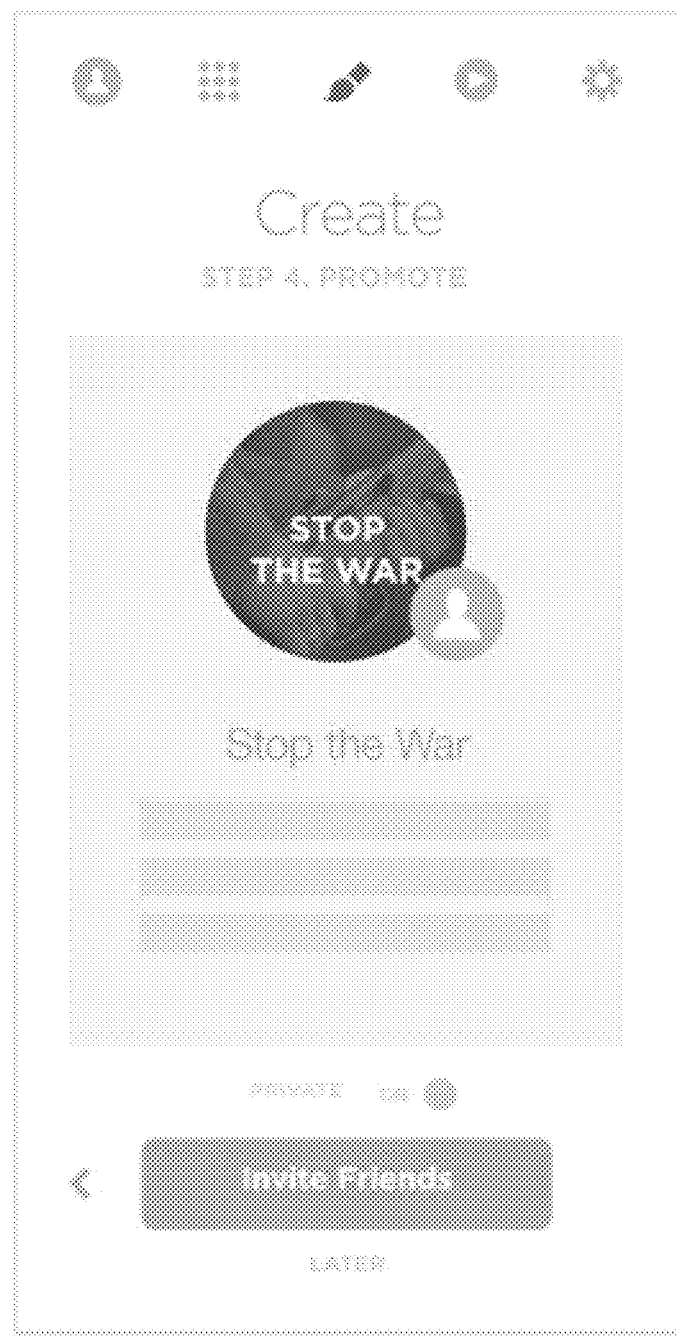
Figure 24F:
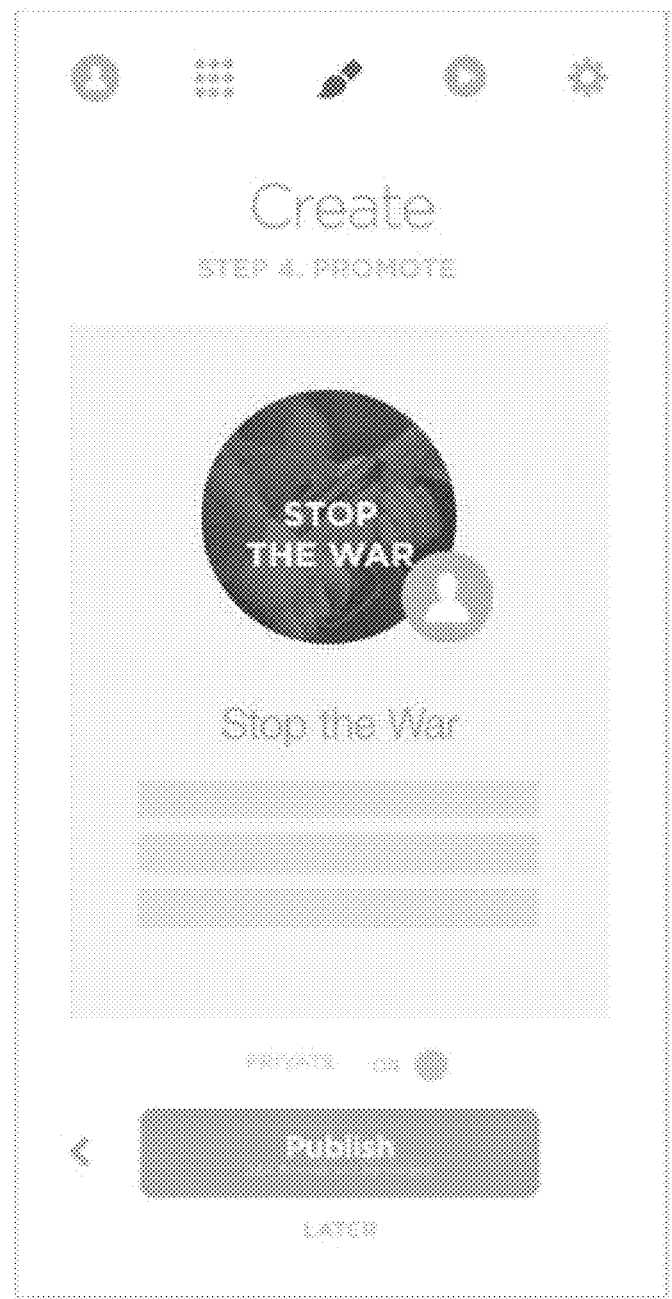
Figure 24G:
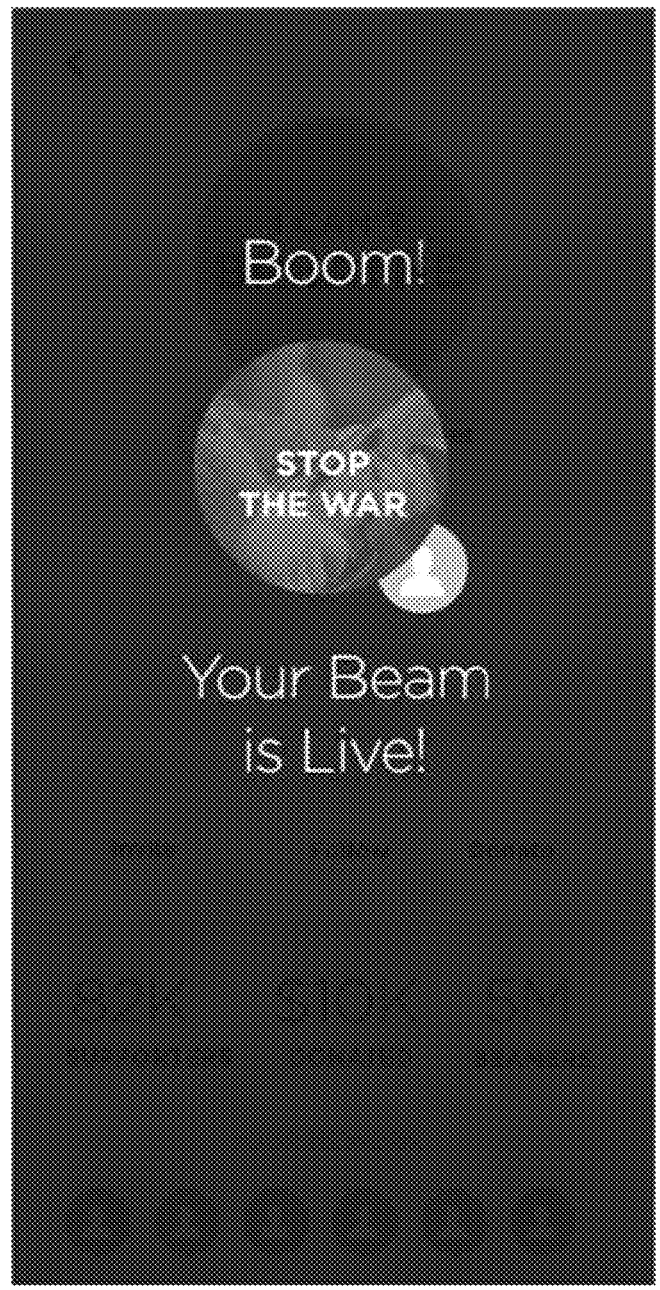

The app can permit the user to create expressions for display on the display device. FIGS. 24A-24G show various stages of creation of an expression. In FIG. 24A, the user may select media from a media repository (e.g., image database) or capture media, such as capture an image using the electronic device of the user. Upon selecting or capturing media, the user may be permitted to edit the media, as shown in FIGS. 24B and 24C. This can include adjusting display properties (e.g., brightness) of the media, adding text to the media, or adding other media (e.g., another image) to the media. Next, the user can provide a description of the expression, as shown in FIG. 24D. The app then permits the user to promote the expression, such as by inviting friends of the user (e.g., friends from a social network), as shown in FIG. 24E. Next, the user can publish the expression, as shown in FIG. 24F. This yields a published expression, as shown in FIG. 24G.

Figure 25:
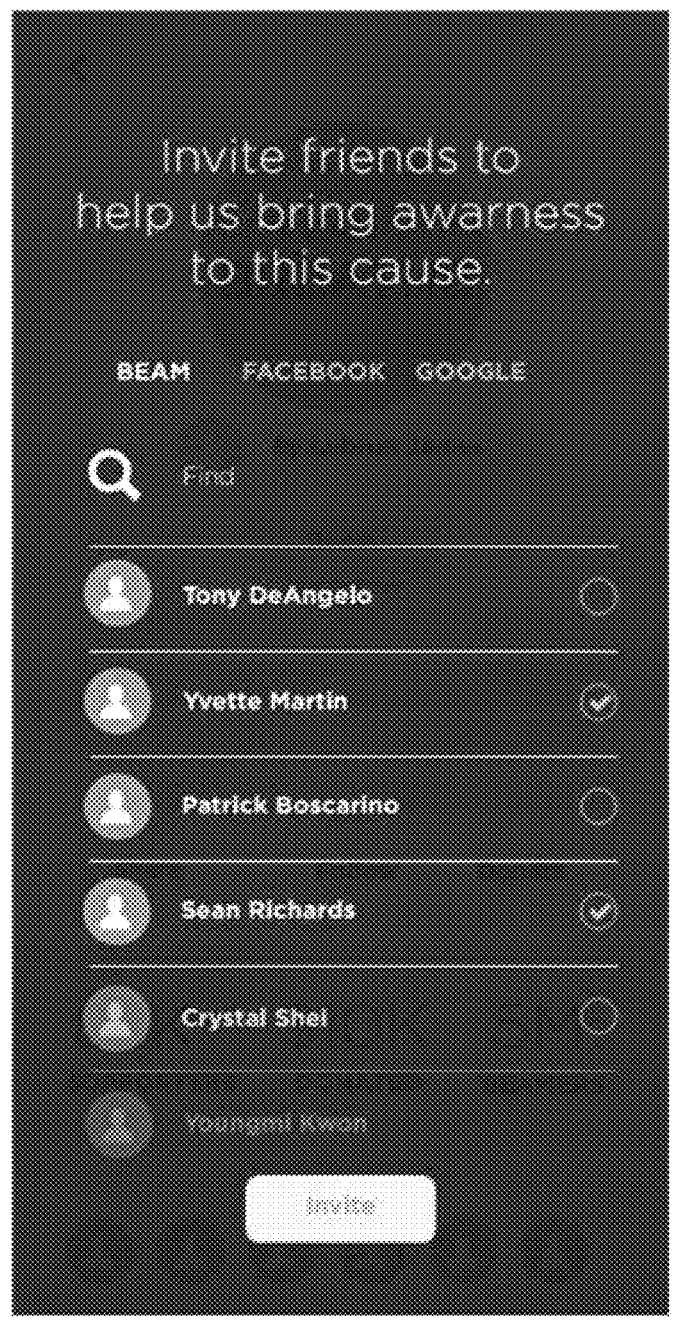
FIG. 25 shows a screenshot of the app, which permits the user to invite other individuals.

The app can permit the user to invite other individuals to the system. In FIG. 25, the app permits the user to invite other individuals from a network of the system and/or various social networks.

The app can permit the user to display expressions at a given point in time, such as immediately or at a future point in time. In an example, the user queues an expression for display at a given day and time.

Expressions may be accessible on a library of expressions. The library of expressions can be on an electronic data repository, such as a database. The electronic data repository can be on the electronic device of the user or a remote computer system, such as a remote server.

The app can inform other individuals that are on a social network of the user which expressions are being displayed or projected by the user. For example, the app can broadcast identifying information of an expression or queue of expressions on a social network of the user, which may be accessible by other individuals (e.g., friends) of the user on the social network.

The app can permit various features. The app can show the user what is trending and provide the user with news flow. The app can automatically create a default application for the user. The app can provide privacy settings, such as permitting the user to keep certain media and expressions private while other accessible by the public or select individuals, such as select users.

The app can permit users that do not have a display device to communicate with other users. This can be facilitated through a server in network communication with electronic devices of users.

The app can permit a user to donate to a cause or an organization, or to make the display or media and expressions contingent on a user making a donation to a cause or an organization. The app can permit a user to provide goals, such as lifestyle goals. The app can provide the user with alerts once a goal or other action has been met, such as if the user has reached a given location or if the user is in proximity to another user that is a friend or follower of the user. The app can let the user know how far the user is from reaching a goal, such as a donation target.

The app can color code expressions. This can enable other individuals to, for example, determine what an expression is about or how far a user is from reaching a goal (e.g., a green shade may indicate that the user is close to reaching a goal).

Apps of the present disclosure can provide various features and enable various benefits. An app may be about expressing what a user cares about, learning about causes and connecting to others and creating a social experience around causes, philanthropy and self-expression. The user may wear and share what the user cares about, connect and take action to make a social impact. The app may be a visual social network, enabling the user to provide an expression to other individuals. This may be to create awareness, flow resources and create movements around social impact. The app may allow a user to set monthly or other time frame goals around learning, donating, and educating others, about new charities and organizations, causes and opportunities (e.g., philanthropic opportunities). The app may enable a user to express what the user cares about, learning, connecting around various interests of the user.

The app can be used to create expression, share existing expressions, buy and sell expressions, connect and donate to charities, meet and connect with people who share similar interests around causes, such as causes that may benefit society and the world. The app can focus on causes that may positively impact humanity, from improving education to minimizing or addressing various social issues (e.g., animal rights, human rights, pollution, etc.).

The app can provide a marketplace for expressions. The app can enable various experiences. In some examples, the app can allow users in a stadium to be part of a light show; the app can allow GPS to guide individuals to meet based on proximity and shared interests; the app can allow for a user to create a moderated slide-show of expressions; and the app can enable and stimulate global and local conversations around various topics and interests.

The app can be used with a display device (e.g., mountable or wearable display device) of the present disclosure. Alternatively, the app can be used without the display device. The app can allow the user to connect to a display device so that the user can wear and share one or more expressions that the user is "expressing" on the app. The app can allow the user to invite friends to join an expression, movement, or cause (e.g., philanthropic cause), and can allow the user to post on social media.

Example 1

Figure 26:
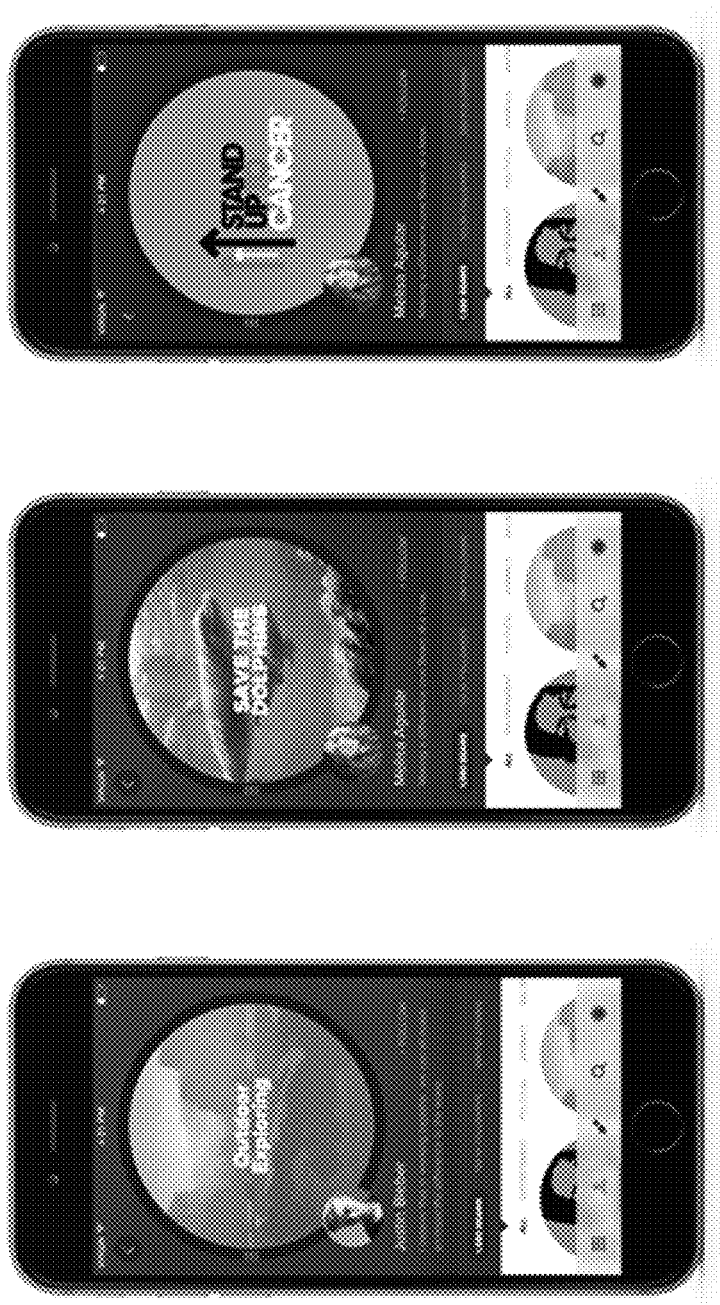
FIG. 26 shows various electronic devices with applications (apps) that display profiles usable with display devices of the present disclosure.

FIG. 26 shows various electronic devices with applications (apps) that display profiles usable with display devices of the present disclosure. The app can display a profile of a user, including a cause or event that a user can subscribe to (e.g., "SAVE THE DOLPHINS" OR "STAND UP TO CANCER"). The app can permit the user to view how many other users are following the cause or event and to permit the user to make a donation. The user may select one or more expressions of the cause of even to display or project on a display device of the user.

Figure 27:
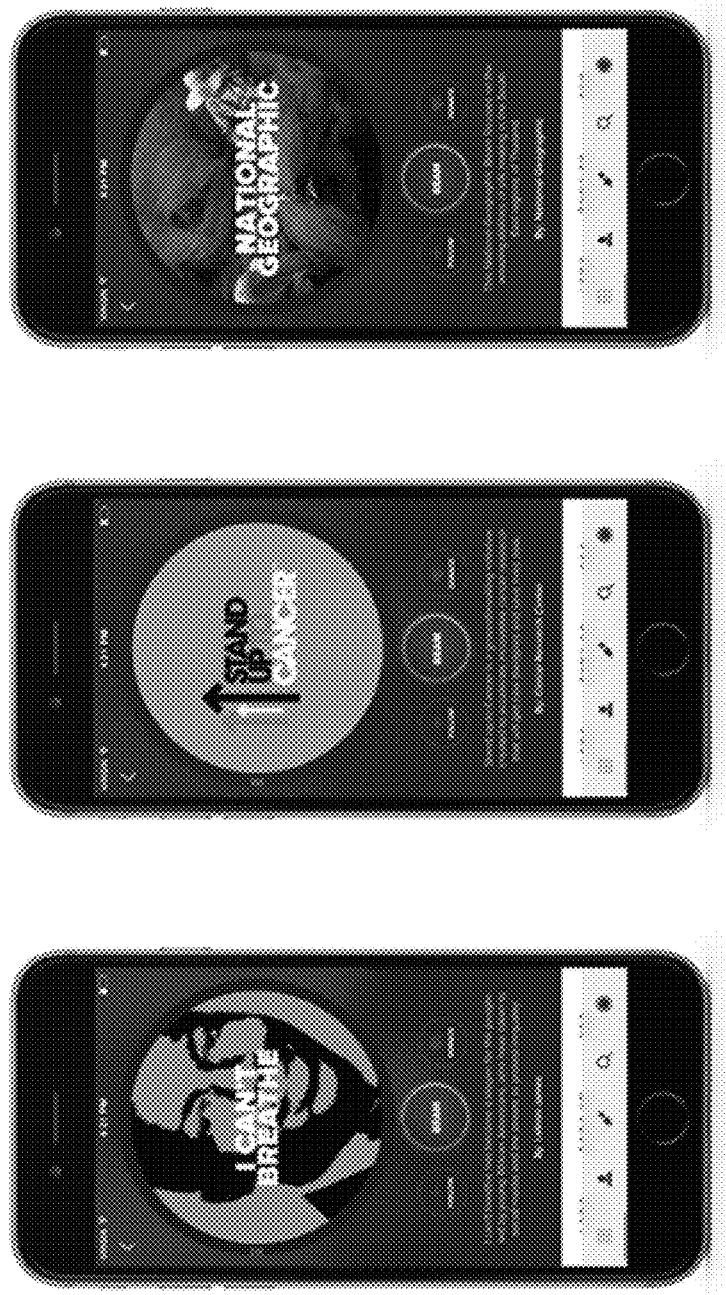
FIG. 27 shows screenshots of apps in which the user can select an expression or group of expression to be presented on or displayed by a display device.
Figure 28A:
FIGS. 28A-28E show screenshots of a process for creating or editing an expression for display on or projection by the display device.
Figure 28B:
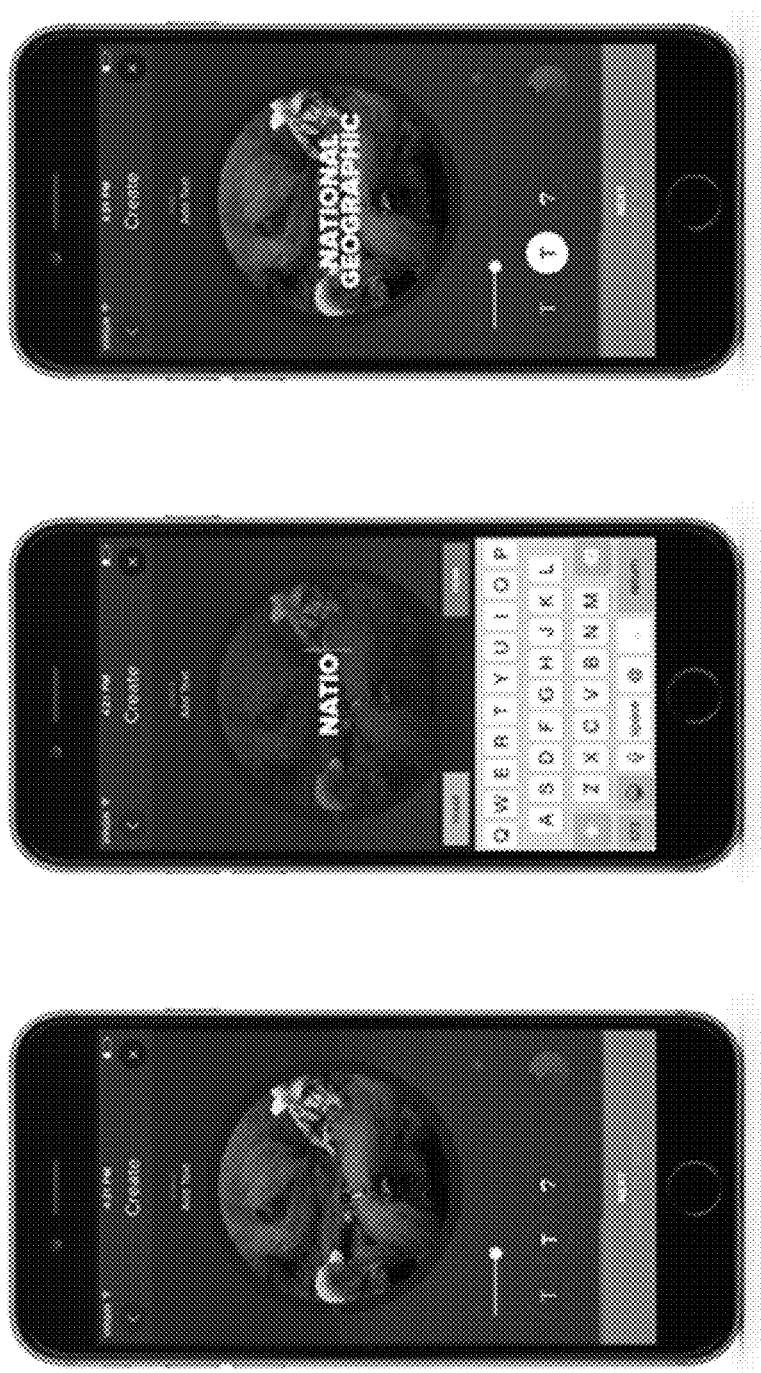
Figure 28C:
Figure 28C:
Figure 28C:
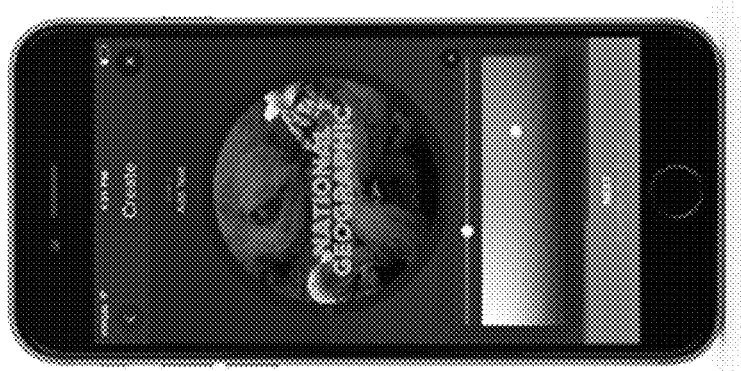
Figure 28D:
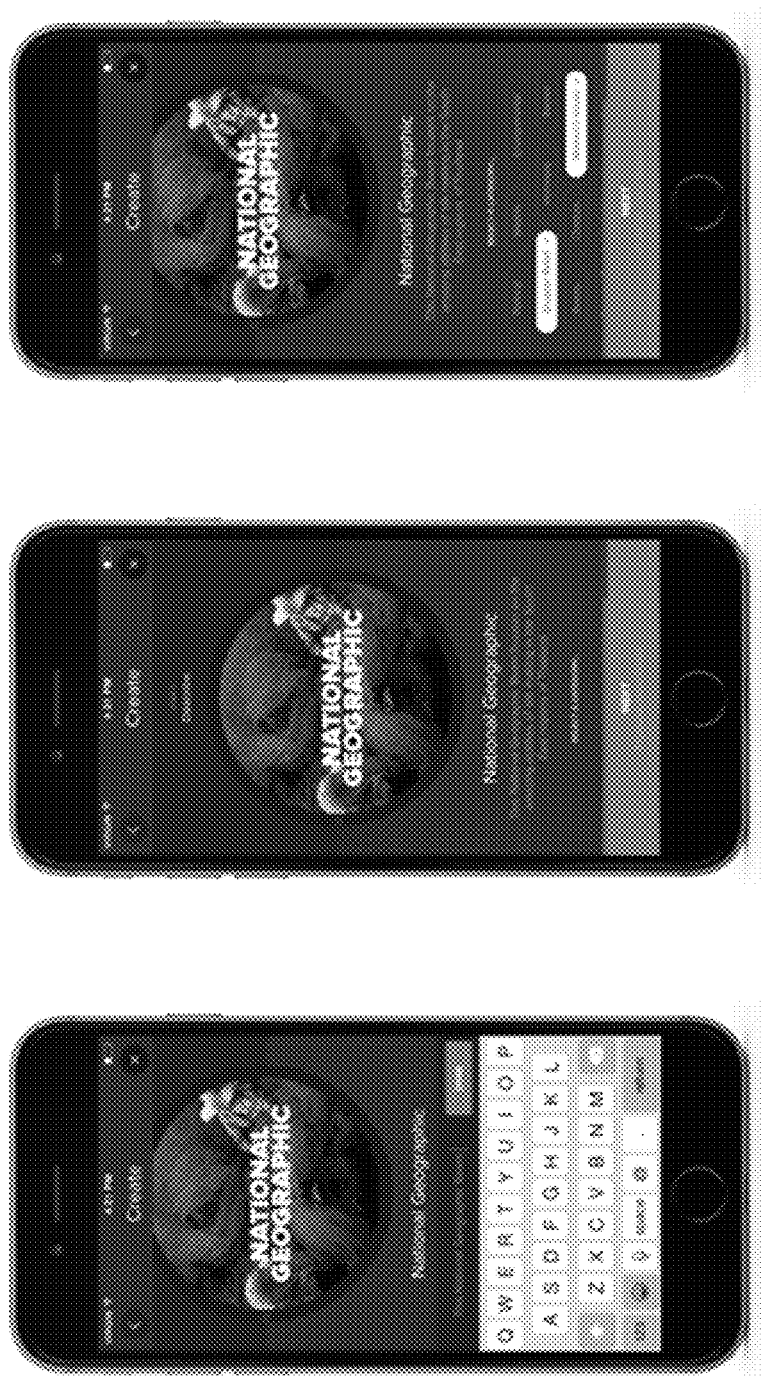
Figure 28E:
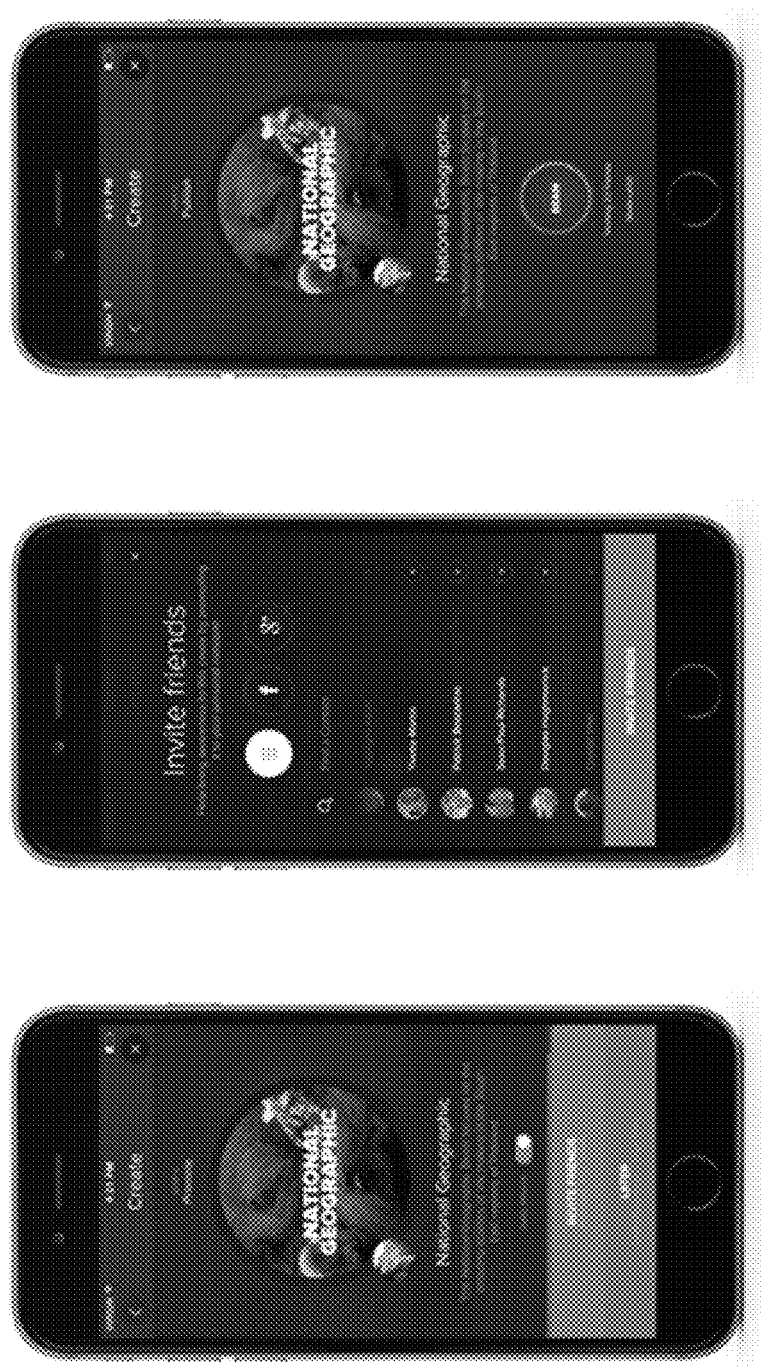

In FIG. 27, the user can select a given expression or group of expressions to be displayed on or projected by the display device. The given expression or group of expressions can be associated with the cause or event.

The app can permit the user to create or edit expressions. FIGS. 28A-28E show various stages associated with the creation of an expression for display or projection on a display device. The user can select a background image and provide text on the background image. The user can provide text next to or around the background image. The user can select or modify various properties of the image or expression, such as brightness. The user can finalize the expression for display on the display device.

The display screens of the present disclosure may be configured for use with gestures, such as swiping across a display screen. For example, media may be selected by a user by swiping on the display screen. As another example, the user may scroll through media by swiping from left to right, right to left, top to bottom, or bottom to top.

Example 2

FIGS. 29-30 show various examples of display devices mounted on inanimate objects, such as vehicles, helmets and buildings.

FIGS. 29A and 29B show a display device 2901 that can be mounted on or embedded in a body of a vehicle 2902. The display device 2901 can be a display screen or a projector that projects media to a dedicated or allocated area on the vehicle 2902.

Figure 30A:
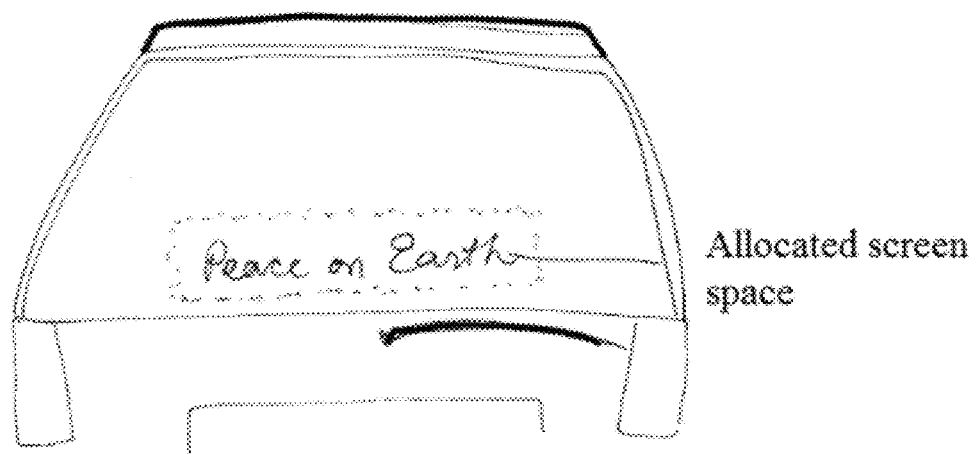
FIGS. 30A-30G show various examples of display devices mounted on inanimate objects.

FIG. 30A shows a display device mounted on a vehicle. The display device may be a digital bumper sticker. The display device may be mounted on a body of the vehicle, such as a window of the vehicle. The display device may be mounted on the window of the vehicle, either inside or outside the vehicle. For example, the display device may be mounted on the rear window of the vehicle, either inside or outside the rear window. As an alternative, the display device may be built into the body of the vehicle, such as built into vehicle outer body or rear window. As another alternative, the display device may project media onto the body of the vehicle, such as onto a window (e.g., rear window), a portion of the window, or a portion of the body of the vehicle. Media may be displayed or projected on an allocated screen space.

Figure 30B:
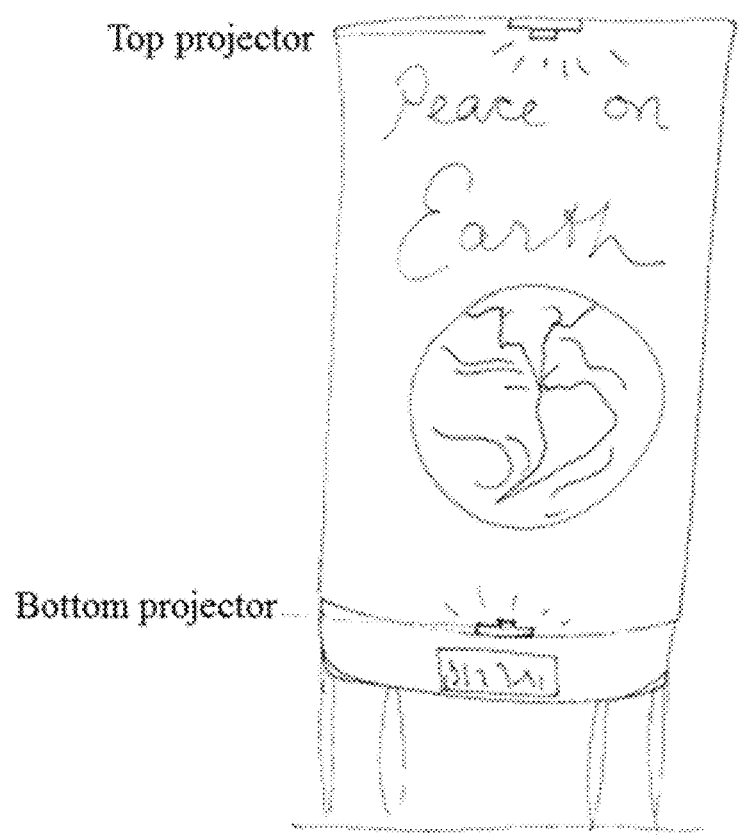

FIG. 30B shows a truck with a top projector and bottom projector, which display media on a back section of the truck. As an alternative, the truck may include only one of the top projector or bottom projector. Each projector may display the same media or different media. For example, the media display by the top projector may be a portion (e.g., 50%) of the overall image and media projected by the bottom projector may be a remainder (e.g., 50%) of the overall image displayed on the back section of the truck.

Figure 30C:
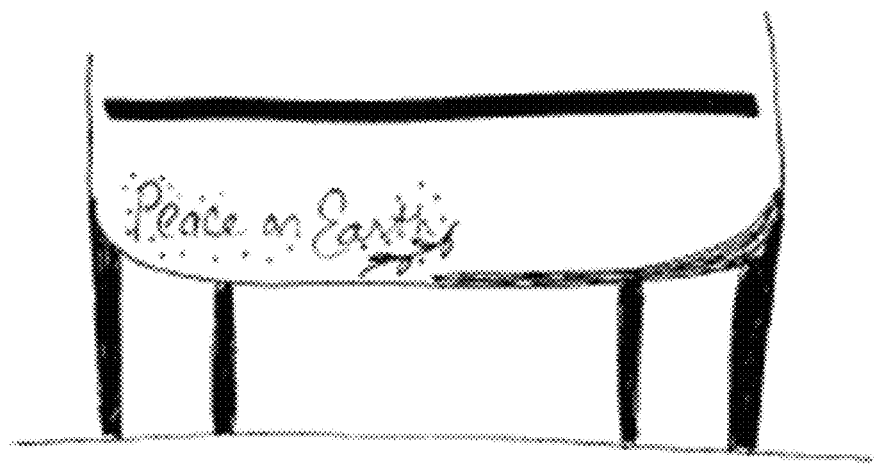

FIG. 30C shows a vehicle with a display device that is embedded in a body of the vehicle. The display device can be embedded in a bumper of the vehicle.

Figure 30D:
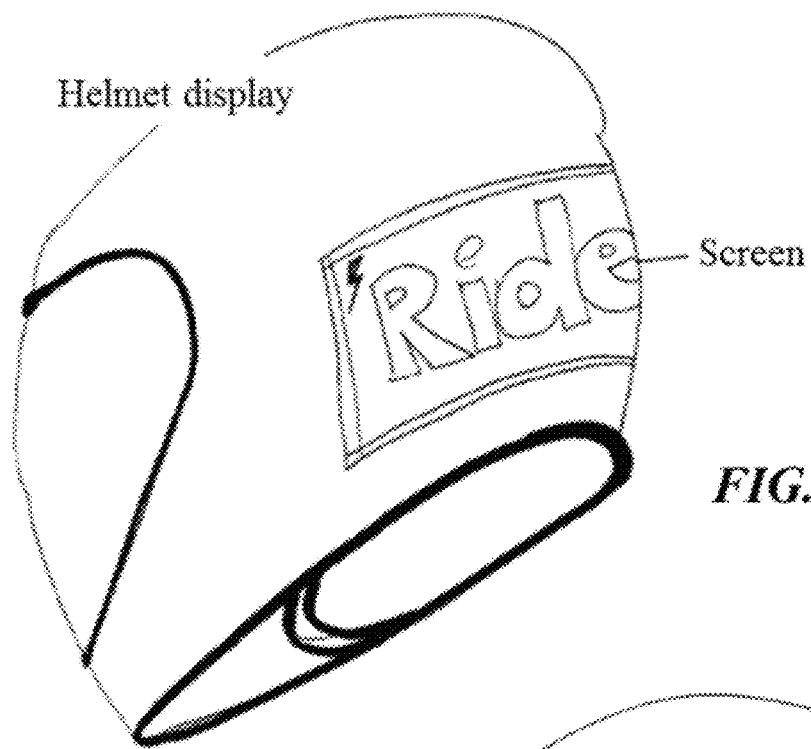
Figure 30E:
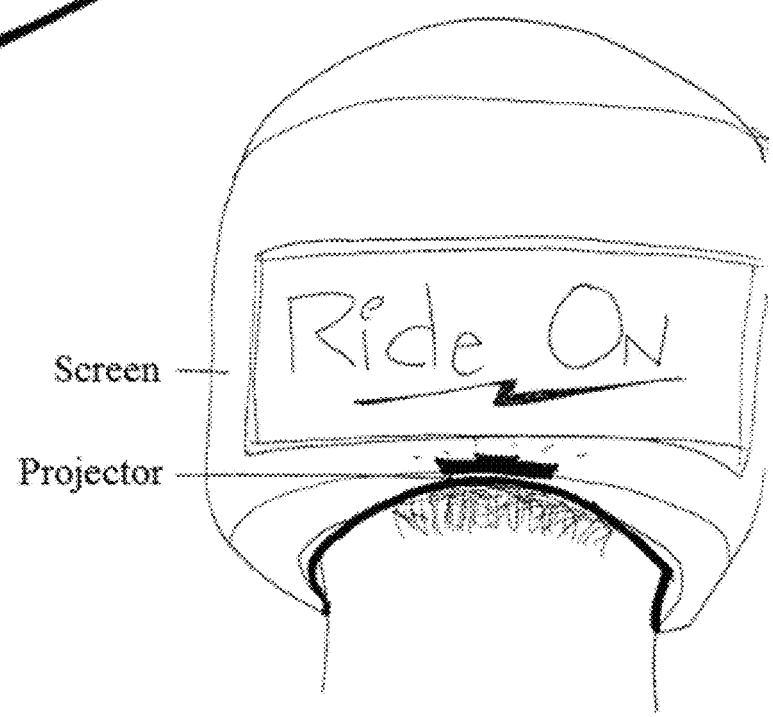

FIGS. 30D and 30E show a helmet with display devices. In FIG. 30D, the display device is a display screen, such as an electronic display screen (e.g., LED). In FIG. 30E, the display device is a screen with a projector. The projector projects media ("Ride On") onto the screen.

Figure 30F:
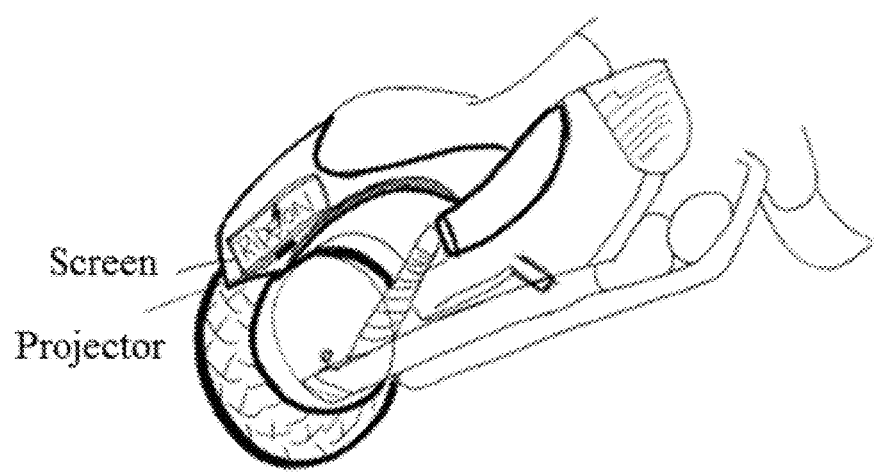

FIG. 30F shows a display device mounted on a motorcycle. The display device is a back fender display. The display device includes a screen and a projector.

Figure 30G:

FIG. 30G shows a display device mounted on a building (e.g., home). In the illustrated example, the display device is mounted on a window of the building. The display device may be mounted inside or outside the building. For example, the display device may be mounted on the window inside the building. As an alternative, the display device may be embedded on the building, such as embedded in the window.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A digital bumper sticker for displaying media selected by a user, comprising:
   a support member configured to mount on or in close proximity to a rear surface of a vehicle; and
   a substantially planar visual curvilinear display mounted on the support member, wherein the substantially planar visual curvilinear display is configured to:
   wirelessly couple to a mobile device;
   receive, from the mobile device, a set of images and a schedule defining an order in which the images of the set of images are to be displayed by the digital bumper sticker;
   receive, from the mobile device, a control signal directing the substantially planar visual curvilinear display to display the received set of images; and
   in response to receiving the control signal and based on a movement of the vehicle, display the images in the set of images in the order defined by the schedule such that a displayed image is visible to a person facing the rear surface of the vehicle; and
   in response to determining that the vehicle is stationary for more than a threshold amount of time, configuring the digital bumper sticker to operate in a sleep mode until subsequent vehicle motion is detected.

2. The digital bumper sticker of claim 1, wherein the support member is a frame.

3. The digital bumper sticker of claim 1, wherein the substantially planar visual curvilinear display is flexible.

4. The digital bumper sticker of claim 1, further comprising an inductively chargeable battery operatively coupled to the substantially planar visual curvilinear display.

5. The digital bumper sticker of claim 1, wherein the substantially planar visual curvilinear display is removable from the support member.

6. The digital bumper sticker of claim 1, further comprising a communications bus in communication with the substantially planar visual curvilinear display, wherein the communications bus is mounted on the support member.

7. The digital bumper sticker of claim 1, further comprising a controller mounted on the support member.

8. The digital bumper sticker of claim 7, further comprising a camera in communication with the controller.

9. The digital bumper sticker of claim 1, wherein the substantially planar visual curvilinear display is a light emitting diode screen or a projector.

10. The digital bumper sticker of claim 1, further comprising an additional substantially planar visual curvilinear display that is in communication with the substantially planar visual curvilinear display.

11. The digital bumper sticker of claim 1, wherein the support member is removably mountable on the rear vehicle surface.

12. A method for displaying media selected by a user by a digital bumper sticker, comprising:
    wirelessly coupling, by the digital bumper sticker, to a mobile device, the digital bumper sticker mounted on or in close proximity to a rear surface of a vehicle;
    accessing, by the digital bumper sticker from the mobile device, a set of images and a schedule defining an order in which the images of the set of images are to be displayed;
    receiving, by the digital bumper sticker from the mobile device, a control signal directing the wireless bumper sticker to display the accessed set of images when a movement of the vehicle satisfies a movement criteria;
    in response to the movement of the vehicle satisfying the movement criteria, displaying, by the digital bumper sticker, the images in the set of images in the order defined by the schedule such that a displayed image is visible to a person viewing the rear surface of the vehicle; and
    in response to determining that the vehicle is stationary for more than a threshold amount of time, configuring the digital bumper sticker to operate in a sleep mode until subsequent vehicle motion is detected.

13. The method of claim 12, further comprising: receiving an input from the user to display the set of images, wherein the images in the set of images are displayed further based on the received input.

14. A digital bumper sticker for analyzing a response to media selected by a user and displayed by the digital bumper sticker, comprising:
    a support member configured to mount on or in close proximity to a rear surface of a vehicle;
    a display mounted on the support member, wherein the display is configured to:
    wirelessly couple to a mobile device;
    receive, from the mobile device, a set of images and a schedule defining an order in which the images of the set of images are to be displayed;

in response to a movement of the vehicle satisfying a movement criteria, display the received set of images in the order defined by the schedule; and in response to determining that the vehicle is stationary for more than a threshold amount of time, configure the digital bumper sticker to operate in a sleep mode until subsequent vehicle motion is detected.

15. The digital bumper sticker of claim 14, further comprising a controller wherein the controller is programmed to determine a score indicative of a quality of a relationship between the user and the at least one viewer based at least in part on the response.

16. A digital bumper sticker for displaying media selected by a user, comprising:
   a support means configured to mount on or in close proximity to a rear surface of a vehicle; and
   a display mounted on the support means, wherein the display is configured to:
      receive, from a mobile device, a set of media objects and a schedule defining an order in which the media objects of the set of media objects are to be displayed, the set of media objects and the schedule selected by a user of the mobile device;
      in response to a movement of the vehicle satisfying a movement criteria, display the media objects in the set of media objects in the order defined by the schedule such that a displayed media object is visible to a person facing the rear surface of the vehicle; and
      in response to determining that the vehicle is stationary for more than a threshold amount of time, configure the digital bumper sticker to operate in a sleep mode until subsequent vehicle motion is detected.

17. The digital bumper sticker of claim 16, wherein the movement criteria comprises a threshold speed, and wherein the movement of the vehicle satisfies the movement criteria in response to a speed of the vehicle being less than the threshold speed.

18. The digital bumper sticker of claim 16, wherein the movement of the vehicle satisfies the movement criteria when the vehicle is stopped or is approaching a stop.

19. The digital bumper sticker of claim 16, wherein the movement of the vehicle satisfies the movement criteria when the vehicle is accelerating or decelerating.

20. The digital bumper sticker of claim 16, wherein the display is further configured to:
   in response to the movement of the vehicle satisfying a second movement criteria, hiding a displayed media object.

* * * * *